(12) United States Patent
Jaeger

(10) Patent No.: US 7,240,300 B2
(45) Date of Patent: Jul. 3, 2007

(54) METHOD FOR CREATING USER-DEFINED COMPUTER OPERATIONS USING ARROWS

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 330 days.

(21) Appl. No.: 10/940,507

(22) Filed: Sep. 13, 2004

(65) Prior Publication Data

US 2005/0034080 A1 Feb. 10, 2005

Related U.S. Application Data

(63) Continuation-in-part of application No. 09/880,397, filed on Jun. 12, 2001, now Pat. No. 6,883,145, which is a continuation-in-part of application No. 09/785,049, filed on Feb. 15, 2001.

(51) Int. Cl.
*G06F 13/00* (2006.01)
(52) U.S. Cl. ...................... 715/863; 715/862
(58) Field of Classification Search ............. 715/801, 715/802, 805, 767, 769, 800, 863–864, 771–773, 715/744–747, 760, 856–862, 765, 711; 705/2
See application file for complete search history.

(56) References Cited

U.S. PATENT DOCUMENTS

| | | | | |
|---|---|---|---|---|
| 5,481,668 A | * | 1/1996 | Marcus | 715/853 |
| 5,519,392 A | * | 5/1996 | Oder et al. | 340/995.27 |
| 5,740,436 A | * | 4/1998 | Davis et al. | 713/1 |
| 6,020,881 A | * | 2/2000 | Naughton et al. | 715/740 |
| 6,262,734 B1 | * | 7/2001 | Ishikawa | 715/850 |
| 6,425,120 B1 | * | 7/2002 | Morganelli et al. | 717/109 |
| 6,459,442 B1 | * | 10/2002 | Edwards et al. | 715/863 |
| 6,525,749 B1 | * | 2/2003 | Moran et al. | 715/863 |
| 6,583,782 B1 | * | 6/2003 | Gould et al. | 345/157 |
| 6,701,513 B1 | * | 3/2004 | Bailey | 717/109 |
| 6,883,145 B2 | * | 4/2005 | Jaeger | 715/767 |
| 2003/0023989 A1 | * | 1/2003 | Chevallier et al. | 725/153 |
| 2003/0200117 A1 | * | 10/2003 | Manetta et al. | 705/2 |
| 2004/0119697 A1 | * | 6/2004 | Kamizono | 345/168 |
| 2005/0067485 A1 | * | 3/2005 | Caron | 235/380 |

* cited by examiner

*Primary Examiner*—Steven P. Sax

(57) ABSTRACT

A method for creating user-defined computer operations involves drawing an arrow in response to user input and associating at least one graphic to the arrow to designate a transaction to the arrow. The transaction is designated to the arrow after analyzing the graphic object and the arrow to determine if the transaction is valid for the arrow. The transaction may be validated or invalidated for the arrow using a second arrow. Furthermore, the second arrow may be used to modify the transaction for the arrow. The context for creating the modified transaction may be recorded for subsequent use.

38 Claims, 43 Drawing Sheets

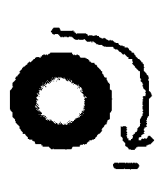
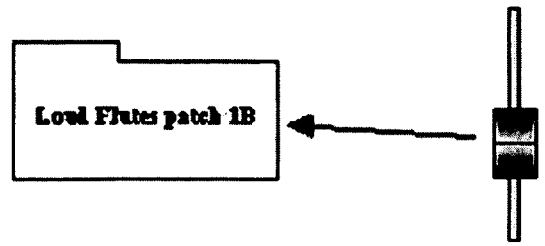
FIG. 32   FIG. 33
FIG. 34A
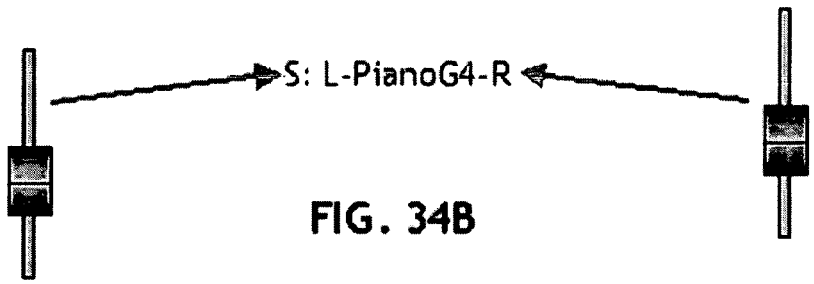
FIG. 34B
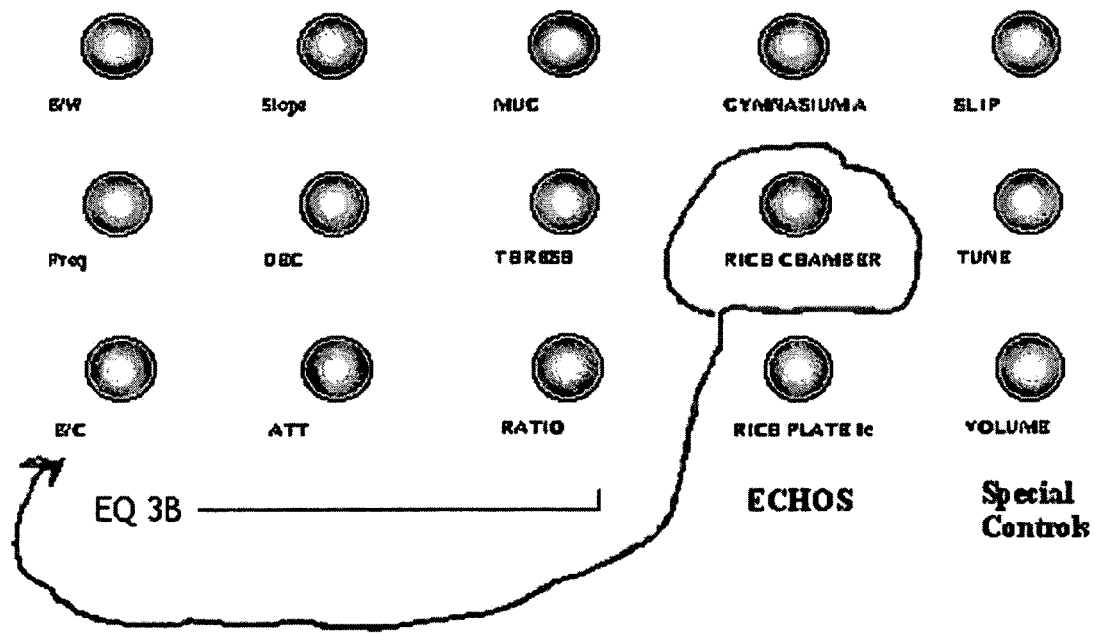
FIG. 35

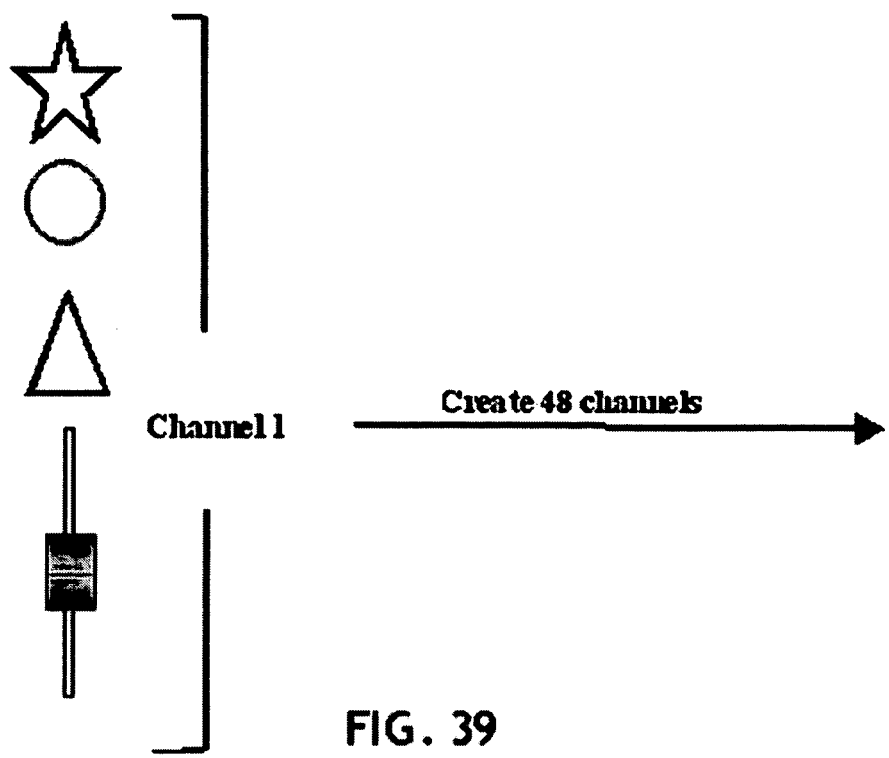
FIG. 39
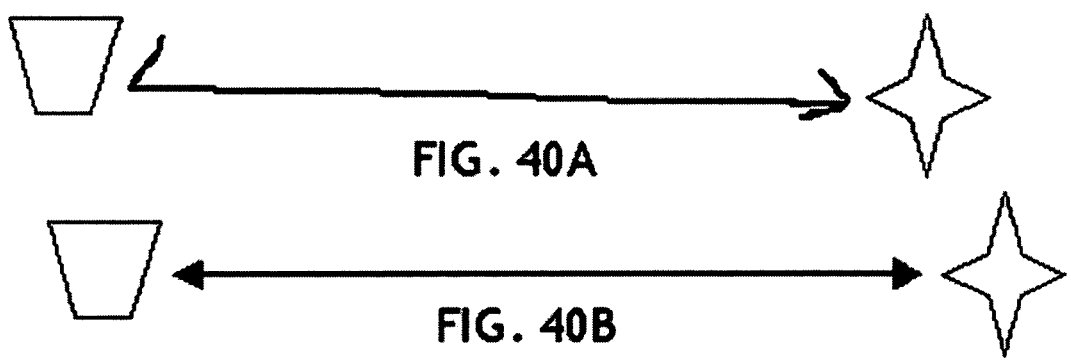
FIG. 40A
FIG. 40B
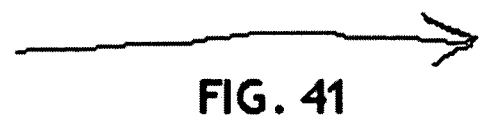
FIG. 41
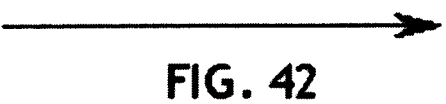
FIG. 42
FIG. 43

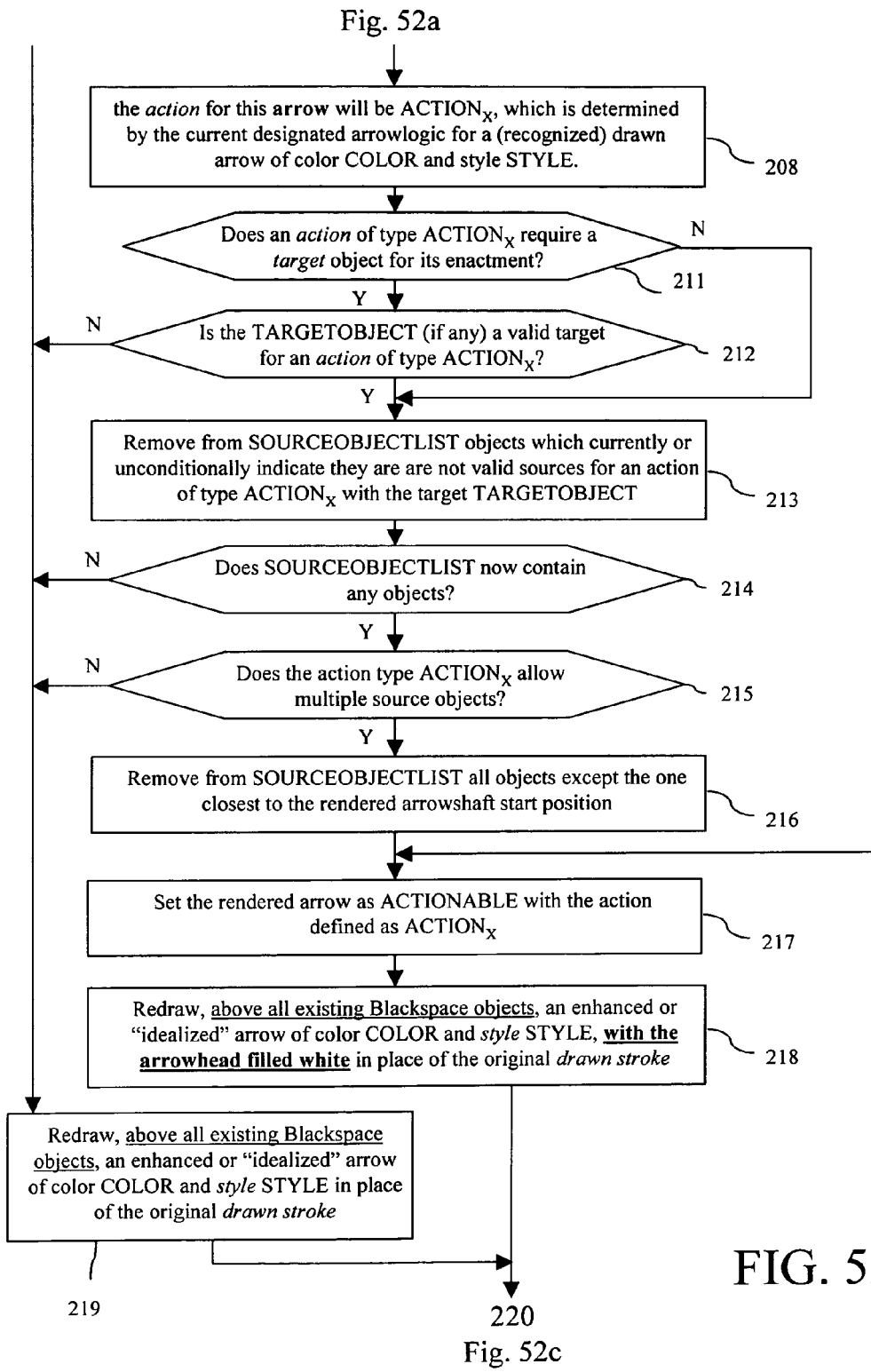

*— 420

Fader Object

Type:
```
              an object
                 |
              a control
                 |
               FADER
               /   \
     horizontal fader   vertical fader
               \   /
                 |
               volume
               hue
               brightness
```

Status:

enabled
disabled fader cap position = X location coordinates    X=         Y=
location coordinates could define a specific layout of faders for a specific recording console.

FIG. 62a

Blue Circle

Type:

object
                |
     recognized drawn object
                |
                ellipse
                |
                circle

Status:

color: blue, green, red, yellow, etc.
is it assigned to another object?
is it an assigned to object?
part of a glue collective
always under on/off
allow ripple on/off

FIG. 62b

METHOD FOR CREATING USER-DEFINED COMPUTER OPERATIONS USING ARROWS

REFERENCE TO RELATED APPLICATIONS

This application is a continuation-in-part of application Ser. No. 09/880,397, filed Jun. 12, 2001 now U.S. Pat. No. 6,883,145, which is a continuation-in-part of application Ser. No. 09/785,049, filed on Feb. 15, 2001, for which priority is claimed. The entireties of the prior applications are incorporated herein by reference.

FIELD OF THE INVENTION

The invention relates generally to computer operating environments, and more particularly to a method for performing operations in a computer operating environment.

BACKGROUND OF THE INVENTION

Operations in conventional computer operating environments are typically performed using pull-down menu items, pop-up menu items and onscreen graphic control devices, such as faders, buttons and dials. In order to perform a specific operation, a user may need to navigate through different levels of menus to activate a number of menu items in a prescribed order or to locate a desired control device.

A concern with these conventional approaches to perform operations is that these menu items and graphic control devices are usually preprogrammed to perform designated operations using designated objects, which may not be modifiable by the users. Thus, the conventional approaches do not provide flexibility for users to change or develop operations using objects that differ from the preprogrammed operations.

Another concern is that different operations generally require the user to memorize different menu items and their locations to perform the operations. Thus, the knowledge of how to perform a specific operation does not typically make it easier to learn a different operation.

In view of these concerns, there is a need for an intuitive and non-complex method for creating user-defined operations in a computer operating environment.

SUMMARY OF THE INVENTION

A method for creating user-defined computer operations involves drawing an arrow in response to user input and associating at least one graphic to the arrow to designate a transaction to the arrow. The transaction is designated to the arrow after analyzing the graphic object and the arrow to determine if the transaction is valid for the arrow. The transaction may be validated or invalidated for the arrow using a second arrow. Furthermore, the second arrow may be used to modify the transaction for the arrow. The context for creating the modified transaction may be recorded for subsequent use.

A method for creating user-defined computer operations in accordance with an embodiment of the invention comprises drawing an arrow in a computer operating environment in response to user input, including associating at least one graphic object displayed in the computer operating environment with the arrow, determining whether the arrow is associated with a transaction, which is a computer operation that can be performed in the computer operating environment, analyzing the graphic object and the arrow to determine whether the transaction is valid for the arrow, and designating the transaction for the arrow if the transaction is determined to be valid for the arrow.

An embodiment of the invention includes a storage medium, readable by a computer, tangibly embodying a program of instructions executable by the computer to perform the method steps for creating user-defined computer operations.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 32 and 33 are depictions of arrows used to define the counter-default direction for an on-screen knob controller.

FIG. 34A is a depiction of an arrow used to apply a control function of a device to one or more on-screen objects.

FIG. 34B is a depiction of arrows used to apply control functions of two devices to the left and right tracks of an on-screen stereo audio signal object.

FIG. 35 is a depiction of an arrow used to reorder the path of a signal through an exemplary on-screen signal processing setup.

FIG. 39 is a depiction of an arrow used to generate one or more copies of one or more on-screen objects.

FIG. 40A is a depiction of a typical double-ended arrow hand-drawn on-screen to evoke a swap transaction between two on-screen objects.

FIG. 40B is a depiction of a double ended arrow created on the on-screen display to replace the hand drawn entry of FIG. 40A.

FIG. 41 is a depiction of an arrow hand-drawn on-screen.

FIG. 42 is a depiction of a single-ended arrow created on-screen to replace the hand drawn entry of FIG. 41.

FIG. 43 is a depiction of a text entry cursor placed proximate to the arrow of FIG. 42 to enable placement of command text to be associated with the adjacent arrow.

FIGS. 52a, 52b and 52c show a flowchart of a process for creating and interpreting an arrow with due regard to Modifiers and Modifier for Contexts in accordance with an embodiment of the invention.

FIG. 62a illustrates an example of "Type" and "Status" hierarchy for user defined selections of fader object elements in accordance with an embodiment of the invention.

FIG. 62b illustrates an example of "Type" and "Status" elements for a blue circle object in accordance with an embodiment of the invention.

DETAILED DESCRIPTION

Figure 1:
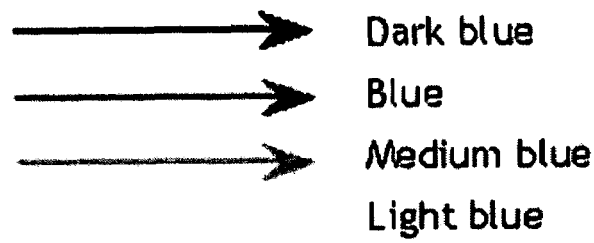
FIG. 1 is a depiction of various color values of arrow components of the arrow logic system of the present invention.

The following is a list of definitions used in this disclosure.

Arrow: An arrow is an object drawn in a graphic display to convey a transaction from the tail of the arrow to the head of the arrow. An arrow may comprise a simple line drawn from tail to head, and may (or may not) have an arrowhead at the head end. The tail of an arrow is at the origin (first drawn point) of the arrow line, and the head is at the last drawn point of the arrow line. Alternatively, any shape drawn on a graphic display may be designated to be recognized as an arrow. The transaction conveyed by an arrow is denoted by the arrow's appearance, including combinations of color and line style. The transaction is conveyed from one or more objects associated with the arrow to one or more objects (or an empty spaced on the display) at the head of the arrow. Objects may be associated with an arrow by proximity to the tail or head of the arrow, or may be selected for association by being circumscribed (all or partially) by a portion of the arrow. The transaction conveyed by an arrow also may be determined by the context of the arrow, such as the type of objects connected by the arrow or their location. An arrow transaction may be set or modified by a text or verbal command entered within a default distance to the arrow, or by one or more arrows directing a modifier toward the first arrow. An arrow may be drawn with any type of input device, including a mouse on a computer display, or any type of touch screen or equivalent employing one of the following: a pen, finger, knob, fader, joystick, switch, or their equivalents. An arrow can be assigned to a transaction.

Arrow configurations: An arrow configuration is the shape of a drawn arrow or its equivalent and the relationship of this shape to other graphic objects, devices and the like. Such arrow configurations may include the following: a perfectly straight line, a relatively straight line, a curved line, an arrow comprising a partially enclosed curved shape, an arrow comprising a fully enclosed curved shape, i.e., an ellipse, an arrow drawn to intersect various objects and/or devices for the purpose of selecting such objects and/or devices, an arrow having a half drawn arrow head on one end, an arrow having a full drawn arrow head on one end, an arrow having a half drawn arrow head on both ends, an arrow having a fully drawn arrow head on both ends, a line having no arrow head, and the like. In addition, an arrow configuration may include a default, gap which is the minimum distance that the arrow head or tail must be from an object to associate the object with the arrow transaction. The default gap for the head and tail may differ.

Arrow logic: A transaction conveyed by an arrow (as defined herein).

Show Arrow command: Any command that enables a previously disappeared arrow to reappear. Such commands can employ the use of geometry rules to redraw the previous arrow to and from the object(s) that it assigns its arrow logic to. The use of geometry rules can be used to eliminate the need to memorize the exact geometry of the original drawing of such arrow.

Properties: Characteristics of a graphic object, such as size, color, condition etc.

Behavior: An action, function or the like associated with a graphic object.

Note: The present invention provides two ways for enabling the software to recognize an arrow: (1) a line is drawn by a user that hooks back at its tip (half arrowhead) or has two hooks drawn back (full arrowhead), and (2) the software simply designates that a certain color and/or line style is to be recognized as an arrow. This latter approach is more limited than the first in the following way. If a user designates in the software that a red line equals an arrow, then whenever a red line is drawn, that line will be recognized as an arrow. The designation can be made via a menu or any other suitable user input method.

A method for creating user-defined computer operations in accordance with an embodiment of the invention allows a user to draw an arrow of particular color and style in a computer operating environment that is associated with one or more graphic objects to designate a computer operation (referred to herein as an "arrow logic operation", "transaction" or "action") to the drawn arrow. A graphic object is associated with the arrow by drawing the arrow to intersect, nearly intersect (within a default or user-defined distance) or substantially encircle the graphic object. Depending on the associated graphic objects and the drawn arrow, an arrow logic operation that corresponds to the particular color and style of the drawn arrow is determined to be valid or invalid for the drawn arrow. If the arrow logic operation is valid for the drawn arrow, then the arrow logic operation is designated for the drawn arrow. The arrow logic operation is then executed when the drawn arrow is implemented or activated.

The designated arrow logic operation may be modified by a user by drawing a second arrow that intersects or contacts the first drawn arrow or a representation of the first drawn arrow. The modified arrow logic operation may be defined by the user by associating one or more alphanumeric characters or symbols, which are entered by the user. The second arrow may also be used to invalidate a valid arrow logic operation for a first drawn arrow or validate an invalid arrow logic operation for a first drawn arrow. The second arrow may also be used to associate additional graphic objects to a first drawn arrow. The context relating to the drawing of the second arrow to modify or validate an arrow logic operation may be recorded and stored so that the modified or validated arrow logic operation can be subsequently referenced or recalled when an arrow similar to the first drawn arrow is again drawn.

In an exemplary embodiment, the method in accordance with the invention is executed by software installed and running in a computer. Thus, the method is sometimes referred to herein as "software".

The following is a partial list of transactions that may be carried out using arrow logics.

(a) Copy/Replace or Copy/Replace/Delete from screen
(b) Place Inside
(c) Send the signal or contents to
(d) Change to
(e) Insert an action or function in the stem of an arrow.
(f) Rotational direction for a knob
(g) Apply the control of a device to one or more objects, devices or text.
(h) Reorder or redirect a signal path among screen objects.
(i) Create multiple copies of, and place these copies on the screen display.
k) Swap Utilizing Different Colors for Different Arrow Transactions.

The arrow logics system provides different techniques for assigning arrow colors to particular transactions, in order to accommodate different amounts of flexibility and complexity according to how much each individual user can manage, according to his or her level of experience. The following ways of assigning colors start with the simplest way to utilize arrow Exchange logics and become increasingly more flexible and complicated.

(1) Lower level user: Assign one arrow color per arrow logic category. With this approach, for each of the above six arrow logic categories, only one color would be used. This requires that only one type of arrow color per category can be used. For instance, a blue arrow could equal a copy/replace/delete arrow transaction, and a green arrow could indicate a "change to" transaction, etc. The user may pick one transaction from a list of possible arrow transaction categories and assign a color to that transaction, and this relationship becomes a default for the system.

(2) Power User: Assign variants of one color for various arrow transactions that are included in each arrow transaction category. For example, as shown in FIG. 1, if the user designates the color blue for copy/replace/delete, the user may choose dark, default, medium and light blue hues for different types of copy/replace/delete functions.

Figure 2:
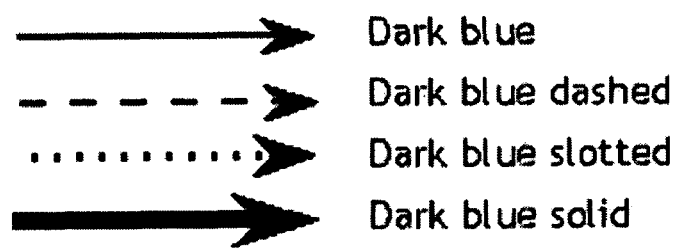
FIG. 2 is a depiction of various styles of arrow components of the arrow logic system.

(3) Higher Power User: Assign variants of one color for various arrow transactions that are included in each arrow transaction category, plus variants of line styles for each arrow transaction category. For example, as shown in FIG. 2, line styles such as thin, dashed, dotted, slotted, and solid thick line styles may be employed in addition to the various color hues of FIG. 1. This approach has a lot of flexibility, depending on how many arrow transactions a user may wish to designate with a single color. For instance, the arrow option of FIGS. 1 and 2 may be combined to provide 16 different arrow appearances: four styles of arrows for four different hues of the color blue, and each may be assigned a unique transaction.

Figure 3:
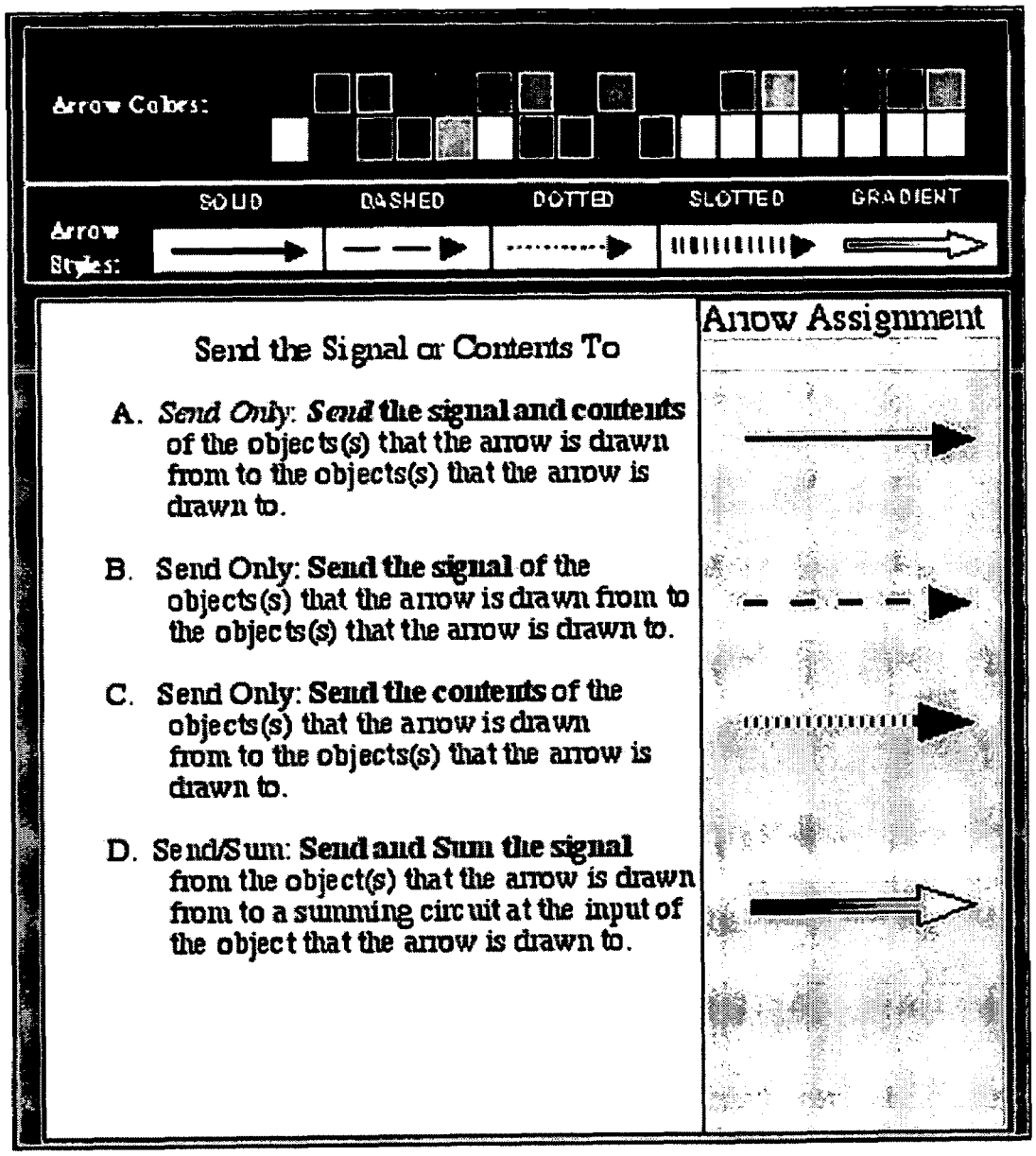
FIG. 3 is a screen shot of a portion of a possible Info Canvas object for the arrow logic system.

To relate each color hue and line style combination to a particular transaction, the user may enter the Info Canvas object for arrow logics or for the specific arrow transaction that is to be assigned; i.e., place inside, send signal, as shown in FIG. 3. For information regarding Info Canvas objects, see pending U.S. patent application Ser. No. 10/671,953, entitled "Intuitive Graphic User Interface with Universal tools", filed on Sep. 26, 2003, which is incorporated herein by reference. Selecting a new function for the selected color (and/or line style) for that transaction establishes the relationship, which can be immediately stored. From that point on, the selected color/line style for that arrow transaction becomes the default, unless altered by use of the Info Canvas object once again.

For instance, if the copy/replace/delete logic color is dark blue and the transaction is: "'Copy the definition' of the object at the tail of the arrow to the object at the front of the arrow," one can change this transaction by selecting a new transaction from a list of possible transactions in the copy/replace/ delete Info Canvas object. The assignment of a particular color and line style of an arrow to a particular arrow transaction can be accomplished by drawing the desired arrow (with the selected color and line style) next to the arrow logic sentence that this arrow is desired to initiate. This drawing can take place directly on the Arrow Logic Info Canvas object, as shown in FIG. 3.

NOTE: It is possible for more than one arrow color and/or line style to be assigned to a specific arrow logic. For instance, for the more common arrow transactions, i.e., "control the object and/or device that the arrow is drawn to by the object or device that the arrow is drawn from," such an arrow logic could utilize a blue arrow with a solid line and a green arrow with a solid line, etc. Similarly, it is possible to utilize a single type of arrow, i.e., a green dashed arrow, to simultaneously initiate more than one arrow transaction. To set up such an arrow logic, an arrow could be drawn on the Arrow Logic Info Canvas object across from a specific arrow transaction. Then the same colored arrow with the same style could be drawn across from another arrow logic in the same Info Canvas object.

NOTE: This Info Canvas object can be found inside the Global Arrow Logic Info Canvas object or can be entered directly. Furthermore, other methods to alter an arrow logic or assign an arrow logic include using vocal commands or typing or writing or printing text near the arrow for which its logic is to be changed or initially determined (in the case that such arrow has no logic previously assigned to it.) Another very advanced method of defining an arrow logic for an arrow would be to draw another arrow from an object that represents a particular arrow logic to an existing arrow such that the logic of the object that the arrow's tail points to is assigned to the arrow that the newly drawn arrow points to. If one selects a new transaction, i.e., "'Copy all non-aesthetic properties' of the object that the arrow is drawn from to the object that the arrow is drawn to," the dark blue arrow will have a new copy/replace/delete function. This function can remain until which time it is changed again.

Figure 4:
FIG. 4 is a depiction of a gradient fill arrow component of the arrow logic system.

A further line style variant that may be employed to provide further differentiation among various arrows on the graphic display is a gradient fill, as shown in FIG. 4. This feature may be employed with monocolor arrows, or may gradiate from one color to another. There are several forms of gradient fills that may be used (monocolor, bicolor, light-to-dark, dark-to-light, etc.) whereby the combinations of line hues, line styles, and gradient fills are very numerous and easily distinguished on a graphic display.

Figure 5:
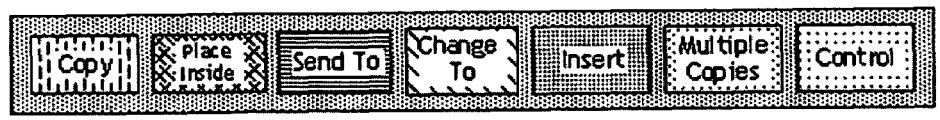
FIG. 5 is a depiction of an arrow color menu bar, hatched to indicate various colors and associated functions that may be selected.
Figure 6:
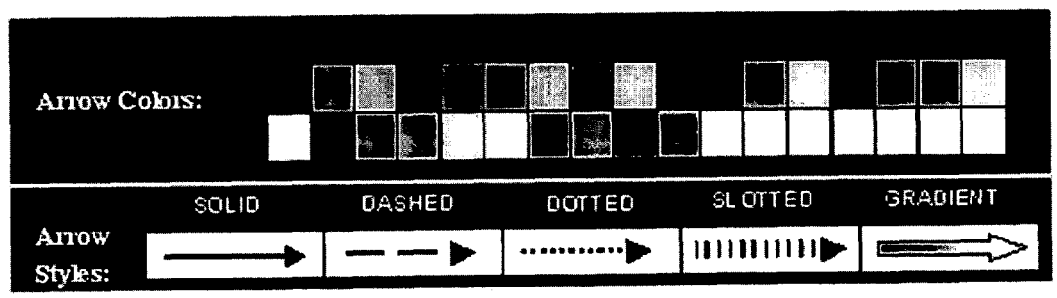
FIG. 6 is a depiction of an arrow menu bar, showing various colors and arrow styles that may be selected.

Line color may be selected from an on-screen menu, as suggested in FIG. 5, in which the hatching indicates different colors for the labeled buttons, and FIG. 6 (not hatched to represent colors), which displays a convenient, abbreviated form of the Info Canvas object to enable the user to select category line styles as well as shades of each color category.

1. COPY/Replace

This function copies all or part of any object or objects at the tail of an arrow to one or more objects at the head of the arrow. If the object that the arrow is drawn to does not have the property that a specific arrow transaction would copy or assign to it, then the arrow performs its "copy" automatically. If, however, the object the arrow is drawn to already has such property or properties, a pop up window appears asking if you wish to replace such property or properties or such object.

Figure 7:
FIG. 7 is a depiction of a copy arrow and the placement of the new copy of the existing object relative to the head of the copy arrow.
Figure 8:
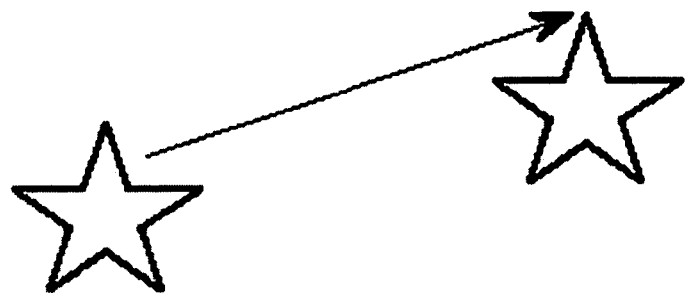
FIG. 8 is a depiction of another copy arrow and the placement of the new copy of the existing star object relative to the head of the copy arrow.
Figure 9:
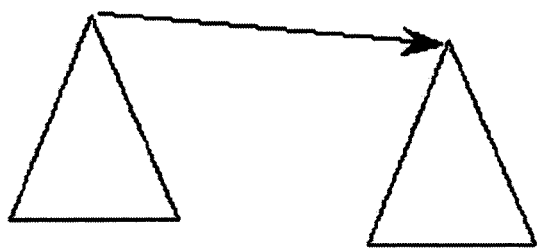
FIG. 9 is a depiction of a copy arrow and the placement of the new copy of the existing triangle object relative to the head of the copy arrow.

For example, as shown in FIG. 7, one may copy the rectangle object (including all properties, i.e., Info Canvas object, automation, aesthetic properties, definition, assignment, action and function) by drawing an arrow from the rectangle to an empty space on the screen display (i.e., a space that is not within a default distance to another screen object). Many different schemes are possible to implement the copy function. One such scheme is that the object is copied so that the front of the arrow points to either the extreme upper left corner or the upper extremity of the object, whichever is appropriate for the object, as shown by the examples of FIGS. 8 and 9. Copying may involve some or all the attributes of the object at the tail of the arrow; for example:

Aesthetic Properties

Copy the color of the object at the tail of an arrow to one or more objects at the head of the arrow.

Copy the shape of the object at the tail of an arrow to one or more objects at the head of the arrow.

Copy the line thickness of the object at the tail of an arrow to one or more objects at the head of the arrow.

Copy the size of the object at the tail of an arrow to one or more objects at the head of the arrow.

Copy all aesthetic properties (except location) of the object at the tail of an arrow to one or more objects at the head of the arrow, etc Definition Copy the definition of the object at the tail of an arrow to one or more objects at the head of the arrow.

Action

Copy the action of the object at the tail of an arrow to one or more objects at the head of the arrow.

Assignment

Copy the assignment of the object at the tail of an arrow to one or more objects at the head of the arrow.

Function

Copy the function of the object at the tail of an arrow to one or more objects at the head of the arrow.

Automation

Copy the automation of the object at the tail of an arrow to one or more objects at the head of the arrow.

Info Canvas Object

Copy the Info Canvas object of the object, or the contents of the Info Canvas object, at the tail of an arrow to one or more objects at the front of the arrow.

To engage "replace", the user may click in a box for the "replace" option in the appropriate Info Canvas object (or its equivalent) or type "replace" along the arrow stem when typing, writing or speaking a new function for a certain color and style of arrow (see also FIG. 43).

Copy the object (including all properties, i.e., Info Canvas object, automation, aesthetic properties, definition, assignment, action and function) that the arrow is drawn from and replace the object that the arrow is drawn to with such object in the location of the object that the arrow is drawn to.

Copy all non-aesthetic properties of the object at the tail of an arrow and replace those properties in one or more objects at the front of the arrow.

Copy all properties (except location) of the object at the tail of an arrow and replace those properties in one or more objects at the front of the arrow.

Figure 10:
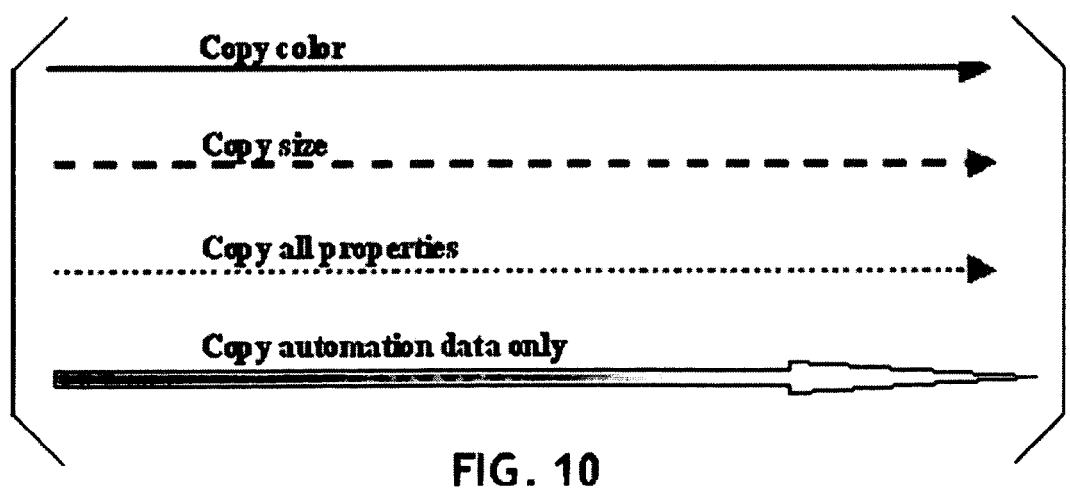
FIG. 10 is a chart of arrow styles indicating the association of various copy transactions with their respective arrow styles. Most importantly, this indicates a user's ability to type, print, write or use a vocal command to reassign an arrow logic to a hand drawn arrow, by using arrow logic abbreviations.

Using arrow logic abbreviations. One feature of arrow logics is that the arrow logic sentences, which can be found in arrow logic Info Canvas object, menus and the like, can be listed where the first number of words of the sentence are distinguished from the rest of the sentence. One way to do this is to have these first number of words be of a different color, i.e., red, and have the rest of the arrow logic sentence be in another color, i.e., black. (Note that in FIG. 3, the highlighted words of the arrow logic sentences are shown in bold to indicate a color differential) The user can declare or change the logic for any given arrow (or its equivalent, i.e., a line) by typing, writing, printing or speaking just the abbreviation for the arrow logic. This shortcut eliminates the need to enter a long sentence which describes a particular arrow logic. The abbreviation performs the same task. A sample of the use of arrow logic abbreviations entered adjacent to arrow stems to assert the arrow transactions is shown in FIG. 10.

2. Place Inside

Figure 11:
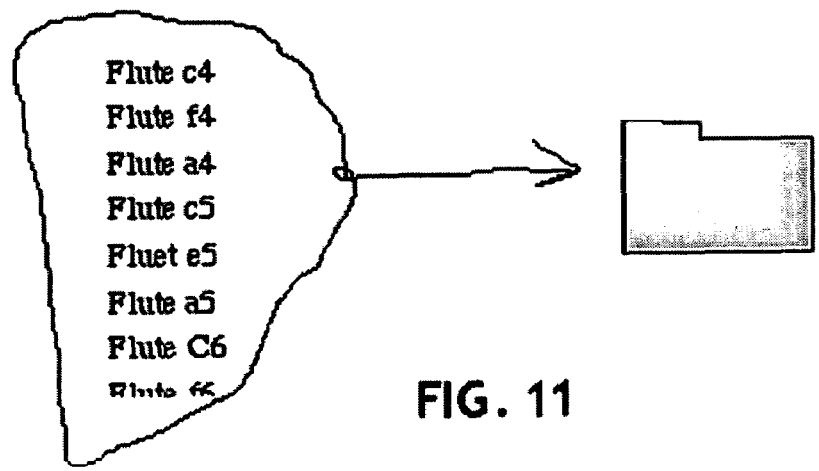
FIG. 11 is a depiction of a hand drawn arrow conveying the transaction of placing a list of music files inside a folder.

With regard to FIG. 11, the "place inside" arrow transaction enables an arrow to place a group of objects inside a folder, icon or switch or other type of hand drawn graphic. An example of this is selecting a group of sound files by drawing an ellipse around them and then drawing a line with an arrow on the end extending from the ellipse and pointing to a folder. This type of drawn arrow will place all of these encircled sound files from the list into the folder. When the arrow is drawn to the object, in this case a folder, the operation may be carried out immediately. An alternative default, which provides the user an opportunity to abort his action, association, direction, etc. caused by the drawing of his arrow, is that the object that the arrow is drawn to (the folder in this case) begins flickering, or, as may be preferred by many users, the arrow itself starts to flicker or change color, etc. The arrow then continues to flicker until it is touched. Once touched, the flickering stops, the arrow and the ellipse disappear and the transaction is completed. NOTE: In order to engage an arrow logic, it is not necessary that the arrow must disappear. However, this is often desirable, because it eliminates having a large number of arrows drawn from object to object all over a display, where the continued visibility of these arrows could interfere with a user's ability to effectively operate and control other graphics, devices, objects, text, etc., on the display. Thus, hiding "engaged" or "implemented" arrows can eliminate confusion and screen clutter, but the implementation of arrow logics is not dependent upon whether any draw arrow remains visible or becomes hidden.

Multiple ellipses and arrows may be able to be drawn around different objects and then one by one the objects that the arrows are pointing to, or the arrows themselves, can be touched to complete the action. By having arrows operate this way, the action of touching a flickering object or arrow can be automated to store the exact moment that the operation of the arrow has been completed for one or more objects.

Figure 12:
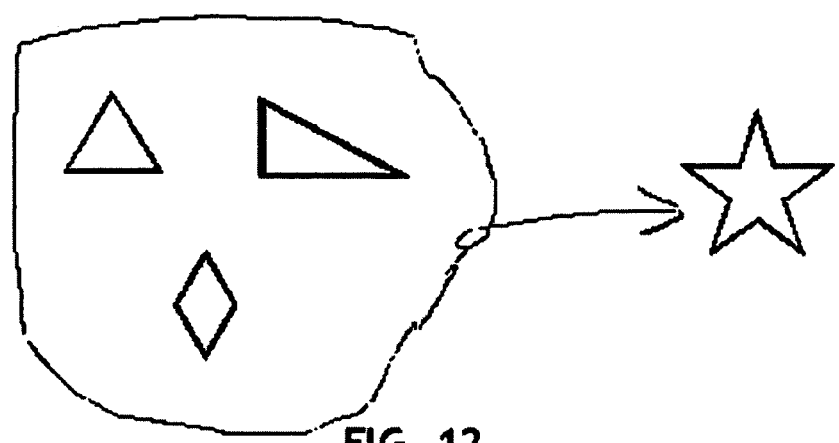
FIG. 12 is a depiction of a hand drawn arrow conveying the transaction of selecting and placing a group of on-screen objects inside an on-screen object.

Another example of a "place inside" transaction, shown in FIG. 12, involves drawing an ellipse to select a group of objects (two triangles and a rhombus) and then placing them inside another object, a star object. By double clicking on the star, the objects that have been placed inside it can be made to fly back out of the star and resume the locations they had before they were placed inside the star object. Thus, placing objects inside another object, i.e., the star of FIG. 12, carries the advantage of enabling a user to draw a single object to immediately gain access to other objects. Access to these other objects can take many forms. Below are two examples:

1) Utilizing a single object to apply the processes, features, actions, etc. of the devices contained within this single object to other objects, text, devices, etc. These other objects could represent a group of devices that can be applied to process a sound or device or object by drawing an arrow from, for example the star of FIG. 12, to another object, like a sound file. But these devices may be utilized while they remain hidden inside the star, as shown in FIG. 12. By drawing an arrow from the star to a sound file or vice versa (depending upon the desired signal flow), all of the processing contained within the star may be immediately applied to the sound file, although the individual processors (represented by objects inside the star) never need to be viewed. These processors can be used to process the sound file without being directly accessed. Only a connection to the star (the object containing these processors) needs to be established.

2) Accessing the processes, features, actions, etc. of the devices contained within a single object by having them fly out of the single object. Like example one above, the objects in the star can represent processors or any type of device, action, function, etc. By doubling clicking on the star, the individual objects stored in the star may "fly out"; i.e., reappear on the display. By further clicking on each individual object, the controls for the processor that each object represents can fly out of each object and appear on screen. These controls can then be used to modify a processor's parameters. Once modified, these controls can be made to fly back into the graphic, i.e., equilateral triangle, diamond, etc. and then in turn these objects can be made to fly back into the star, as depicted in FIG. 12. The underlying concept is to be able, by hand drawing alone, to gain access to virtually any level of control, processing, action, definition, etc. without having first to search for such things or having to call them up from a menu of some kind. This type of hand drawing provides direct access to an unlimited array of functions, processes, features, actions, etc. Such access can be initiated by simply drawing an object (that represents various functions, processes, features, actions, etc.) anywhere and at any time on a display.

Figure 13:
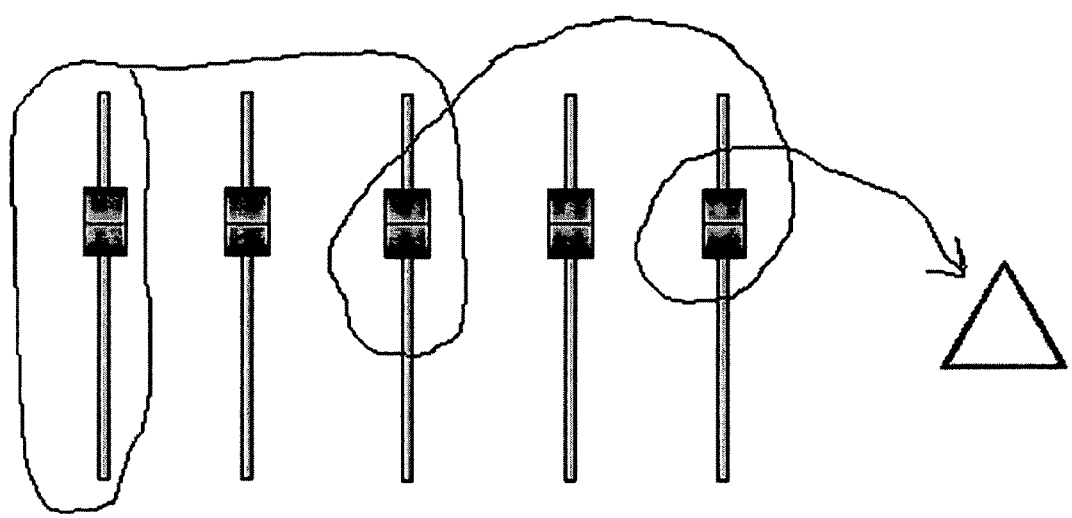
FIG. 13 is a depiction of a hand drawn arrow conveying the transaction of selecting and placing a group of on-screen devices and/or objects inside an on-screen object.

In a further example, shown in FIG. 13, a line is drawn continuously to circumscribe the first, third, and fifth fader controllers, and the arrowhead at the end of the line is proximate to a triangle object. This arrow operation selects the first, third, and fifth controllers and places them in the triangle object. FIG. 13 illustrates an arrow line being used to select an object when such line circumscribes, or substantially circumscribes, an object(s) on the screen display.

Figure 14:
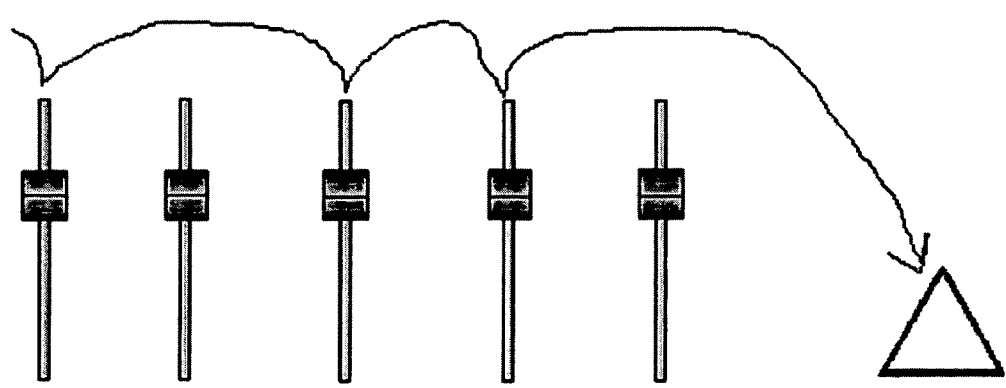
FIG. 14 is a depiction of another graphical method of using a hand drawn arrow to convey the transaction of selecting and placing a group of on-screen devices and/or objects inside an on-screen object.

In the example of FIG. 14, a line is drawn continuously and includes vertices that are proximate to the first, third, and fourth fader controllers. The software recognizes each vertex and its proximity to a screen object, and selects the respective proximate objects. The arrowhead proximate to the triangle directs the arrow logic system to place the first, third, and fourth fader controllers in the triangle.

An alternate method of accomplishing this same task involves a group of objects that are selected and then dragged over the top of a switch or folder. The switch itself becomes highlighted and the objects are placed inside the switch and the switch takes on the label of the group of objects or a single object, as the case may be.

Figure 15:
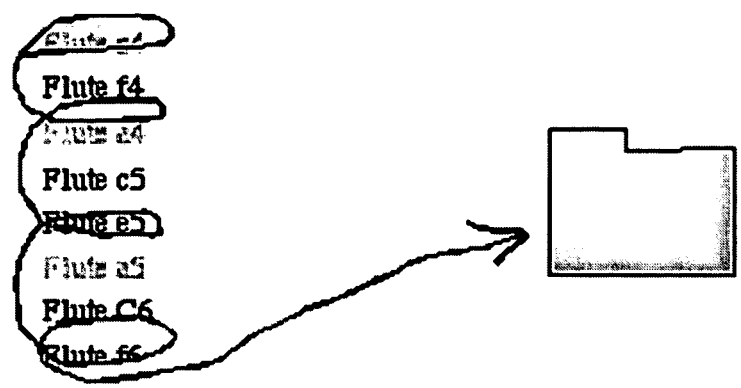
FIG. 15 is a depiction of a hand drawn arrow conveying the transaction of selecting and placing a list of music files inside a folder, where the selected and placed file names become grayed out.

As shown in FIG. 15, one or more files in a list of sound files on the screen may be chosen by drawing a line about each one and extending the arrow head to an object, in this case, a folder. As each object in the list (or group of the preceding examples) is encircled, or partially encircled, in a hand drawn ellipse, it may change color or highlight to show that it has been selected. In the example of FIG. 15, only the selected text objects will be highlighted, and after the flickering folder object or arrow is touched, the selected objects will disappear from the list (or be grayed out on the list, etc.) and be placed into the folder. One value of this technique is to show which files in the list have been copied into the folder and which ones in the list remain uncopied.

Figure 44:
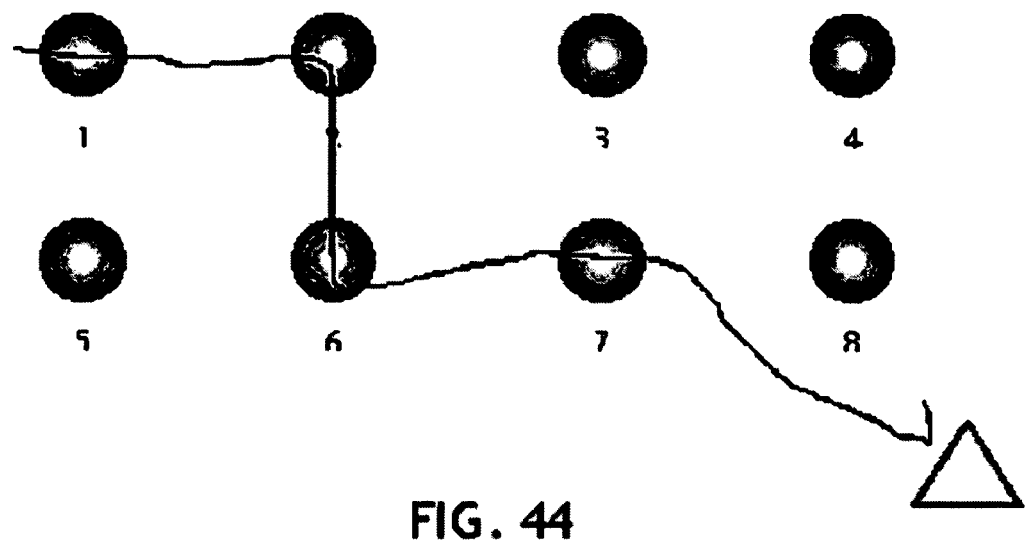
FIG. 44 is a depiction of an arrow drawn through a plurality of objects to select these objects.

With regard to FIG. 44, another technique for selecting multiple objects with an arrow is the use of a "line connect mode". This mode involves drawing an arrow stem to intersect one or more objects which are thus automatically selected. These selected objects can, with the use of an arrow logic, be assigned to, sent to, summed to, etc. another object and/or device or group of objects and/or devices at the head of the arrow. In this example, the arrow associates knobs 1, 2, 6, and 7 to a single object, a triangle. The arrow transaction for this assignment is in accordance with the color, line style and or context that this arrow is drawn and according to the arrow logic assigned to that graphic combination.

Copy and Place Inside:

Place all objects at the tail of an arrow into the object at the head of the arrow. Furthermore, do not erase the original objects from the screen after they are placed in the object to which the arrow is pointing. The files that have been selected by the hand drawn ellipse and then copied to the folder become grayed out, rather than completely deleted from the list. This way the user can see that these files have been copied to an object and that the other files (the non-grayed out files) have not been copied to the folder, similar to the showing of FIG. 15.

3. Send the Signal or Contents To:

This arrow transaction is designed for the purpose of processing or controlling one or more objects, devices, texts, etc. with another object, text, device, etc. Thus an arrow may be drawn to send the signal of a console channel to an echo unit or send a sound file to an equalizer. This arrow transaction could also be used to send the contents of a folder to a processor, i.e., a color correction unit, etc.

Send Only

Figure 16:
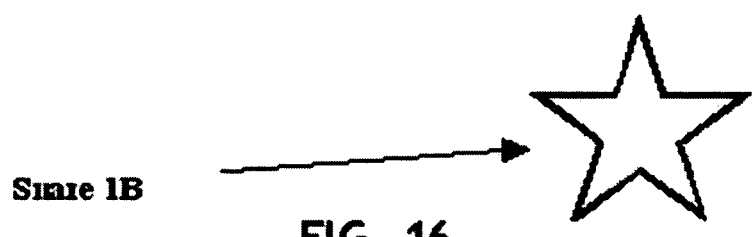
FIG. 16 is a depiction of an arrow directing a signal path from a sound file to an on-screen object which may represent some type of sound process.
Figure 17:
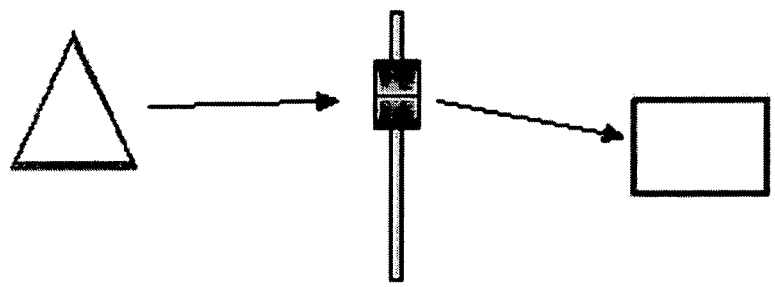
FIG. 17 is a depiction of the use of multiple arrows to direct a signal path among multiple on-screen devices and/or objects.

This arrow transaction sends the signal or contents of the object(s) at the tail of the arrow to the object(s) at the head of the arrow. As shown in FIG. 16, one example includes a star designated as an echo chamber. By drawing the arrow from the snare sound file 'snare 1B' to the star, the snare sound signal is commanded to be sent to that echo chamber. In another example, shown in FIG. 17, a triangle equals a group of console channels. The signals from these console channels are directed by one arrow to a fader, and the signals from the fader are directed by another arrow to a generic signal processing channel, which is represented by a rectangle. The actions are by no way limited to audio signals. They can be equally effective for designating control and flow between any types of devices for anything from oil and gas pipelines to sending signals to pieces of test or medical equipment, processing video signals, and the like.

NOTE: Generally, in the illustrations herein, the head and tail of an arrow must be within a default distance from an on-screen object in order to couple the transaction embodied in the arrow to the object, unless the arrow is governed by a context, which does not require a gap default of any kind. The default distance may be selectively varied in an Info Canvas object to suit the needs of the user.

Send/Sum

Figure 18:
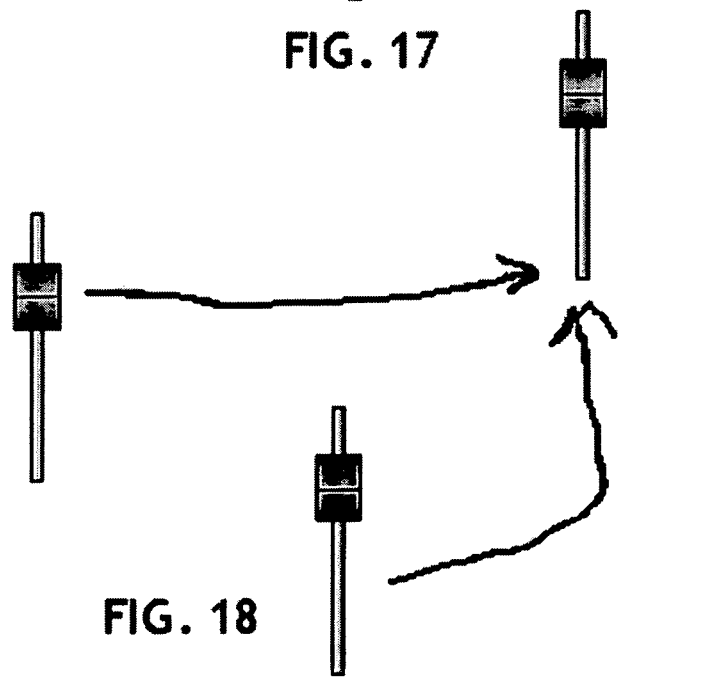
FIG. 18 is a depiction of two arrows used to direct a send/sum transaction from two on-screen controllers to a third on-screen controller.

This arrow transaction sends the signal or contents of the object(s) at the tail of the arrow to a summing circuit at the input of the object at the head of the arrow. With regard to FIG. 18, one example of "send/sum" includes a pair of fader controllers, each having an arrow drawn therefrom to a third fader controller. The software may interpret the converging arrows to designate that the signals from the pair of faders are to be summed and then controlled by the third fader. Depending on default context assignments, it may be necessary to designate an arrow color for the two arrows of FIG. 18 to impart the summing transaction to the third fader, otherwise two signals entering a single component may be interpreted to be ambiguous and not permissible.

Figure 19:
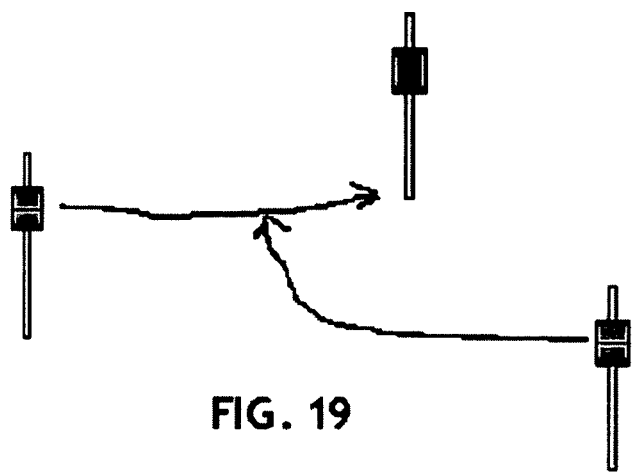
FIG. 19 is a depiction of another example of two arrows used to direct a send/sum transaction from two on-screen controllers to a third on-screen controller.

As shown in FIG. 19, a first arrow may be drawn from one fader controller to a second fader controller, and a second arrow may be drawn from a third fader controller to the first arrow. This construction also commands that the signals from the first and third faders are summed before being operated on by the second fader. Thus the construction of FIG. 19 is equivalent to that of FIG. 18.

Figure 20:
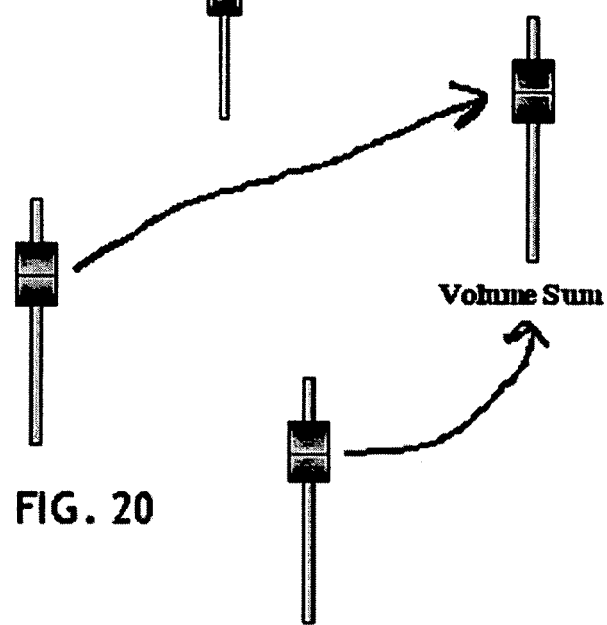
FIG. 20 is a further depiction of two arrows used to direct a send/sum transaction from two on-screen controllers to a third on-screen controller.
Figure 21:
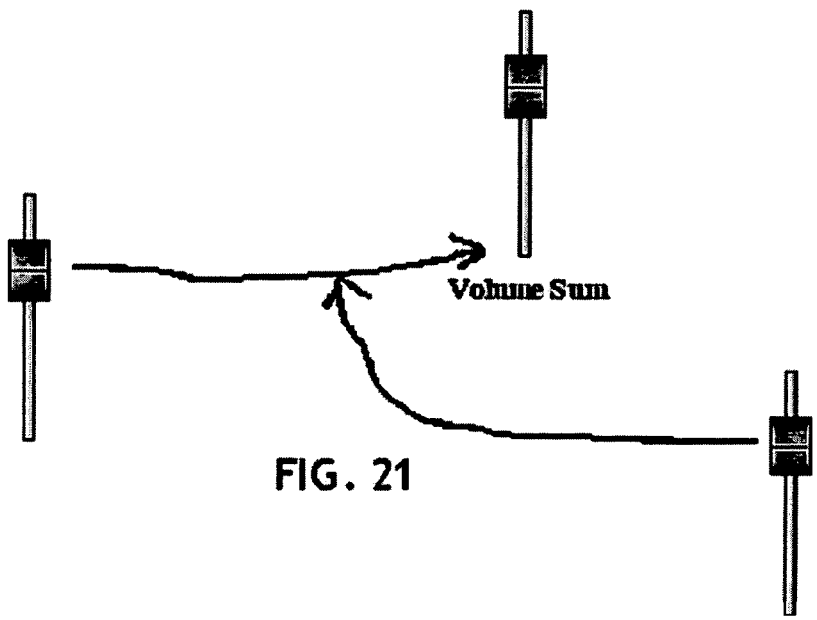
FIG. 21 is another depiction of two arrows used to direct a send/sum transaction from two on-screen controllers to a third on-screen controller.

With regard to FIG. 20, the send/sum transaction may be set forth in a specific context, thereby eliminating the need for a special arrow color or appearance to direct the summing function of two inputs to a screen object. In this example, a fader is drawn on the screen, and labeled "Volume Sum" (by spoken word(s), typed label entry, etc.). The software recognizes this phrase and establishes a context for the fader. Thereafter, arrows of no special color or style may be drawn from other screen objects, such as the two other fader controllers shown in FIG. 20, to the Volume Sum fader, and the signals sent to the Volume Sum fader can be added before being processed thereat. Likewise, as shown in FIG. 21, the construction of FIG. 19 (arrow drawn to arrow line) may be combined with a particular context (Volume Sum) to enable the send/sum transaction to occur without requiring specific arrow colors or styles. Note: The arrows shown in FIGS. 20 and 21 may utilize specific arrow colors and styles if these are desired by the user. Such arrows and styles may or may not be redundant, but certainly they could improve ease of use and ongoing familiarity of user operation.

4. Change To

Figure 22:
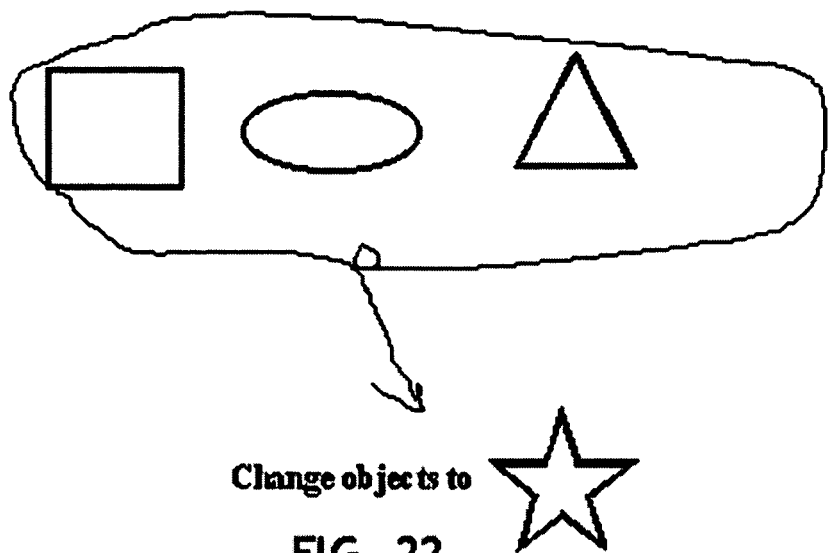
FIG. 22 is a depiction of an arrow used to select and change a group of on-screen objects to another object.

One or more objects may be selected by being circumscribed by an arrow line which extends to another object. Text may be entered by voice, typing, printing, writing, etc. that states "change object to," a phrase that is recognized by the software and directed by the arrow. The transaction is that all the selected objects are changed to become the object at the head of the arrow. Thus, as shown in FIG. 22, the square, ellipse and triangle that are encircled by the arrow are commanded to be changed to the star object at the head of the arrow. Note: such encircling arrow line does not have to be an enclosed curved figure. It could be a partially open figure.

Figure 23:
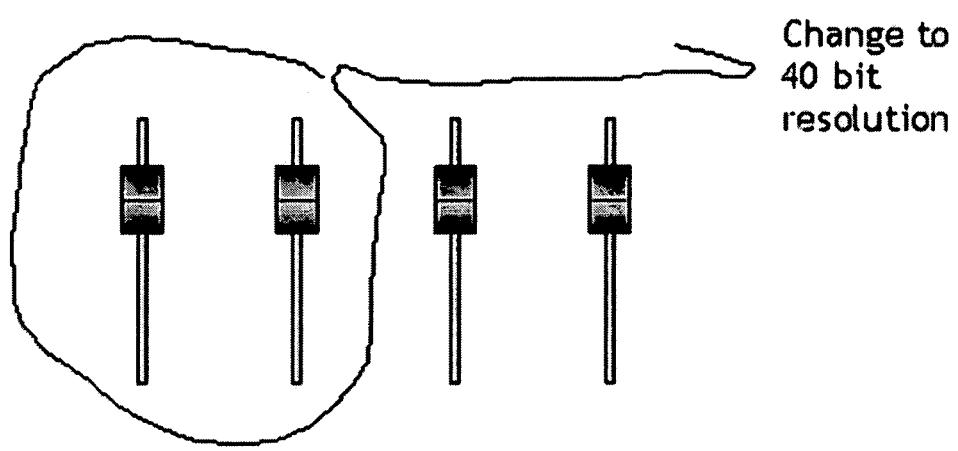
FIG. 23 is a depiction of an arrow used to select and change a property of multiple on-screen objects.

The "change to" arrow transaction may also be used to alter the signal or contents of the object at the tail of the arrow according to the instructions provided for by text and/or objects at the head of the arrow. As shown in FIG. 23, the two fader controllers at the left may be encircled by an arrow that is drawn to a text command that states "change to 40 bit resolution." In this case, only the two leftmost faders would be selected and modified in this manner.

5. Specialty Arrows

Specialty arrows convey a transaction between two or more objects on screen, and the transaction is determined by the context of the arrow, not necessarily by the color or appearance of the arrow. To avoid confusion with arrows having color or appearance associated with specific transactions, the specialty arrow category may make use of a common color or appearance: e.g., the color cement gray, to designate this type of arrow. Specialty arrow transactions (arrow logics) may include, but are not limited to, (a) Insert a modifier, action or function in the stem of an arrow;
(b) Rotational direction for a knob;
(c) Reorder the signal flow or the order of devices in a list;
(d) Apply the control of a device to one or more objects, devices or text.
(e) Create multiple copies of, and place these copies on a screen display.
(f) Exchange or swap—requires color for specific applications other than default.

Figure 24:
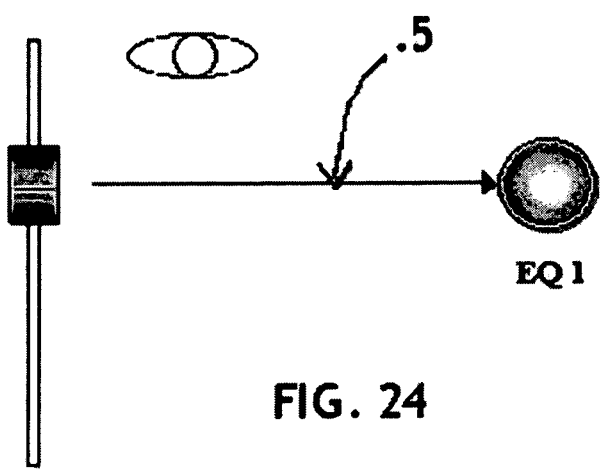
FIG. 24 is a depiction of an arrow used to modify a transaction property of a previously drawn arrow.

As shown in FIG. 24, a specialty arrow may be used to insert a modifier in an arrow stem for an existing action, function, control, etc. This technique enables a user to insert a parameter in the stem of a first arrow by drawing a second arrow which intersects the stem of the first arrow and that modifies the manner in which the first device controls the second. In this case, the user inserts a specifier in an arrow stem to, for example, alter the ratio or type of control. The inserted '0.5' text conveys the command that moving the fader a certain amount will change the EQ1 control by half that amount.

In order to enter a specialty arrow as in FIG. 24 (or elsewhere herein) it may be necessary to use the "Show Control" or "Show Path" command, or its equivalent, to make visible the arrows that have been previously activated and thereafter hidden from view. This "Show" function may be called forth by a pull-down menu, pop-up menu, a verbal command, writing or printing, or by drawing a symbol for it and implementing its function. For example, the circle drawn within an ellipse, which may represent an eye, may be recognized as the Show Path or Show Arrow command. Once this object is drawn, a graphic which shows the control link between the fader and the knob will appear. At this point, the user may draw an arrow that intersects this now visible link between the fader and the knob to create a modification to the type (or ratio) of control. There can be a system default stating that a 1:1 ratio of control is implied for any arrow transaction; thus, for example, for a given amount of change in the fader, that same amount of change is carried out in the knob, which is being controlled by that fader. But the addition of the arrow modifier extending from the 0.5 symbol modifies the relationship to 2:1; that is, for a given amount of change in the fader, half that much change will occur in the knob that is being controlled by that fader.

Alternatively, the modifying arrow may be entered when the first arrow is drawn (from the fader to the knob in FIG.

24) and begins to flicker. The second, modifier arrow may be drawn while the first arrow is flickering, and the two arrows will then flicker together until one of them is touched, tapped, or clicked on by a cursor, causing the arrow transactions to be carried out.

In either case, the context of the second modifier arrow is recognized by the arrow logic system. The second arrow is drawn to a first arrow, but the second arrow does not extend from another screen object, as in FIGS. 19 or 21; rather, it extends from a symbol that is recognized by the system to impart a modifier to the transaction conveyed by the first arrow. Thus the context determines the meaning of the arrow, not the color or style of the arrow.

Figure 25:
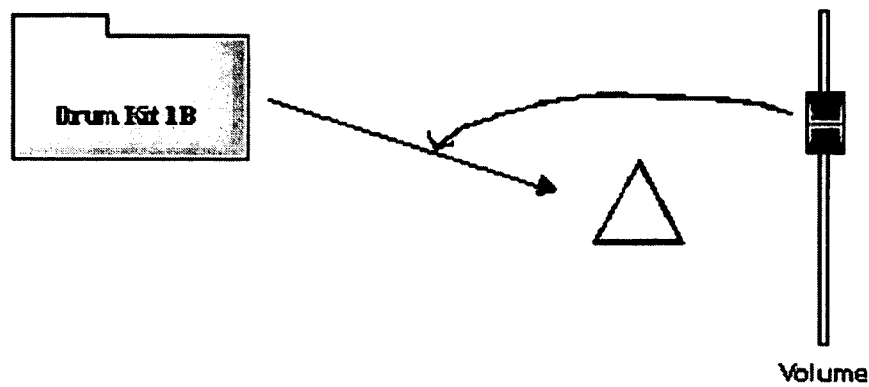
FIG. 25 is a depiction of an arrow used to apply the function of an on-screen controller to a signal being conveyed by another arrow to another on-screen object.

With regard to FIG. 25, the context of an arrow may be used to determine the conveyance of an action or function. This technique enables a user to insert another device, action, function etc., in the stem of an arrow by drawing a second arrow which points to (is within a gap default), or intersects the stem of the first arrow and which extends from the inserted device, action, function, etc. In this example, the volume fader is interposed between the drum kit 1B signal source and the triangle, which may represent a signal processing function of some defined nature, so that the fader adjusts the volume of the signal that is transferred from the drum kit 1B folder to the triangle object. A default of this approach which is protective to the user may be that the inserted arrow must be the same color as the first arrow. On the other hand, a context may be used to determine the transaction, regardless of arrow color or style. The context can be the determining factor, not requiring a special color and/or line style to denote a particular arrow logic, namely: insert whatever device is drawn at the tail of the arrow, which is pointing to the existing arrow stem.

NOTE: Color can be used to avoid accidental interaction of arrows. For instance, arrow lines which are not the same color as existing lines may be draw across such existing lines without affecting them. In other words, it can be determined in software that drawing another arrow, that intersects with an existing arrow, will not affects the first arrow's operation, function, action, etc., unless the second arrow's color is the same as the first arrow's color. In this case, by choosing a different color, one can ensure that any new arrow or object drawn near or intersecting with an existing arrow or object will avoid any interaction with the existing arrow or object. Default settings in the arrow logic system can specify the conventions of color used to govern these contexts.

Figures 26, 27, 28:
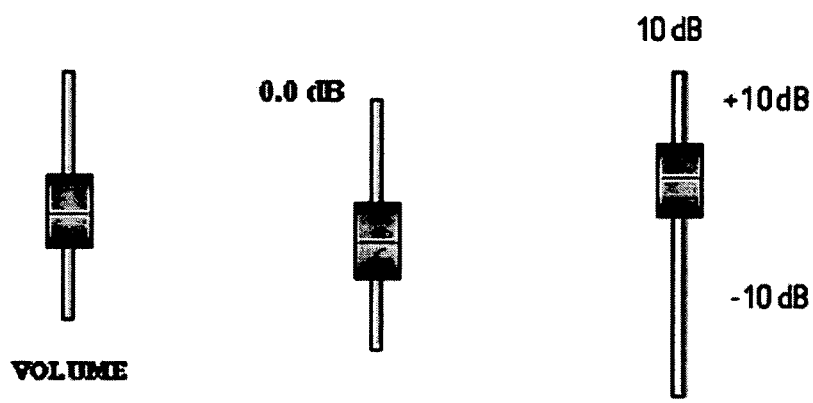
FIG. 26 is a depiction of one technique for labeling an on-screen object with a word or phrase that imparts recognized functional meaning to the object.
FIG. 27 is a depiction of another technique for labeling an on-screen object with a word or phrase that imparts recognized functional meaning to the object.
FIG. 28 is a depiction of a further technique for labeling an on-screen object with a word or phrase that imparts recognized functional meaning to the object.

It is noted that other non-arrow methods may be used to impart an action or function or modifier to screen objects. As shown in FIG. 26, once a fader or other controller is drawn on a screen display, a control word such as "Volume" may be spoken, typed or written into the system at a location proximate to the fader. The system then recognizes the word and imparts the function 'volume' to the adjacent fader. Another implementation of this idea is shown in FIG. 27, where typing, writing or speaking the entry "0.0 dB" proximate to the existing fader accomplishes two things: 1) It determines the resolution and range of the device (fader). For example, "0.0" establishes control of a variable to tenths of dB, and a range of 0.0–9.9. If "0.00" were entered, this would mean hundreds of dB control, etc.; 2) It determines the type of units of control that the device (fader) will operate with. In the case of this example, "dB" or decibels is the unit. If "ms" (milliseconds) were designated, then this device's units would be time. If "%" (percent) were entered, then this device's units would be percent, etc.

An additional embodiment of this idea can be seen in FIG. 28, where the entry of the scale factors "+10 dB" and "−10 dB" proximate to and placed along the track of a fader controller causes not only the fader to be recognized as a dB controller, but also that the fader's scaling is user defined. That is, the distance between the +10 dB text and the −10 dB text defines the scaling for this fader device. In other words, it defines the rate of dB change for a given distance of fader movement—the movement of the fader cap along the fader track. Therefore, the distance between the ±10 dB labels corresponds to the fader cap positions that in turn yield the labeled control (up 10 dB or down 10 dB). This context-driven function entry also may also cause a label "10 dB" to be placed at the top of the fader track.

Figures 29, 30:
FIG. 29 is another depiction of a technique for labeling an on-screen object with a word or phrase that imparts recognized functional meaning to the object.
FIGS. 30 and 31A are depictions of arrows used to define the rotational direction of increasing value for an on-screen knob controller.

A scale factor may be applied in the same manner to a knob controller, as shown in FIG. 29, with the angular span between the scale labels representing ±10 dB range of the knob controller.

Figures 31A, 31B:
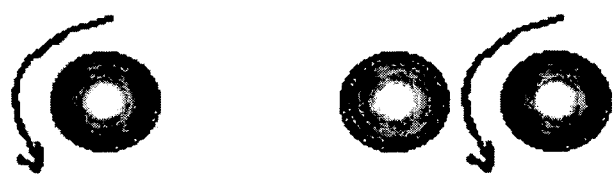
FIG. 31B is a depiction of the context of arrow curvature concentric to a knob, the context being used to determine which knob is associated with the arrow.

With regard to FIGS. 30 and 31A, specialty arrows may be used to indicate the direction of rotation of a knob controller (or translation of a fader cap's movement). The context elements (curved arrow, drawn proximate to a knob controller), create a relationship in which the knob function increases with clockwise rotation (toward the head of the arrow), and the arrow of FIG. 31A specifies a counterclockwise increase in knob function. However, it is possible to overcome any defined action, as shown in FIGS. 32 and 33, by entering the nature of the function change as the knob is rotated in the arrow direction. FIG. 32 specifies negative change in the clockwise direction, and FIG. 33 specifies negative change in the counterclockwise direction, both the opposite of FIGS. 30 and 31.

This example raises another instance in which the system is designed to be context-sensitive. With reference to FIG. 31B, the curved arrow drawn between two knob controllers may appear to be ambiguous, since it is sufficiently proximate to both screen objects to be operatively associated with either one. However, the curvature of the arrow may be recognized by the arrow logic system (through processes described in the parent application referenced above), and this curvature is generally congruent with the knob on the right, and opposed to the curvature of the knob on the left. Alternatively, the system may recognize that the curved arrow partially circumscribes the right knob, and not the left knob. In either case, the context determines that the arrow transaction is applied to the knob on the right.

Specialty arrows may further be used to apply the control function of a device to one or more objects, devices, text, etc. When it is utilized in a context situation, the color or line style of the arrow is not necessarily important. Any color or line style may work or the one color (gray) specified above for context arrows may be used. The important factor for determining the control of an unlabeled device (fader, knob, joystick, switch, etc.) is the context of the hand drawn arrow drawn from that device to another device. As shown in FIG. 34A, drawing an arrow from a functional fader (a fader with a labeled function, i.e., Volume) to another object, in this case a folder that contains a number of sound files, will automatically apply the function of that fader, knob, joystick, etc. to the object to which it is drawn. In this case, the context is "controlling the volume of". There can be no other interpretation for this device (fader). It is a volume fader, so when an arrow is drawn from it to a folder containing a group of sound files, the fader controls the volume of each sound file in the folder. As in all the previous examples, the arrow transaction is invoked if the tail of the arrow is within a default distance to any portion of the fader controller screen object, and the head of the arrow is within a default distance of the folder containing the sound files.

In a further example, shown in FIG. 34B, a pair of fader controllers are arrow-connected to respective left and right tracks of sound file "S: L-PianoG4-R". The context of the two fader controllers linked by respective arrows to the left and right sides of the text object is interpreted by the software to indicate that each fader controls the respectively linked track of the stereo sound file.

A further use for specialty arrows is to reorder a signal path or rearrange the order of processing of any variable in general. As shown in FIG. 35, reordering can involve drawing an ellipse or an intersecting line or a multiple vertex line to select a group of devices and then drawing an arrow from this selected group of devices, which can be functional devices, to a new point in a signal path. When the arrow is drawn, it may start to flicker. Touching the flickering arrow completes the change in the signal path.

Note: if a user is familiar with this system and is confident about using arrows, the use of flickering arrows or objects may be turned off. In this case, when an arrow is drawn, the action, function, etc. of that arrow would be immediately implemented and no flickering would occur. Needless to say, any such arrow action could be aborted or reversed by using an undo command or its equivalent. The arrow of FIG. 35 moves the Rich Chamber echo to the input of the EQ 3B (a general signal processing device). This change in signal path causes the signal to flow first into the echo Rich Chamber and then into the EQ 3B.

Figure 36:
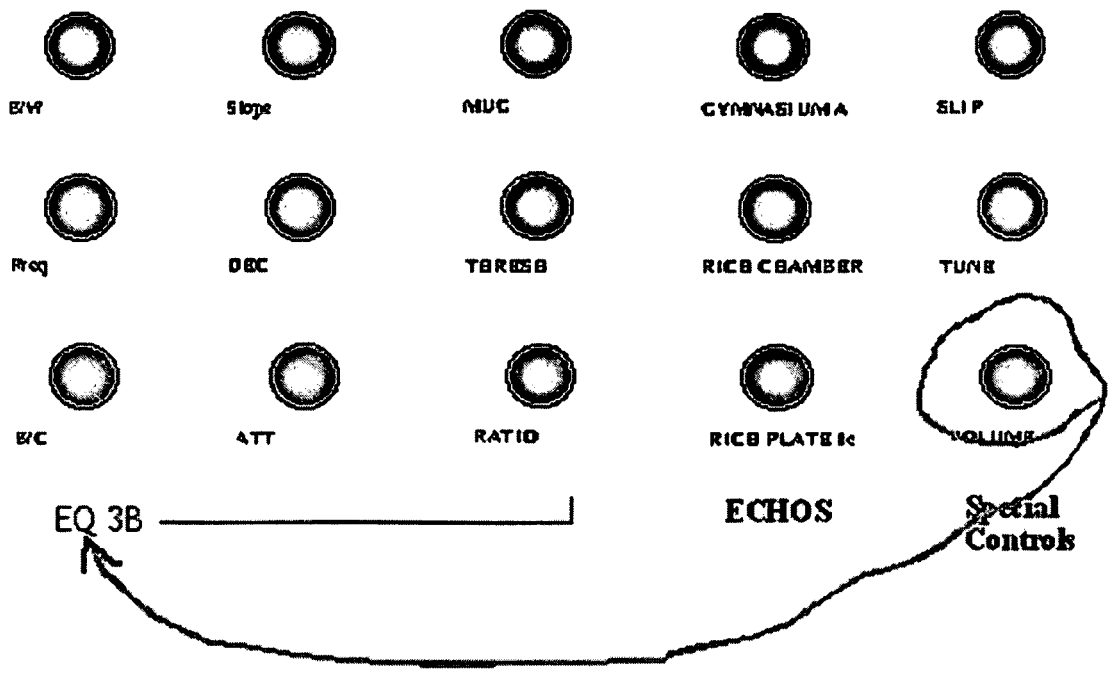
FIG. 36 is another depiction of an arrow used to reorder the path of a signal through an exemplary on-screen signal processing setup.
Figure 37:
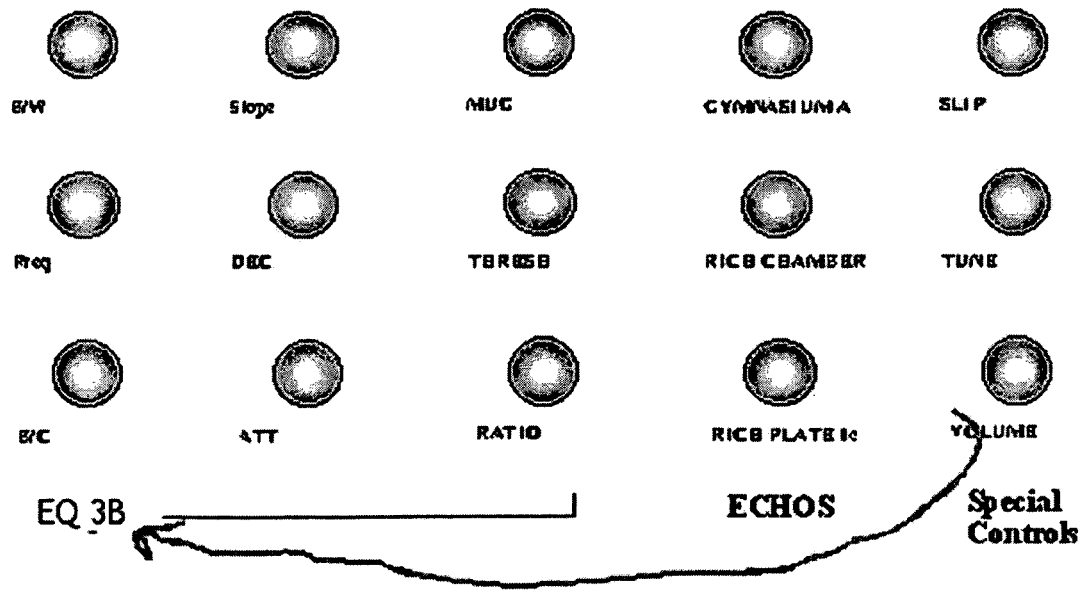
FIG. 37 is a further depiction of an arrow used to reorder the path of a signal through an exemplary on-screen signal processing setup.
Figure 38:
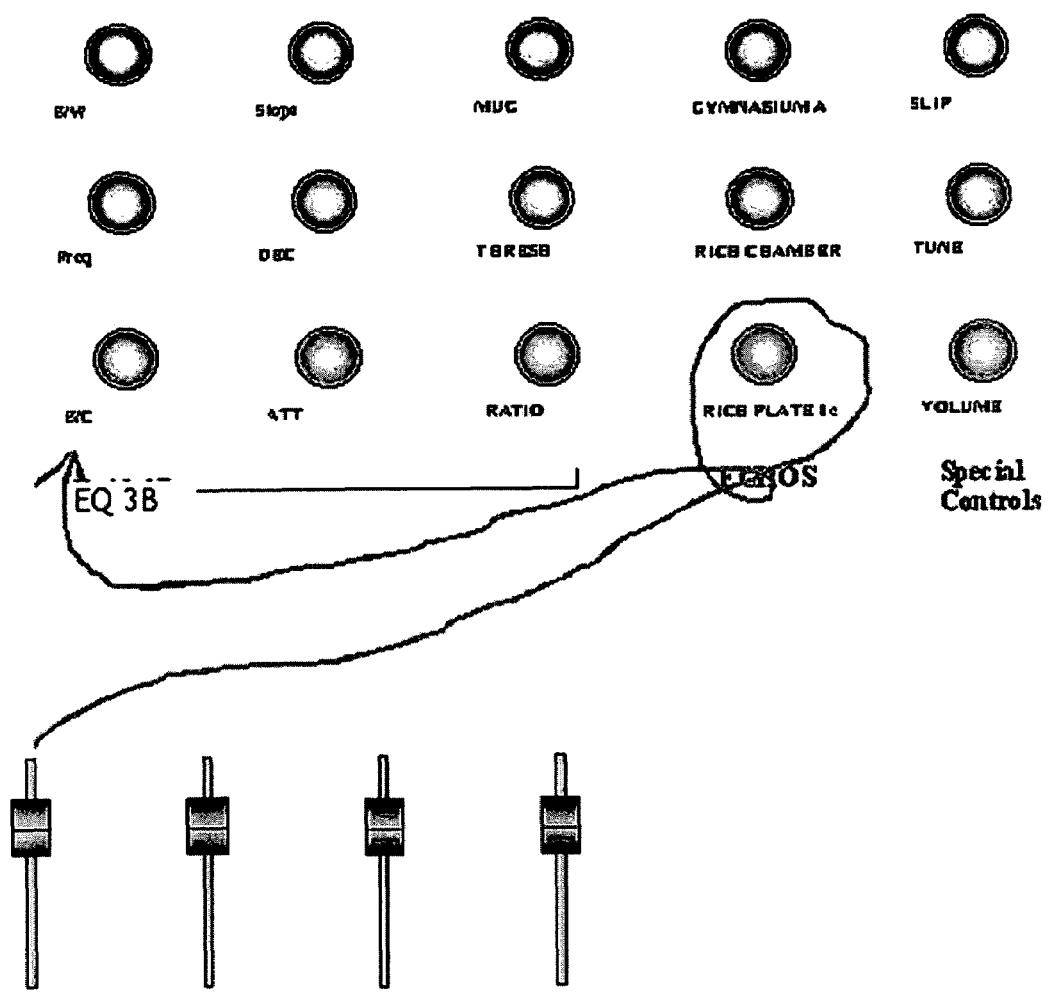
FIG. 38 is a depiction of an arrow used to reorder the path of a signal through multiple elements of an exemplary on-screen signal processing setup.

In another example, shown in FIG. 36, a curved line is drawn about the volume control, with an arrow extending therefrom to the input of EQ 3B. This arrow transaction commands that the volume control function is placed at the input of the EQ, whereby the input to the EQ 3B is first attenuated or increased by the volume control. Likewise, drawing an arrow from the volume label to intersect the label "EQ 3B", as shown in FIG. 37, applies the volume control function of the knob controller to the input signal of the EQ. In a further example, shown in FIG. 38, an arrow is drawn from one fader controller, to and about the Rich Plate echo control, and then to the input of EQ 3B. The direction and connections of this arrow commands that the output of the leftmost fader (at the tail of the arrow) is fed first to the Rich Plate echo control, and then to the input of EQ 3B at the head of the arrow.

In the examples of FIGS. 35–38, the contexts of the drawn arrows determine the transactions imparted by the arrows; that is, an arrow drawn from one or more controllers to another one (or more) controllers will direct a signal to take that path. This context may supercede any color or style designations of the drawn arrows, or, alternatively, may require a default color as described in the foregoing specification.

Another use of specialty arrows is to create multiple copies of screen objects, and place these copies on a screen display according to a default or user defined setup. This feature enables a user to create one or more copies of a complex setup and have them applied according to a default template or according to a user defined template that could be stored in the Info Canvas object for this particular type of action. For example, as shown in FIG. 39, a combination of functional screen objects, such as a fader controller, and a triangle, circle, and star, any of which may represent functional devices for signal processing, are bracketed and labeled "Channel 1". For instance, the triangle could equal a six band equalizer; the circle, a compressor/gate; and the star, an echo unit. An arrow is then drawn from the Channel 1 label to an empty space on the screen. As the arrow flashes, the stem of the arrow is modified by the input (spoken, written or typed) "Create 48 channels." The system interprets this instruction and arrow as a command to produce 48 channels, all of which have the construction and appearance of Channel 1. The action indicated is: "Copy the object that the arrow is drawn from, as many times as indicated by the text typed near the arrow stem pointing to blank space. Furthermore, copy this object according to the default template for console channels." The default may be, for example, place 8 console channels at one time on the screen and have these channels fill the entire available space of the screen, etc. The specialty arrow is once again controlled by context, not by color or style: the tail of the arrow is proximate to an object or group of objects, the head of the arrow is not proximate to any screen object, and the arrow is labeled to make a specified number of copies. Note that the label of the arrow may simply state "48" or any other suitable abbreviation, and if the system default is set to recognize this label as a copy command, the arrow transaction will be recognized and implemented.

A further specialty arrow is one used to exchange or swap one or more aspects of two different screen objects. The arrow is a double headed arrow that is drawn between the two objects to be involved in the exchange transaction. This double headed arrow head creates a context that can only be "swap" or "exchange". The other part of the context is the two objects that this double headed arrow is drawn between.

To facilitate recognition of a wide range of screen objects, the system may provide a default that the double headed arrow must be drawn as a single stroke. As shown in FIG. 40A, the start of the arrow (at the left) is a half arrowhead and the end of the arrow is a full arrowhead. This is a very recognizable object that is unique among arrow logics and contextually determinative. Once recognized, the drawn arrow is replaced by a display arrow (FIG. 40B) that can flicker until touched to confirm the transaction. The list of aspects that may be swapped has as least as many entries as the list given previously for possible copy functions:

Aesthetic Properties

Swap the color of the object, the shape of the object, the line thickness of the object, the size of the object, or all aesthetic properties (except location) between the objects at the head and tail of the arrow.

Definition

Swap the definitions of the objects at the head and tail of the arrow.

Action

Swap of action of the objects at the head and tail of the arrow.

Assignment

Swap of assignment of the objects at the head and tail of the arrow.

Function

Swap the function of the objects at the head and tail of the arrow.

Automation

Swap the automation of the objects at the head and tail of the arrow.

Info Canvas Object

Swap the Info Canvas object of the objects at the head and tail of the arrow.

The technique for arrow entry of FIG. 39, shown in FIGS. 41–43, involves the initial drawing of an arrow, as shown in FIG. 41, followed by the presentation of a flickering arrow on the display (FIG. 42). Thereafter, the user may place a text cursor within a default distance to the flickering arrow (FIG. 43), and speak, write or type a simple phrase or sentence that includes key words recognized by the software (as described with reference to FIG. 3). These words may be highlighted after entry when they are recognized by the system. As previously indicated in FIG. 39, the recognized command of the phrase or sentence is applied to the adjacent arrow, modifying the transaction it conveys. In addition, as an extension of this technique, the user may first enter the phrase or sentence that expresses the desired transaction on the screen, and then draw an arrow within a default distance to the phrase or sentence, in order for the arrow and text command to become associated. Likewise, typing or speaking a new command phrase or sentence within a default distance of an existing arrow on-screen may be used to modify the existing arrow and alter the transaction conveyed by the arrow. Note: a spoken phrase would normally be applied to the currently flickering arrow.

Figure 45:
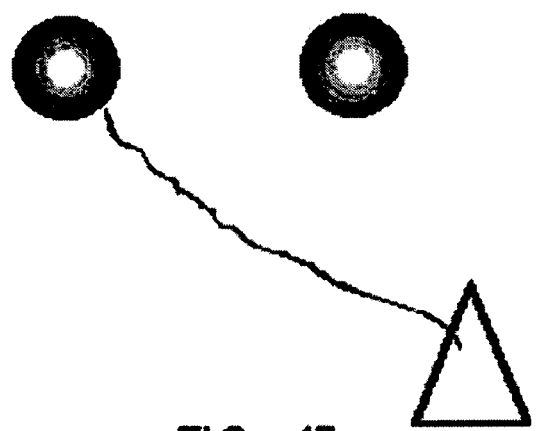
FIG. 45 is a depiction of a line without an arrowhead used and recognized as an arrow to convey a transaction from the leftmost knob controller to the triangle object.

With regard to FIG. 45, the arrow logic system programming may recognize a line as an arrow, even though the line has no arrow head. The line has a color and style which is used to define the arrow transaction. Any line that has the exact same aesthetic properties (i.e., color and line style) as an arrow may be recognized by the system to impart the transaction corresponding to that color and line style.

Figure 46:
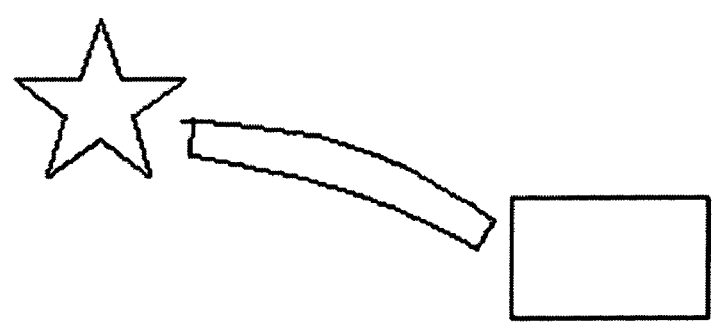
FIG. 46 is a depiction of non-line object recognized and used as an arrow to convey a transaction between screen objects.

As shown in FIG. 46, any shape drawn on a graphic display may be designated to be recognized as an arrow. In this Figure, a narrow curved rectangular shape drawn between a star object and a rectangle object is recognized to be an arrow that imparts a transaction between the star and the rectangle.

Figure 47A:
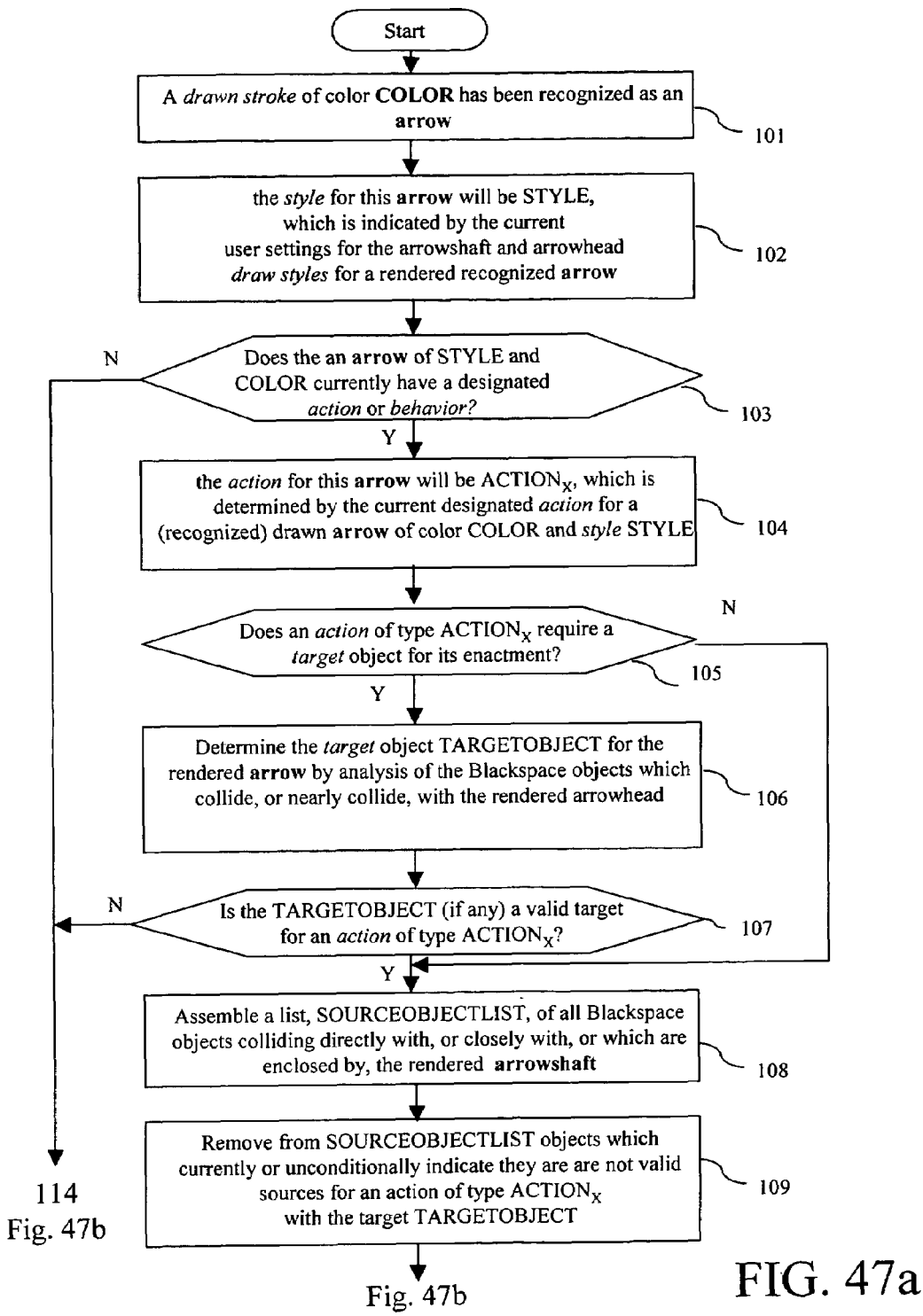
FIGS. 47a and 47b show a flowchart of a process for creating and interpreting an arrow in accordance with an embodiment of the invention.
Figure 47B:
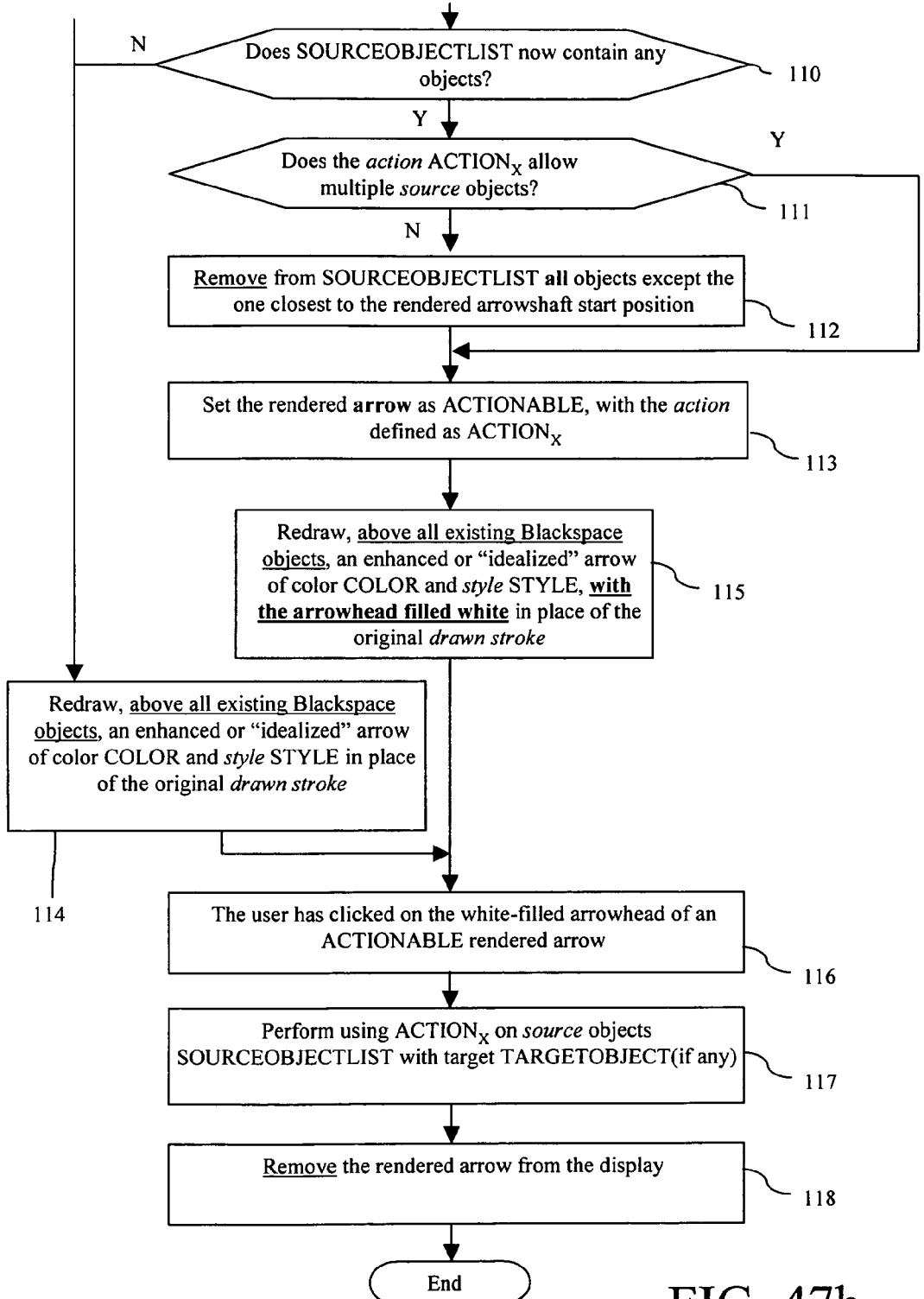

With reference to the flowchart of FIGS. 47a and 47b, the process for creating and interpreting an arrow in accordance with an embodiment of the invention is now described.

Step 101. A drawn stroke of color "COLOR" has been recognized as an arrow—a mouse down has occurred, a drawn stroke (one or more mouse movements) has occurred, and a mouse up has occurred. This stroke is of a user-chosen color. The color is one of the factors that determine the action ("arrow logic") of the arrow. In other words, a red arrow can have one type of action (behavior) and a yellow arrow can have another type of action (behavior) assigned to it.

Step 102. The style for this arrow will be "STYLE"—This is a user-defined parameter for the type of line used to draw the arrow. Types include: dashed, dotted, slotted, shaded, 3D, etc.

Step 103. Does an arrow of STYLE and COLOR currently have a designated action or behavior? This is a test to see if an arrow logic has been created for a given color and/or line style. The software searches for a match to the style and color of the drawn arrow to determine if a behavior can be found that has been designated for that color and/or line style. This designation can be a software default or a user-defined parameter.

If the answer to Step 103 is yes, the process proceeds to Step 104. If no, the process proceeds to Step 114.

Step 104. The action for this arrow will be $ACTION_X$, which is determined by the current designated action for a recognized drawn arrow of COLOR and STYLE. If the arrow of STYLE and COLOR does currently have a designated action or behavior, namely, there is an action for this arrow, then the software looks up the available actions and determines that such an action exists (is provided for in the software) for this color and/or style of line when used to draw a recognized arrow. In this step the action of this arrow is determined.

Step 105. Does an action of type $ACTION_X$ require a target object for its enactment? The arrow logic for any valid recognized arrow includes as part of the logic a determination of the type(s) and quantities of objects that the arrow logic can be applied to after the recognition of the drawn arrow. This determination of type(s) and quantities of objects is a context for the drawn arrow, which is recognized by the software.

EXAMPLE 1

Let's say a red arrow is drawn between four (4) faders such that the arrow intersects all four faders. Let's further say the red arrow logic is a "control logic," namely, the arrow permits the object that it's drawn from to control the object that it's drawn to. Therefore, with this arrow logic of the red arrow, a target is required. Furthermore, the first intersected fader will control the last intersected fader and the faders in between will be ignored. See 111 and 112 in this flow chart.

EXAMPLE 2

Let's say a yellow arrow is drawn between four faders, such that the arrow shaft intersects the first three faders and the tip of the arrow intersects the fourth fader. Let's further say that an "assignment" arrow logic is designated for the color yellow, namely, "every object that the arrow intersects will be assigned to the object that arrow points to." In this case, the arrow logic will be invalid, as a fader cannot be assigned to another fader according to this logic. Whereas, if the same yellow arrow is drawn to intersect four faders and the arrowhead is made to intersect a blue star, the four faders will be assigned to the star.

The behavior of the blue star will be governed by the yellow arrow logic. In this instance, the four faders will disappear from the screen and, from this point on, have their screen presence be determined by the status of the blue star. In other words, they will reappear in their same positions when the blue star is clicked on and then disappear again when the blue star is clicked once more and so on. Furthermore, the behavior of the faders will not be altered by their assignment to the blue star. They still exist on the Global drawing (Blackspace) surface as they did before with their same properties and functionality, but they can be hidden by clicking on the blue star to which they have been assigned. Finally, they can be moved to any new location while they are visible and their assignment to the blue star remains intact.

EXAMPLE 3

Let's say you draw a green arrow which has a "copy" logic assigned to it, which states, "copy the object(s) that the arrow shaft intersects or encircled to the point on the Global Drawing surface that the tip of the arrowhead points to". Because of the nature of this arrow logic, no target object is required. What will happen is that the object(s) intersected or encircled by the green arrow will be copied to another location on the Global Drawing surface.

If the answer to Step 105 is yes, the process proceeds to Step 106. If no, the process proceeds to Step 108.

Step 106. Determine the target object TARGETOBJECT for the rendered arrow by analysis of the Blackspace objects which collide or nearly collide with the rendered arrowhead. The software looks at the position of the arrowhead on the global drawing surface and determines which objects, if any, collide with it. The determination of a collision can be set in the software to require an actual intersection or distance from the tip of the arrowhead to the edge of an object that is deemed to be a collision. Furthermore, if no directly colliding objects are found, preference may or not be given to objects which do not collide in close proximity, but which are near to the arrowhead, and are more closely aligned to the direction of the arrowhead than other surrounding objects. In other words, objects which are situated on the axis of the arrowhead may be chosen as targets even though they don't meet a strict "collision" requirement. In all cases, if there is potential conflict as to which object to designate as the target, the object with the highest object layer will be designated. The object with the highest layer is defined as the object that can overlap and overdraw other objects that it intersects.

Step 107. Is the target object (if any) a valid target for an action of the type $ACTION_X$? This step determines if the target object(s) can have the arrow logic (that belongs to the line which has been drawn as an arrow and recognized as such by the software) applied to it. Certain arrow logics require certain types of targets. As mentioned above, a "copy" logic (green arrow) does not require a target. A "control" logic (red arrow) recognizes only the object to which the tip of the arrow is intersecting or nearly intersecting as its target.

If the answer to Step 107 is yes, the process proceeds to Step 108. If no, the process proceeds to Step 110.

Step 108. Assemble a list, SOURCEOBJECTLIST, of all Blackspace objects colliding directly with, or closely with, or which are enclosed by, the rendered arrowshaft. This list includes all objects as they exist on the global drawing surface that are intersected or encircled by or nearly intersected by the drawn and recognized arrow object. They are placed in a list in memory, called for example, the "SOURCEOBJECTLIST" for this recognized and rendered arrow.

Step 109. Remove from SOURCEOBJECTLIST, objects which currently or unconditionally indicate they are not valid sources for an action of type $ACTION_X$ with the target TARGETOBJECT. Different arrow logics have different conditions in which they recognize objects that they determine as being valid sources for their arrow logic. The software analyzes all source objects on this list and then evaluates each listed object according to the implementation of the arrow logic to these sources and to the target(s), if any. All source objects which are not valid sources for a given arrow logic, which has been drawn between that object and a target object, will be removed from this list.

Once the arrowlogic is determined, the source object candidates can be examined. If the object, for one or more reasons (see below) has no proscribed interaction whatsoever as a source object for an arrowlogic action $ACTION_X$ with target, target, then it is removed from the list SOURCEOBJECTLIST of candidate objects.

Note that this step is not performed solely by examination of the properties or behaviors of any candidate source object in isolation: rather the decision to remove the object from SOURCEOBJECTLIST is made after one or more analyses of the user action in the context it was performed in relation to the object. That is to say, the nature of the arrow action $ACTION_X$ and the identified target of the drawn arrow may, and usually are, considered when determining the validity of an object as a source for the arrowlogic-derived $ACTION_X$.

These analyses may include, but are not limited to, one or more of the following:

1. Can the object be a source for the action $ACTION_X$ regardless of the target? The object will be removed from SOURCEOBJECTLIST if:

A) The TYPE, and by implication, the behavior of the object does not support the action, or have the property specified by, $ACTION_X$
    B) The user has unconditionally inhibited $ACTION_X$ for this source object, e.g., by setting "Allow Assign" to off and $ACTION_X$ is an assignment. Setting "Allow Assign" for any object prevents that object from being assigned to any other object.
    C) The object requires that none of its contained objects are intersected or encircled by the drawn arrow for the action $ACTION_X$, and there are one or more of these contained objects in the SOURCEOBJECTLIST. This allows, for a given action, contained objects to be selected as sources by intersection or encirclement, without the inclusion of their containing objects, which ostensibly are also intersected by the drawn arrow. The containing objects are removed, leaving only the contained objects as source candidates. A VDACC object is an example of such an object, although the requirement that none of its contained objects are intersected only applies for certain arrowlogics and their proscribed actions. For information regarding VDACC objects, see pending U.S. patent application Ser. No. 10/671,953, entitled "Intuitive Graphic User Interface with Universal tools", filed on Sep. 26, 2003.

2. Can the object be a source for the action $ACTION_X$ with target TARGETOBJECT? The object will be removed from SOURCEOBJECTLIST if:

A) The TYPE, and by implication, the behavior of TARGETOBJECT does not support the action $ACTION_X$ for the source object in question, or have the property specified by $ACTION_X$, or if user has explicitly prohibited the action in such situations.
    B) It is required, that for the action $ACTION_X$, source objects cannot contain TARGETOBJECT, and that this object does indeed contain TARGETOBJECT. A VDACC object is an example of such an object, although the requirement that it does not contain TARGETOBJECT only applies for certain arrowlogics and their proscribed actions.

Figure 48:
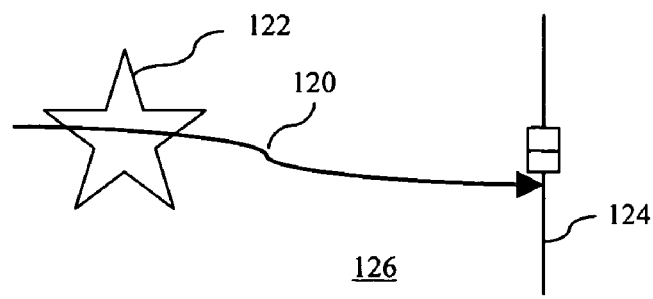
FIG. 48 illustrates an example in which a source object, e.g., a star, is removed from a source object list in accordance with an embodiment of the invention.

The removal of object(s) from SOURCEOBJECTLIST for different situations is illustrated using the following examples. In a first example, which is shown in FIG. 48, a red arrow 120 is drawn from a blue star 122 to a fader 124 in a Blackspace environment 126. A red arrow is currently designated to mean a control logic. The base action of a control logic can be defined as: "valid source object(s) for this arrow are linked to valid target object(s) for this arrow." The permission to support multiple source or target objects for this arrow logic is dependent upon various contexts and various behaviors and properties of the objects being intersected by this arrow. In this example, the fader 124 is a valid target for $ACTION_X$, which in this case is to create links between object behaviors and/or properties, and the fader 124 will have been identified as the TARGETOBJECT.

Before analysis, SOURCEOBJECTLIST will contain the star 122. However, the star 122 has no behavior to be linked, and therefore cannot be a source. It will be removed from SOURCEOBJECTLIST according to analysis 1A as described above.

Figure 49:
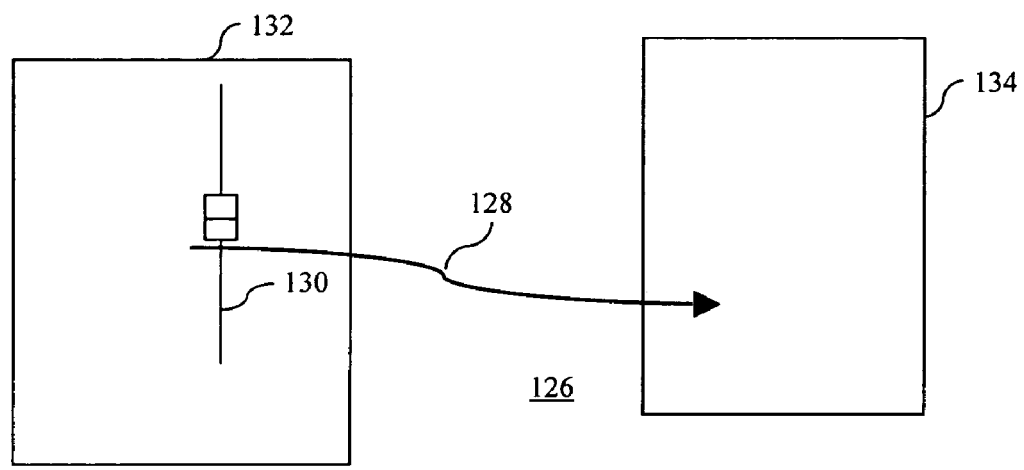
FIG. 49 illustrates an example in which a source object, e.g., a VDACC object, is removed from a source object list in accordance with an embodiment of the invention.

In a second example, which is shown in FIG. 49, a green arrow 128 is drawn from a fader 130 in a VDACC object 132 to empty space in another VDACC object 134 in the Blackspace environment 126. A green arrow is currently designated to mean a copy action. A base action of a copy logic can be described as: "valid source objects for this arrow are copied and placed at a location starting at the location of the tip of the arrow head of the drawn copy arrow. Furthermore, the number of copies and the angular direction of the copies is controlled by a user-defined input."

Before analysis, SOURCEOBJECTLIST will contain the facer 130 and the VDACC object 132. A copy action of this class requires no target object (the copies are placed at the screen point indicated by the arrowhead, regardless), but analysis 1C as described above will, for a copy action, cause the VDACC object 132 to be removed from SOURCEOBJECTLIST because SOURCEOBJECTLIST contains one of the VDACC object's contained objects, namely the fader 130.

Figure 50:
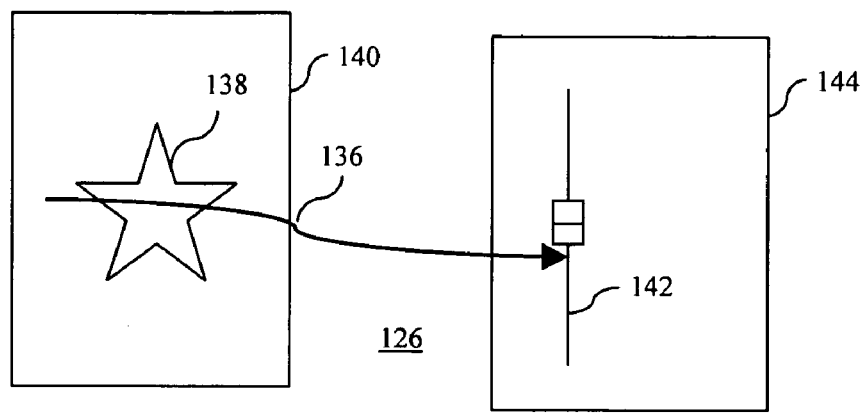
FIG. 50 illustrates an example in which a source object, e.g., a VDACC object, is selectively removed from a source object list in accordance with an embodiment of the invention.

In a third example, which is shown in FIG. 50, a yellow arrow 136 is drawn from a fader 138 in a VDACC object 140 to a blue star 142 in another VDACC object 144 in the Blackspace environment 126. A yellow arrow is currently designated to mean assignment. A base assignment logic can be defined as: "valid source objects for this arrow are assigned to a valid target object for this arrow." The nature of an assignment can take different forms. One such form is that upon the completion of an assignment, the valid source objects disappear from view onscreen. Then after a user action, e.g., clicking on the target object, these source objects reappear. Furthermore, modifications to these source objects, for instance, changes in their location or action, functions and/or relationships will be automatically updated by the assignment. $ACTION_x$ in this case is to assign the source objects to the target.

Before analysis, SOURCEOBJECTLIST will contain the fader 138, the VDACC objects 140 and 144, and TARGETOBJECT will be star 142, which is contained by the VDACC object 144. Analysis 2B as described above will cause the VDACC object 144 to be removed from SOURCEOBJECTLIST because for an assignment action, any container of TARGETOBJECT is disallowed as a source. Note that the VDACC object 140 is not removed, because a source object can contain other source candidates for an assignment action.

Figure 51:
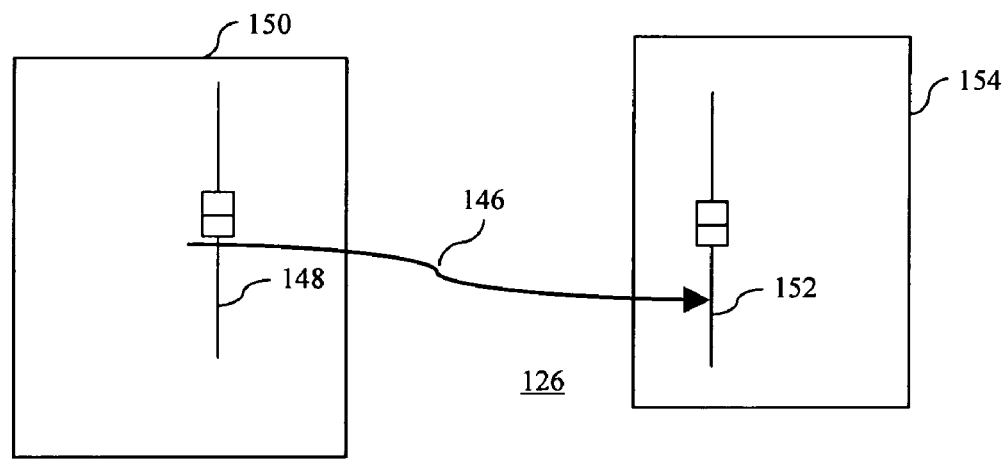
FIG. 51 illustrates an example in which source objects, e.g., VDACC objects, are removed from a source object list in accordance with an embodiment of the invention.

In a fourth example, which is shown in FIG. 51, a red arrow 146 is drawn from a fader 148 in a VDACC object 150 to a fader 152 in another VDACC object 154. A red arrow is currently designated to mean a control logic. $ACTION_x$ in this case is to create links between object behaviors or properties.

Before analysis SOURCEOBJECTLIST will contain the fader 148 and the VDACC objects 150 and 154, and TARGETOBJECT is the fader 152, which is contained by the VDACC object 154.

Analysis 1C as described above will cause the VDACC object 150 to be removed from SOURCEOBJECTLIST because SOURCEOBJECTLIST contains one of the VDACC object's contained objects, namely the fader 148. For a control logic-derived action, this is not allowed.

Analysis 2B as described above will cause the VDACC object 154 to be removed from SOURCEOBJECTLIST because for a control logic-derived action, any container of TARGETOBJECT is disallowed as a source.

Note the difference between the third and fourth examples: the color of the drawn arrow, and therefore the interpreted arrow logic and designated action, has caused a different analysis of SOURCEOBJECTLIST. This has led to the final filtered SOURCEOBJECTLIST for the third example being different to that of the fourth example, although the relative layout of the screen objects under consideration is extremely similar.

Step 110. Does SOURCEOBJECTLIST now contain any objects? If any source objects qualify as being valid for the type of arrow logic belonging to the drawn and recognized arrow that intersected or nearly intersected them, and such logic is valid for the type of target object(s) intersected by this arrow, then these source objects will remain in the SOURCEOBJECTLIST.

If the answer to Step 110 is yes, the process proceeds to Step 111. If no, the process proceeds to Step 114.

Step 111. Does the action "$ACTION_x$" allow multiple source objects? A test is done to query the type of arrow logic belonging to the drawn and recognized arrow to determine if the action of its arrow logic permits multiple source objects to be intersected or nearly intersected by its shaft.

If the answer to Step 111 is yes, the process proceeds to Step 113. If no, the process proceeds to Step 112.

Step 112. Remove from SOURCEOBJECTLIST all objects except the one closest to the rendered arrowshaft start position. In this case, the recognized arrow logic can have only a single source. So the software determines that the colliding object which is closest to the drawn and recognized arrow's start position is the source object and then removes all other source objects that collide with its shaft.

NOTE: Certain types of arrow logics require certain types of sources. For instance, if a red "control" arrow is drawn to intersect four switches and then drawn to point to blank Blackspace surface (an area on the global drawing surface where no objects exist), then no valid sources will exist and no arrow logic will be applied. The "red" logic will be considered invalid. It's invalid because although the source objects are correct for this type of arrow logic, a suitable target object must exist for the "control" logic to be valid in the absence of a context that would override this requirement. If however, this same red arrow is drawn to intersect these same four switches and then the tip of the arrow also intersects or nearly intersects a fifth switch (a valid target for this logic), then the red arrow logic recognizes the first intersected switch only as its source and the last intersected switch only as the target. The other intersected switches that appeared on the "SOURCEOBJECTLIST" will be removed.

Step 113. Set the rendered arrow as Actionable with the action defined as $ACTION_x$. After step 112, the required action has been identified and has not been immediately implemented because it awaits an input from a user. As an example, identifying the action would be to have the arrowhead of the drawn and recognized arrow turn white (see Step 115). An example of input from a user would be requiring them to click on the white arrowhead to activate the logic of the drawn and recognized arrow (see Steps 115–118).

Step 114. Redraw above all existing Blackspace objects an enhanced or "idealized" arrow of COLOR and STYLE in place of the original drawn stroke. If an arrow logic is not deemed to be valid for any reason, the drawn arrow is still recognized, but rendered onscreen as a graphic object only. The rendering of this arrow object includes the redrawing of it by the software in an idealized form as a computer generated arrow with a shaft and arrow head equaling the color and line style that were used to draw the arrow.

Step 115. Redraw above all existing Blackspace objects, an enhanced or "idealized" arrow of COLOR and STYLE with the arrowhead filled white in place of the original drawn stroke. After the arrow logic is deemed to be valid for both its source(s) and target object(s), then the arrowhead of the drawn and recognized arrow will turn white. This lets a user decide if they wish to complete the implementation of the arrow logic for the currently designated source object(s) and target object(s).

Step 116. The user has clicked on the white-filled arrowhead of an Actionable rendered arrow. The user places their mouse cursor over the white arrowhead of the drawn and recognized arrow and then performs a mouse downclick.

Step 117. Perform using $ACTION_X$ on source objects "SOURCEOBJECTLIST" with target "TARGETOBJECT" if any. After receiving a mouse downclick on the white arrowhead, the software performs the action of the arrow logic on the source object(s) and the target object(s) as defined by the arrow logic.

Step 118. Remove the rendered arrow from the display. After the arrow logic is performed under Step 117, the arrow is removed from being onscreen and no longer appears on the global drawing surface. This removal is not graphical only. The arrow is removed and no longer exists in time. However, the result of its action being performed on its source and target object(s) remains.

Figure 52A:
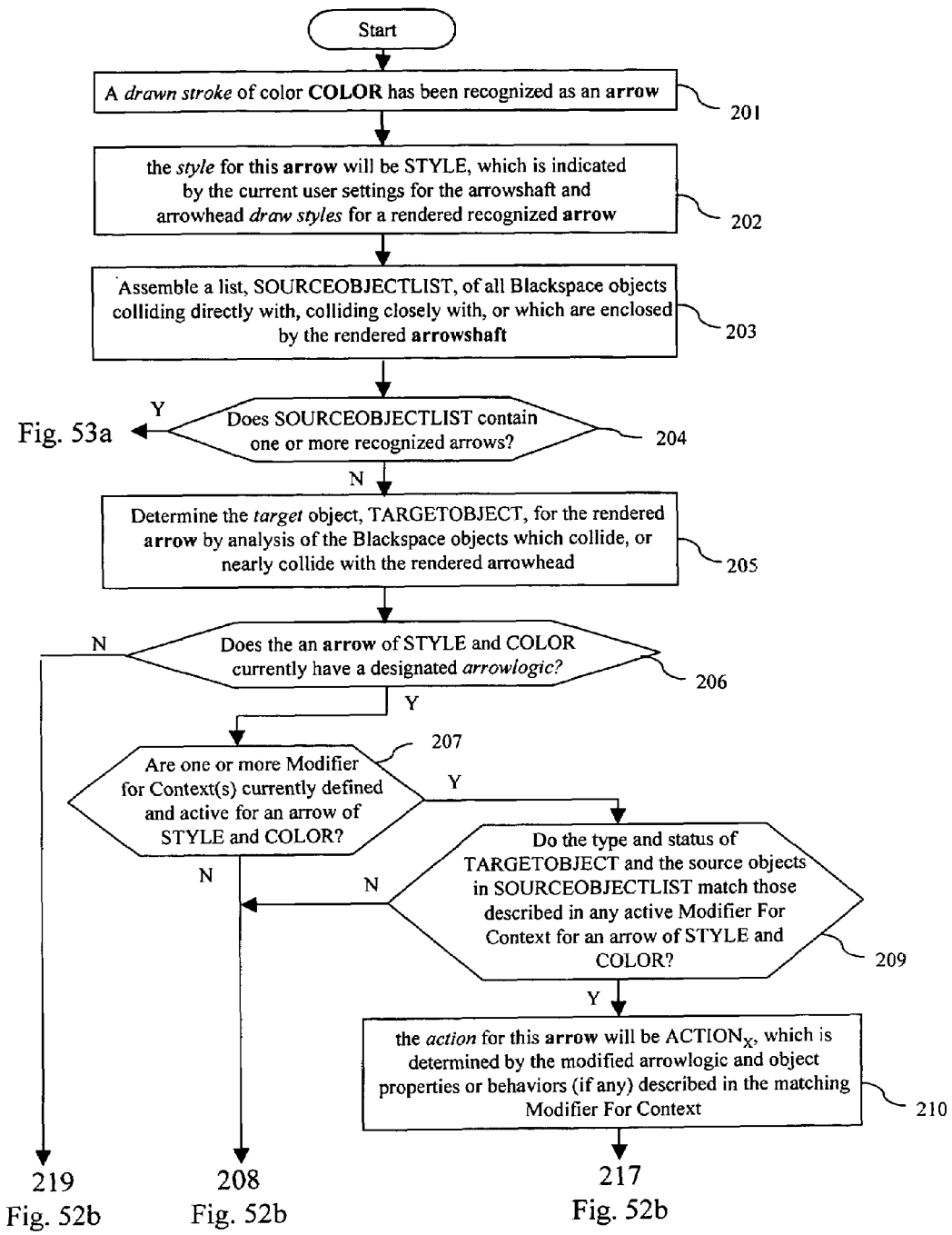
Figure 52C:
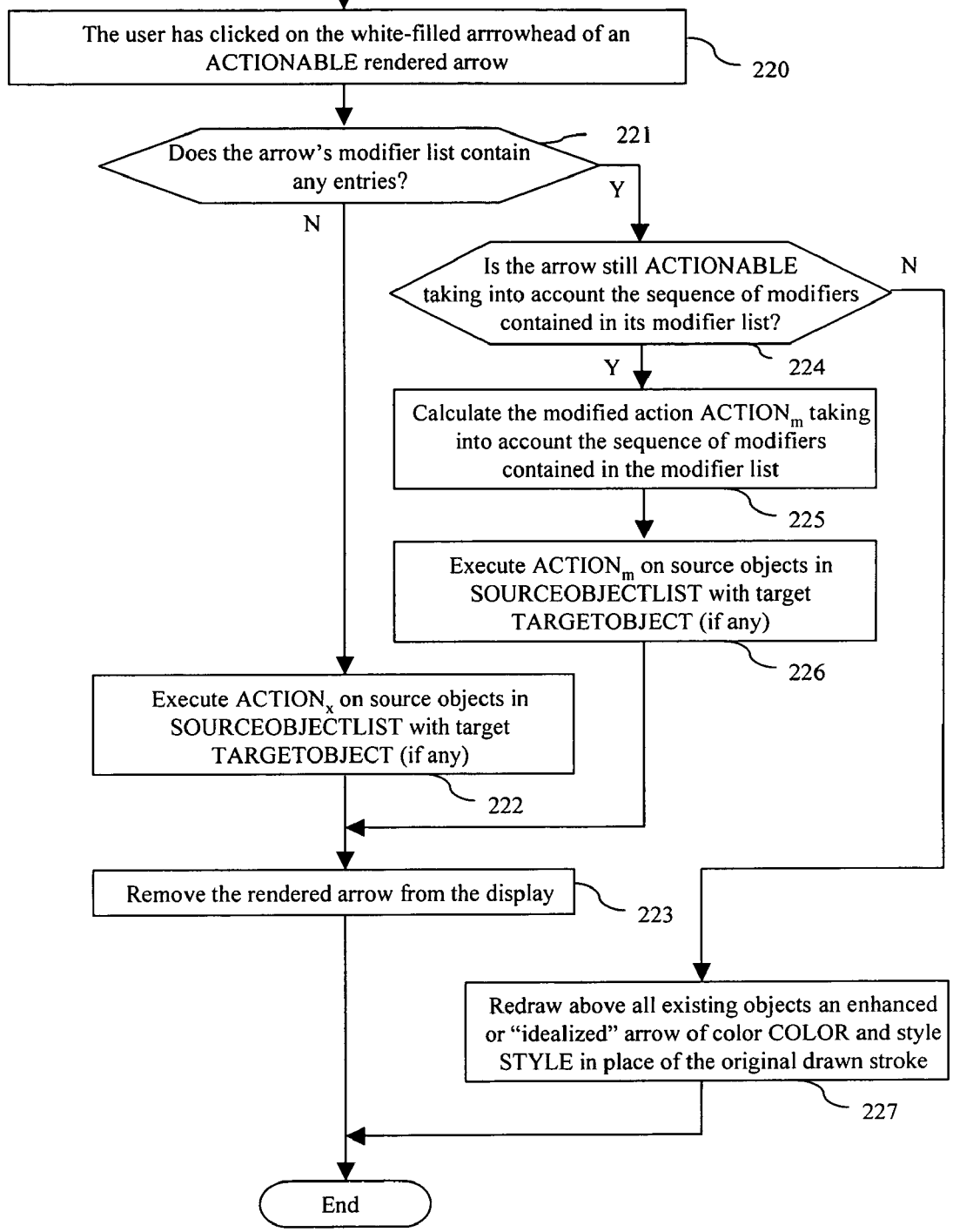

With reference to the flowchart of FIGS. 52a, 52b and 52c, the process for creating and interpreting an arrow with due regard to Modifiers and Modifier Contexts is now described.

Step 201. A drawn stroke of color COLOR has been recognized as an arrow—a mouse down has occurred, a drawn stroke (one or more mouse movements) has occurred, and a mouse up has occurred. This stroke is of a user-chosen color. The color is one of the factors that determine the action ("arrow logic") of the arrow. In other words, a red arrow can have one type of action (behavior) and a yellow arrow can have another type of action (behavior) designated for it.

Step 202. The style for this arrow will be "STYLE"—This is a user-defined parameter for the type of line used to draw the arrow. Types include: dashed, dotted, slotted, shaded, 3D, etc.

Step 203. Assemble a list, SOURCEOBJECTLIST, of all Blackspace objects colliding directly with, or closely with, or which are enclosed by, the rendered arrowshaft." This list includes all objects as they exist on the global drawing surface that are intersected or encircled by or nearly intersected by the drawn and recognized arrow object. They are placed in a list in memory, called for example, the "SOURCEOBJECTLIST" for this recognized and rendered arrow.

Step 204. Does SOURCELISTOBJECTLIST contain one or more recognized arrow? If existing recognized arrows are intersected by a newly drawn arrow, the newly drawn arrow will be interpreted as a modifier arrow. This process is described below with reference to the flowchart of FIGS. 53a, 53b and 53c. Note: an existing drawn and recognized arrow could be one that does not itself have a designated arrow logic. In this case, a modifier arrow could as part of it behavior and/or action modification provide a situation where the original arrow has a functional arrow logic. For the purposes of this flow chart, it is assumed that the modifier arrow is intersecting an arrow that has a designated arrow logic.

Figure 53A:
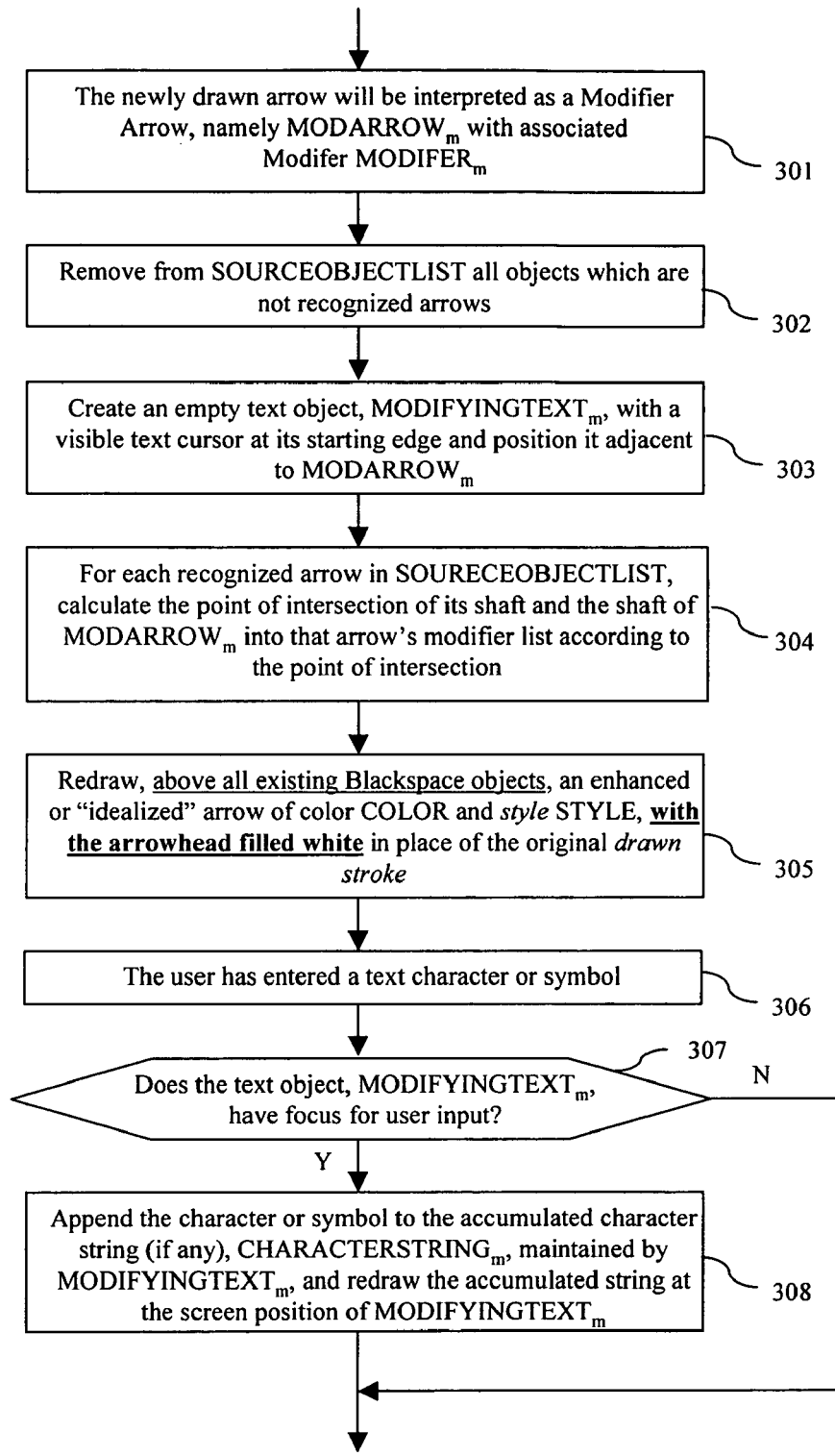
FIGS. 53a, 53b and 53c show a flowchart of a process for creating and interpreting a modifier arrow in accordance with an embodiment of the invention.

If the answer to Step 204 is yes, the process proceeds to FIG. 53a. If no, the process proceeds to Step 205.

Step 205. Determine the target object TARGETOBJECT for the rendered arrow by analysis of the Blackspace objects which collide or nearly collide with the rendered arrowhead. The software looks at the position of the arrowhead on the global drawing surface and determines which objects, if any, collide with it. The determination of a collision can be set in the software to require an actual intersection or distance from the tip of the arrowhead to the edge of an object that is deemed to be a collision. Furthermore, if no directly colliding objects are found, preference may or may not be given to objects which do not collide in close proximity, but which are near to the arrowhead (and its shaft), and are more closely aligned to the direction of the arrowhead than other surrounding objects. In other words, objects which are situated on the axis of the arrowhead may be chosen as targets even though they don't meet a strict "collision" requirement. In all cases, if there is potential conflict as to which object to designate as the target, the object with the highest object layer can be designated. The object with the highest layer is defined as the object that can overlap and overdraw other objects that it intersects.

Step 206. Does an arrow of STYLE and COLOR currently have a designated arrowlogic? This is a test to see if an arrow logic has been created for a given color and/or line style. The software searches for a match to the style and color of the drawn arrow to determine if a behavior can be found that has been designated for that color and/or line style. Note: This designation can be a software default or a user-defined parameter.

If the answer to Step 206 is yes, the process proceeds to Step 207. If no, the process proceeds to Step 219.

Step 207. Are one or more Modifier For Context(s) currently defined and active for an arrow of STYLE and COLOR? See step 318 in the flowchart of FIGS. 53a, 53b and 53c C for details of Modifier for Context. In this step the software looks for a match with any Modifier for Context that has the same style and color of the drawn and recognized arrow. In this step, only the color and style are matched. Note: it would be possible to skip Step 207 and use only a modified Step 209 (that would include the provisions of Step 207) for this flowchart. Step 207 is here to provide a simple test that can act as a determining factor in going to Step 208 or 209.

Step 209. Do the types and status of TARGETOBJECT and the source objects in SOURCEOBJECTLIST match those described in any active Modifier For Context for arrow of STYLE and COLOR? This is described in detail under Step 318 of the flowchart of FIGS. 53a, 53b and 53c. Step 209 takes each Modifier for Context that has been found under Step 207 (where there is match for color and style with the drawn and recognized arrow). Then it compares the types and relevant status of the source and target objects recorded in these Modifier for Contexts and compares them with the types and relevant status of the source and target objects of the drawn and recognized arrow. In the simplest case, what the software is looking for is an exact match between the types and status of the source and target objects of both a Modifier for Context and the recognized drawn arrow.

If the answer to Step 209 is yes, the process proceeds to Step 217. If no, the process proceeds to Step 208.

Note: in practical usage of this invention, an exact match is not necessarily what the user wants because its definition may be too precise and therefore too narrow in scope. The solution is to permit a user to specify further criteria (which can effectively broaden the possible matches) that can be used to further define a match for "types" and/or "statuses" of the target and/or source objects of the Modifier for Context.

If more than one perfect match is found (this will not generally be the case), then the software will automatically search for additional types and status elements which can be user selected for this automatic search or be contained in the software as a default. Alternately, the user can be prompted by a pop up menu to make manual on-the-fly selections for match items to alter the search and matching process.

Step 210. The action for this arrow will be $ACTION_X$ which is determined by the modified arrowlogic and object properties or behaviors (if any) described in the matching Modifier for Context. A Modifier for Context has been found and it has been used to modify the behavior of the first drawn arrow (the drawn and recognized arrow and its arrow logic). If Step 210 is not executed, then $ACTION_X$ is derived from the defined action/behavior of the modifier arrow and the first drawn arrow. If Step 210 is executed, then $ACTION_X$ is a modified action, defined additionally by the Modifier for Context.

Step 208. The action for this arrow will be $ACTION_X$, which is determined by the current designated action for a recognized drawn arrow of COLOR and STYLE. If there is an action for this arrow, then the software looks up the available actions and determines that such an action exists (is provided for in the software) for this color and/or style of line when used to draw a recognized arrow. In this step the action of this arrow is determined.

Step 211. Does an action of type $ACTION_X$ require a target object for its enactment? See Step 105 of FIG. 47a, described above.

If the answer to Step 211 is yes, the process proceeds to Step 212. If no, the process proceeds to Step 213.

Step 212. Is the target object (if any) a valid target for an action of the type $ACTION_X$? See Step 107 of FIG. 47a, described above.

If the answer to Step 212 is yes, the process proceeds to Step 213. If no, the process proceeds to Step 219.

Step 213. Remove from SOURCEOBJECTLIST, objects which currently or unconditionally indicate they are not valid sources for an action of type $ACTION_X$ with the target TARGETOBJECT. See Step 109 of FIG. 47a, described above.

Step 214. Does SOURCEOBJECTLIST now contain any objects? See Step 110 of FIG. 47b, described above.

If the answer to Step 214 is yes, the process proceeds to Step 215. If no, the process proceeds to Step 219.

Step 215. Does the action "$ACTION_X$" allow multiple source objects? See Step 111 of FIG. 47b, described above.

If the answer to Step 215 is yes, the process proceeds to Step 216. If no, the process proceeds to Step 219.

Step 216. Remove from SOURCEOBJECTLIST all objects except the one closest to the rendered arrowshaft start position. See Step 112 of FIG. 47b, described above.

Step 217. Set the rendered arrow as Actionable with the action defined as $ACTION_X$. See Step 113 of FIG. 47b, described above.

Step 218. Redraw above all existing Blackspace objects, an enhanced or "idealized" arrow of COLOR and STYLE with the arrowhead filled white in place of the original drawn stroke. See Step 115 of FIG. 47b, described above.

Step 219. Redraw above all existing Blackspace objects an enhanced or "idealized" arrow of COLOR and STYLE in place of the original drawn stroke. See Step 114 of FIG. 47b, described above.

Step 220. The user has clicked on the white-filled arrowhead of an Actionable rendered arrow. See Step 116 of FIG. 47b, described above.

Step 221. Does the arrow's modifier list contain any entries? This is test to see if the first drawn arrow has been intersected by a modifier arrow with a modifier and that this modifier has been placed in the modifier list of the first drawn arrow. The definition of "modifier" is described below with reference to the flowchart of FIGS. 53a, 53b and 53c.

If the answer to Step 221 is yes, the process proceeds to Step 224. If no, the process proceeds to Step 222.

Step 222. Execute $ACTION_X$ on source objects in SOURCEOBJECTLIST with target TARGETOBJECT (if any). See Step 117 of FIG. 47b, described above. $ACTION_X$ is executed for the source and/or target objects of the first drawn arrow.

Step 223. Remove the rendered arrow from the display. See Step 118 of FIG. 47b, described above.

Step 224. Is the arrow still actionable, taking into account the sequence of modifiers contained in its modifier list? After the software performs a combined analysis of the original arrow logic and the modifiers contained in its list, a determination is made as to whether the arrow logic is valid. In this step the software rechecks that the source(s) and target(s) for the arrow logic that is about to implemented are still in place and are still valid.

Let's say that you have a red arrow with a control logic designated for it. This arrow intersects two faders. The first fader is the source object and the second fader is the target object. There is a modifier arrow intersecting this first drawn arrow and the user has typed the text "50%" for this modifier arrow. If at this point in time the user clicks on the white arrowhead for the first drawn or modifier arrow, the arrow logic will be implemented.

If however, before clicking on either white arrowhead, an external object (like a remote fader whose property and status can only be determined by periodic polling), has changed its status and has not yet been updated by the polling of the software, and this change causes the source and/or target objects of the first drawn arrow to become invalid, the software would force an updated status of the remote fader and thus discover that the arrow logic of the first drawn arrow is no longer valid.

What this step is doing is simply rechecking all of the conditions that are required to maintain a valid arrow logic once a white arrowhead has been clicked. Thus the system is able to deal with asynchronously updated remote objects which are external to the software's immediate control. Under normal circumstances Step 224 will not be needed, especially if the software is dealing with objects that are entirely controlled by the local system.

If the answer to Step 204 is yes, the process proceeds to Step 225. If no, the process proceeds to Step 227.

Step 225. Calculate the modified action $ACTION_m$ taking into account the sequence of modifiers contained in the modifier list. The arrow logic is modified according to the valid modifiers in the modifier list of the first drawn arrow.

Step 226. Execute $ACTION_m$ on source objects in SOURCEOBJECTLIST with target TARGETOBJECT (if any). Execute the modified action. This is the same as Step 222, except here the software is executing the modified action described in Step 225.

Step 227. Redraw above all existing objects an enhance or "idealized" arrow of COLOR and STYLE in place of the original drawn stroke. The first drawn arrow has been redrawn where its arrowhead is not white, but is the color of its shaft. This indicates to the user that the modifiers of the first drawn arrow's arrow logic have resulted in an invalid arrow logic. This redrawn arrow shows the invalid arrow logic status of this arrow to the user.

Figure 53B:
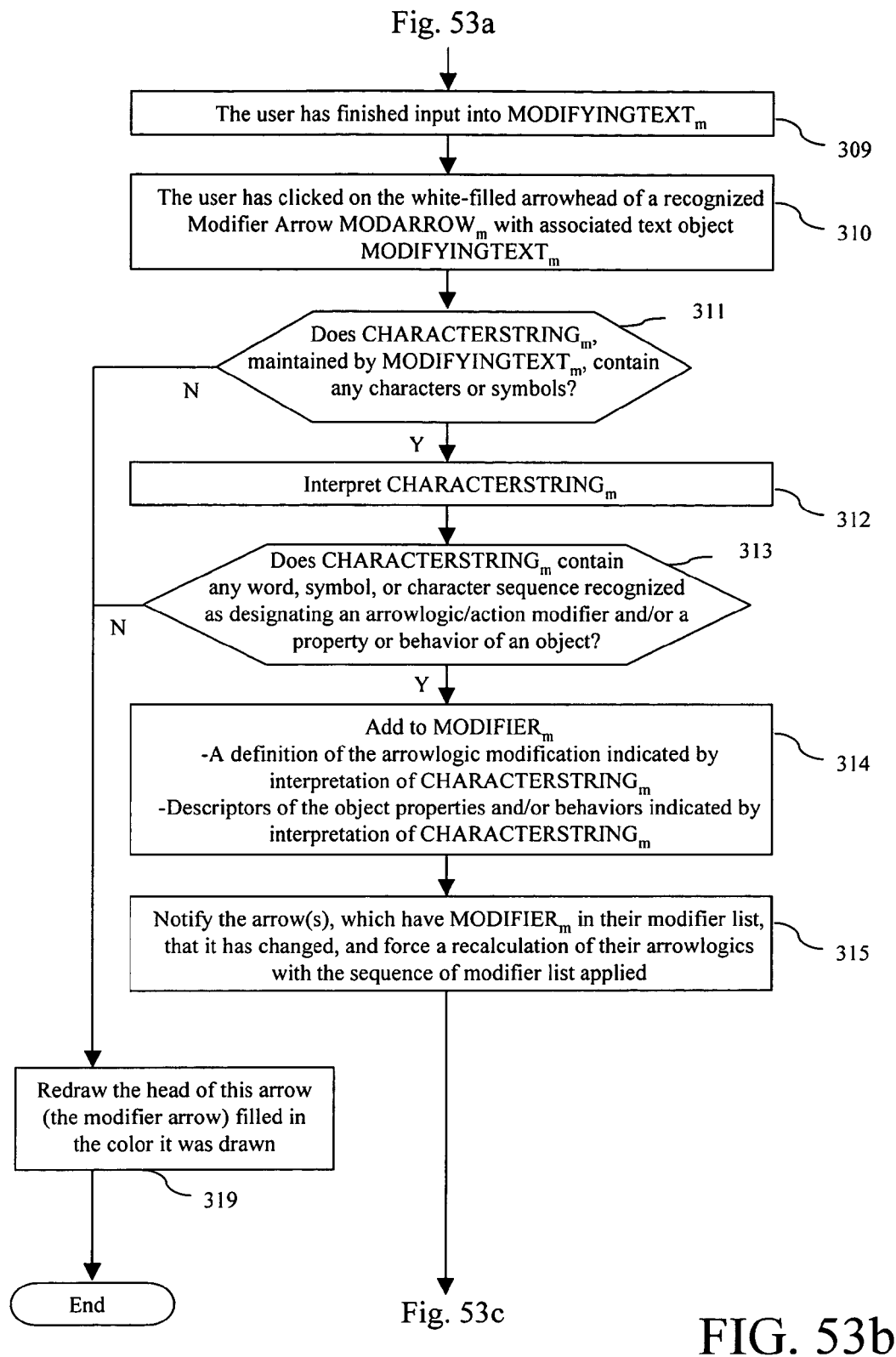
Figure 53C:
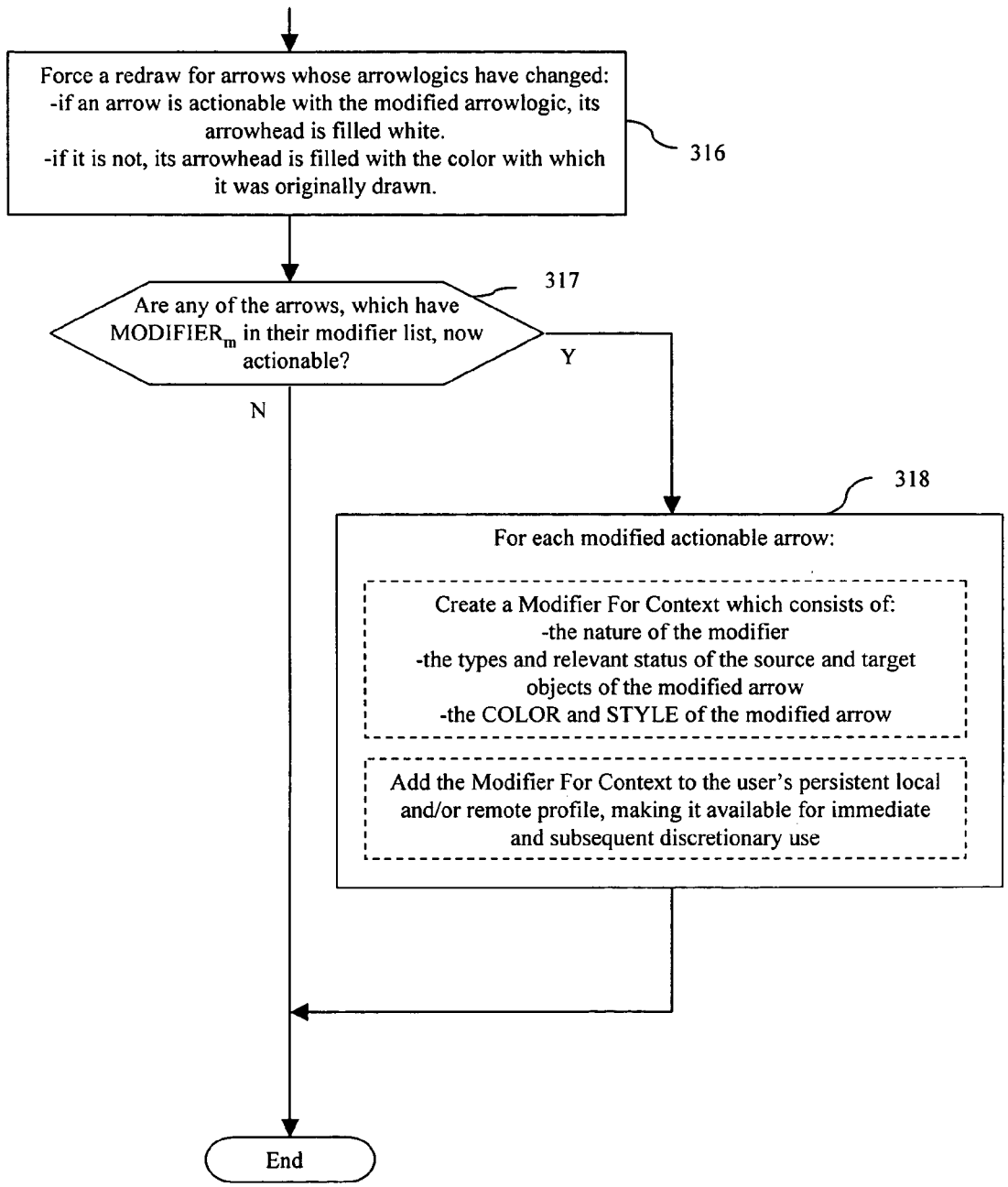

The process of creating and interpreting a modifier arrow is now described with reference to the flowchart of FIGS. 53a, 53b and 53c, which begins from Step 204 of FIG. 53a when SOURCEOBJECTLIST does contain one or more recognized arrows.

Step 301. The newly drawn arrow will be interpreted as a Modifier Arrow, namely MODARROW$_m$ with associated Modifier MODIFIER$_m$. An arrow is drawn and recognized such that its shaft intersects the shaft of a first drawn arrow having a designated arrow logic. A modifier arrow can change the resultant action of a previously recognized arrow or arrows when drawn to intersect them before their interpreted (but latent) action has been executed. In other words, an invalid arrow logic can be made valid by the use of modifier arrow or a modifier context. Furthermore, a modifier arrow can retrospectively designate an action for previously recognized arrows, whose arrow logics, source object (s), and target object(s), when analyzed individually or collectively, result in their having no action when originally drawn.

Figure 54A:
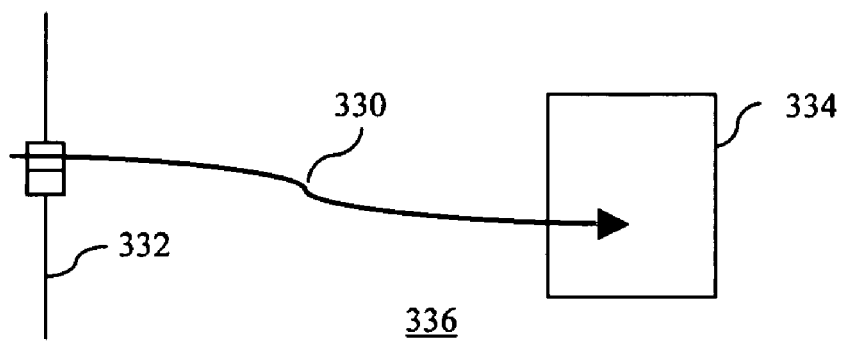
FIGS. 54a and 54b illustrate an example in which an invalid arrow logic of a first drawn arrow is validated by a modifier arrow in accordance with an embodiment of the invention.
Figure 54B:
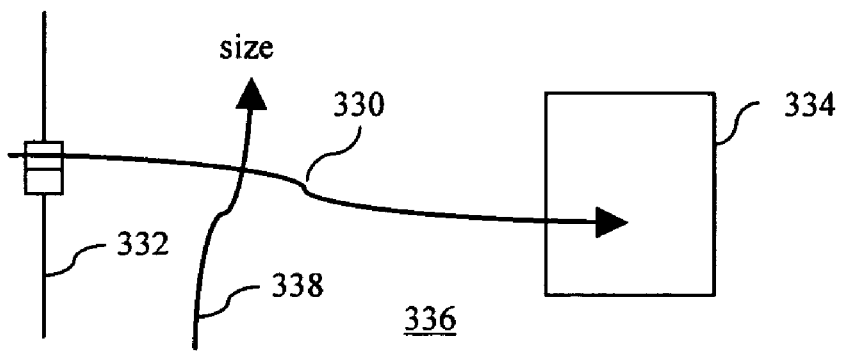

For example, as illustrated in FIG. 54a, let's say a user draws a red control arrow 330 that intersects a fader 332 and a red square 334 in a Blackspace environment 336. This would be an invalid implementation of this control arrow logic. However, as illustrated in FIG. 54b, if this user then drew a modifier arrow 338 that intersects this first drawn arrow 330 and types the word "size" for this modifier arrow, then the first drawn arrow logic becomes valid and can be implemented by the user.

Note: Generally, such a modifier arrow would be drawn prior to a user action, e.g., clicking on the white arrowhead of the first drawn arrow to initiate its arrow logic, but this is not always the case. Once an arrow logic has been implemented, the drawn and recognized arrow used to implement such arrow logic is removed from being onscreen. However, the action, function or other effect of its logic on its source and/or target object(s) remains. Furthermore, by invoking a "show arrow" function, the path of the originally drawn arrow, which was used to implement its arrow logic, can be shown on screen by a computer rendered graphic of a line or arrow or some other suitable graphic. This graphic can then be intersected by a drawn and recognized modifier arrow, which can in turn modify the behavior of the first drawn arrow's logic pertaining to its source and target objects.

Figure 55A:
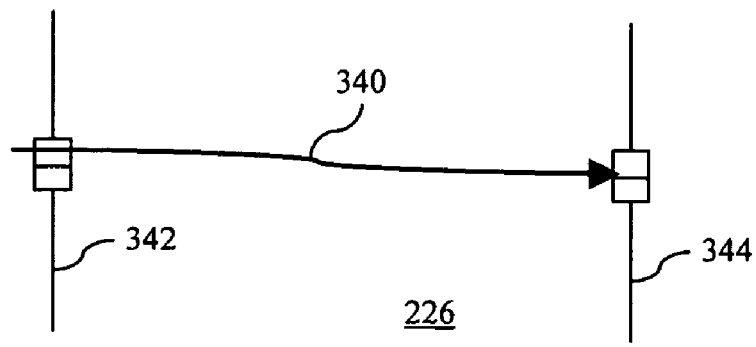
FIGS. 55a, 55b, 55c and 55d illustrate an example in which a valid arrow logic of a first drawn arrow is modified by a modifier arrow that intersects a representation of the first drawn arrow, which is displayed using a show arrow feature, in accordance with an embodiment of the invention.
Figure 55B:
Figure 55C:
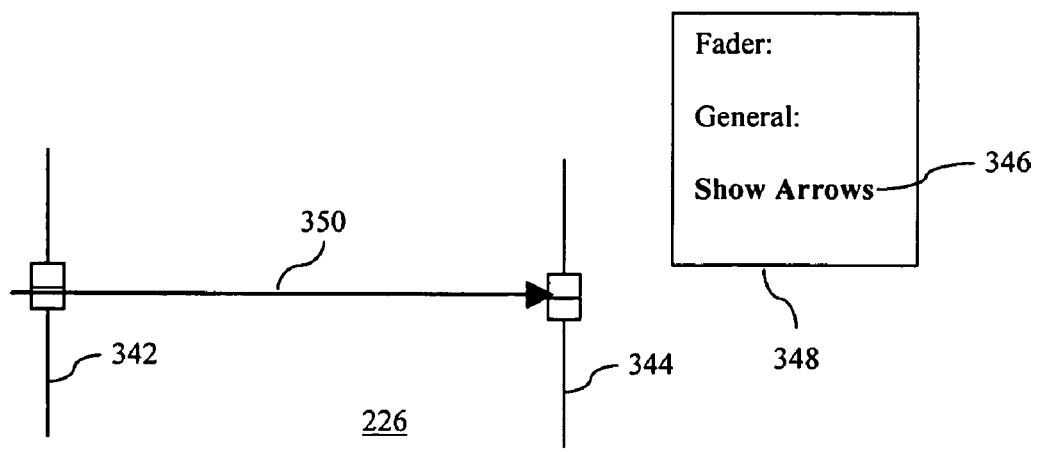
Figure 55D:
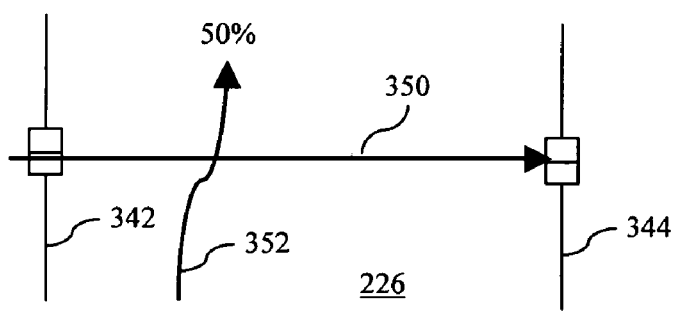

For example, as illustrated FIG. 55a, a red control arrow 340 is drawn from a fader 342 to a fader 344 in the Blackspace environment 226. In this case, the fader 342 is the source of the red arrow 340 and the fader 344 is the target of the red arrow. This is a valid arrow logic, and thus, the arrowhead of the red arrow 340 will turn white. Left-clicking on this white arrowhead implements the red control logic for this first drawn arrow 340. Now the source fader 342 controls the target fader 344. In other words, as the fader cap of the source fader 342 is moved, the fader cap of the target fader 344 is moved in sync with the fader cap of the source fader. When the white arrowhead is clicked on for a valid arrow logic such as the arrow logic for the red control arrow 340, the arrow disappears, as illustrated in FIG. 55b. Next, if the user right-clicks on either the source object (i.e., the fader 342) or the target object (i.e., the fader 344), and selects "Show Arrows" 346 in its Info Canvas object 348, a computer generated version 350 of the first drawn arrow (i.e., the red arrow 340) reappears intersecting the source and target objects that were originally intersected by the first drawn arrow. As illustrated in FIG. 55d, if the user now draws a modifier arrow 352 after the show arrow feature is engaged, and "50%" is entered as the characters for the modifier arrow, this causes the arrowheads of the modifier arrow and the computer generated arrow to turn white, as shown in FIG. 55d. The modifier arrow 352 and then entered characters of "50%" cause a modification of the control logic of the first drawn arrow 340. In this case, whatever the movements are made with the source fader's cap (the cap of the fader 342), 50% of those movements are applied to the movements of the target fader's cap (the cap of the fader 344). When either arrowhead is left-clicked on, the modified arrow logic is implemented.

Furthermore, such modifier arrow could be used to add additional source and/or target objects to the first drawn arrow's source object and target object list. Let's take the above example where the red control arrow 340 was drawn to intersect the fader 342 and 344. As stated above, this is a valid arrow logic. In this case, the first intersected fader 342 will become the source object and the second intersected fader 344 will become the target object.

Figure 56A:
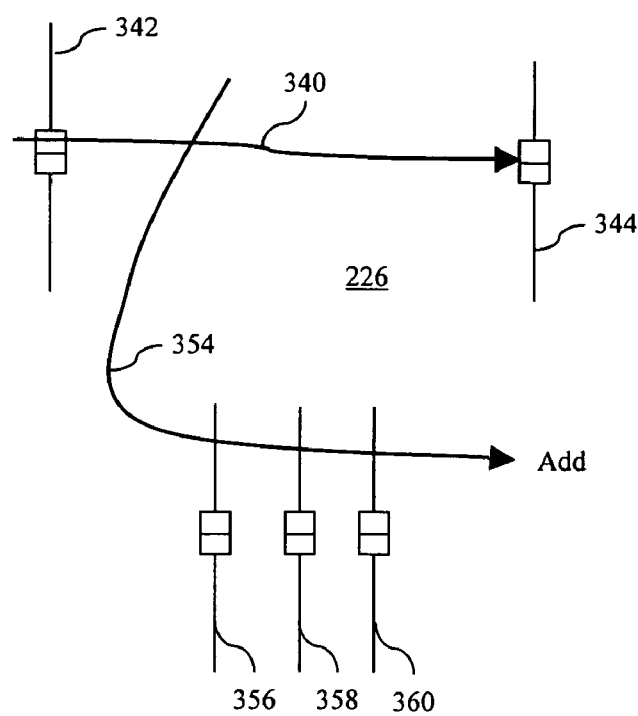
FIG. 56a illustrates an example in which additional objects, e.g., faders, are added to an arrow logic of a first drawn arrow using a modifier arrow in accordance with an embodiment of the invention.

Then, as illustrated in FIG. 56a, a modifier arrow 354 is drawn to intersect the first drawn arrow's shaft and to also intersect three additional faders 356, 358 and 360. (Note: this arrow could have also been drawn in the opposite direction to first intersect the faders and then intersect the first drawn arrow.) The modifier arrow 354 is recognized by the software and a text cursor appears onscreen. The characters "Add" are typed for this modifier arrow 354. These characters are a key word, which is recognized by the software as the equivalent of the action: "add all objects intersected by the modifier arrow as additional target objects for the first drawn arrow."

When this modifier text is entered (by hitting Enter key, Esc Key or its equivalent), the arrowhead of the modifier arrow 354 will change visually, e.g., turn white. Then left-clicking on either the white arrowhead of the first drawn arrow 340 or of the modifier arrow 354 will cause the addition of the three faders 356, 358 and 360 as targets for the source fader 342.

Note: if any of the intersected objects are not valid target objects for a control logic, then they will be automatically removed from the target object list of the first drawn arrow. But in this case, all three intersected objects 356, 358 and 360 are valid targets for the source fader 342 with a control logic, and they are added as valid target objects. Then, any movement of the source fader's cap will cause the fader caps of all four target faders 344, 356, 358 and 360 to be moved simultaneously by the same amount. Although the modifier arrow 354 was drawn to intersect the first drawn red control arrow 340 in this example, the modifier arrow may also have been drawn to intersect the computer generated arrow 350 of FIG. 55c, which is produce when the show arrow feature is engaged, to add the three faders 356, 358 and 360 as targets.

Step 302. Remove from SOURCEOBJECTLIST all objects which are not recognized arrows. This is one possible way to interpret a hand drawn input and as a modifier arrow. The SOURCEOBJECTLIST being referred to here is the list for the newly drawn modifier arrow. A condition that this step can provide for is the case where a newly drawn arrow is drawn to intersect a previously drawn and recognized arrow ("first drawn arrow"), where this first drawn arrow has an arrow logic and where the newly drawn arrow also intersects one or more other non-arrow objects. In this case, and in the absence of any further modifying contexts or their equivalents, these objects are removed from the SOURCEOBJECTLIST of the newly drawn arrow. The first draw arrow, which is being intersected by the modifier arrow, remains in the SOURCEOBJECTLIST for this newly modifier arrow. An alternative to this would be to disallow the newly drawn arrow as a modifier arrow because it intersects other objects that are not shafts of arrows that have designated arrow logics.

Step 303. Create an empty text object, MODIFYING-TEXT$_m$, with a visible text cursor at its starting edge and position it adjacent to MODARROW$_m$. User input is now required to determine the effect on the action(s) of the recognized arrow(s) it has intersected: the visibility of the text cursor adjacent to the modifier arrow's arrowhead when redrawn in Step 305 indicates that user input, for instance by typing characters or drawing symbols, is required to define of the modification of the actions of the intersected arrows.

Note: the location of this text cursor is generally near the tip of this modifier arrow's arrowhead, however, this text cursor could appear anywhere onscreen without compromising its function for the modifier arrow.

Step 304. For each recognized arrow in SOURCEOBJECTLIST, calculate the point of intersection of its shaft and the shaft of the MODARROW$_m$ into that arrow's modifier list according to the point of intersection. There can be modifier list for every drawn and recognized arrow. This list is normally empty. When a modifier arrow is drawn to intersect a recognized arrow's shaft and a valid modifier behavior, action, etc., is created by entering character(s) for that modifier arrow, then an entry is added to the modifier list of the arrow whose shaft is being intersected by the modifier arrow.

The point of intersection is compared to the positions and/or intersection points of the source objects for the existing recognized arrow. This enables, for certain arrow logic actions, the modification, MODIFIER$_m$, of the overall action (the final action of the arrow logic as modified by the modifier arrow) to apply selectively amongst its source objects according to their position relative to where the modifier arrow is drawn.

Furthermore, multiple modifier arrows may be drawn to intersect the same recognized arrow's shaft, enabling a different modification of the overall action to be applied to just one or more of that arrow's source objects. An example would be a first drawn arrow which intersects multiple source objects with its shaft. The first drawn arrow has a control logic designated for it. Then a modifier arrow is drawn to intersect this first drawn arrow's shaft at a point between two of the objects currently being intersected by this first drawn arrow's shaft. In this case, the source objects directly adjacent to the point of intersection of the modifier arrow with the first drawn arrow's shaft will be affected by that modifier arrow's change in behavior.

Figure 56B:
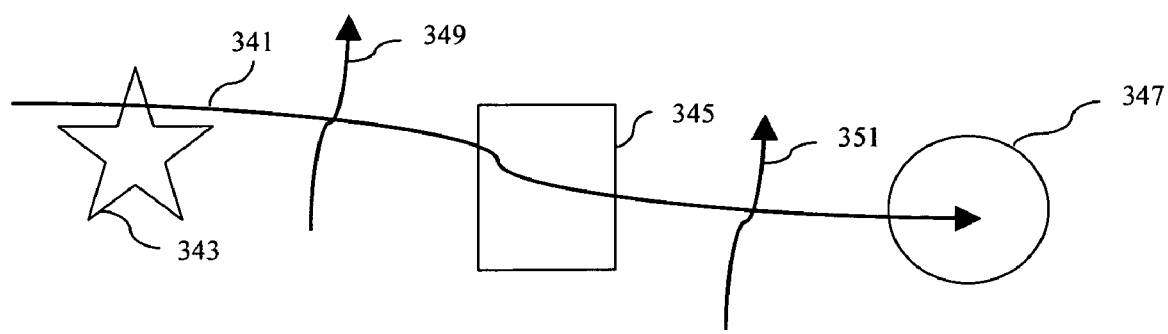
FIG. 56b illustrates an example in which modifier arrows are used to define an arrow logic of a first drawn arrow for particular graphic objects associated with the first drawn arrow in accordance with an embodiment of the invention.

For example, as illustrated in FIG. 56*b*, let's say a red control arrow 341 intersects a blue star 343, a green rectangle 345 and a yellow circle 347. Then a modifier arrow 349 is drawn to intersect the first drawn arrow 341 at a point somewhere between the blue star 343 and the green rectangle 345. In this case, the behavior and/or action of the modifier arrow 349 will apply only to the blue star 343 and the green rectangle 345 and not to the yellow circle 347. Similarly, if a second modifier arrow 351 is drawn somewhere between the green rectangle 345 and the yellow circle 347, the behaviour and/or action of the second modifier arrow 351 will apply only to the green rectangle and the yellow circle and not to the blue star 343. For more information, see simultaneously filed U.S. patent application entitled "System and Method for Creating and Playing a Tweening Animation using a Graphic Directional Indicator", which is specifically incorporated by reference herein.

Step 305. Redraw above all existing Blackspace objects, an enhanced or "idealized" arrow of COLOR and STYLE with the arrowhead filled white in place of the original drawn stroke. When a modifier arrow is drawn and recognized as intersecting the shaft of a first drawn arrow that has a valid arrow logic, the arrowhead for this modifier arrow has its appearance changed. This appearance can be any of a variety of possible graphics. One such change would be to have the arrowhead turn white. Other possibilities could include flashing, strobing, pulsing, or otherwise changing the appearance of the arrowhead of this arrow such that a user sees this indication onscreen.

Step 306. The user has entered a text character or symbol. Once the text cursor appears near a modifier arrow's head or elsewhere onscreen, a user enters text, e.g., by typing a letter, word, phrase or symbol(s) or the like onscreen using an alphanumeric keyboard or its equivalent. It would be possible to use various types of input indicators or enablers other than a text cursor. These could include verbal commands, hand drawn inputs where the inputs intersect the modifier arrow or are connected to that arrow via another drawn and recognized arrow or the like.

Note: The input of user data or other types of data to define a modifier arrow are not limited to the use of a text cursor. This is for example only. Steps 306 through 308 show one kind of example of user input, namely typing on a keyboard. An alternate would be to convert speech input to text or convert hand drawn images to text. One method of doing this would be to use recognized objects that have a known action assigned to them or to a combination of their shape and a color.

Step 307. Does the text object MODIFYINGTEXT$_m$ have focus for user input? This provides that the text cursor that permits input data for a specific modifier arrow is active for that arrow. In a Blackspace environment, for instance, it is possible to have more than one cursor active onscreen at once. In this case, this step checks to see that the text cursor for the modifier arrow is the active cursor and that it will result in placing text and/or symbols onscreen for that modifier arrow.

If the answer to Step 307 is yes, the process proceeds to Step 308. If no, the process proceeds to Step 310.

Step 308. Append the character or symbol to the accumulated character string CHARACTERSTRING$_m$ (if any), maintained by MODIFYINGTEXT$_m$, and redraw the accumulated string at the screen position of MODIFYINGTEXT$_m$. As each new character is typed, using the cursor for the modifier arrow, each character is placed onscreen as part of the defining character(s) for that modifier arrow.

Step 309. The user has finished input into MODIFYINGTEXT$_m$. This is a check to see if the user has entered a suitable text object or symbol(s) or the like for the modifier arrow. Finishing this user input could involve hitting a key on the alphanumeric keyboard, such as an Enter key or Esc key or its equivalent. Or it could entail a verbal command and any other suitable action to indicate that the user has finished their text input for the modifier arrow.

Step 310. The user has clicked on the white-filled arrowhead of a recognized Modifier Arrow MODARROW$_m$ with associated text object MODIFYINGTEXT$_m$. To implement the action, function, behavior and the like of a modifier arrow, a user clicks on the arrowhead of the arrow. Other actions can be used to activate a modifier arrow. They can include clicking on the arrowhead of the first drawn arrow, double-clicking on either arrow's shaft, activating a switch that has a know function such as "activate arrow function" or the like, and any other suitable action that can cause the implementation of the modifier arrow.

Step 311. Does CHARACTERSTRING$_m$, maintained by MODIFYINGTEXT$_m$, contain any characters or symbols? The character string is a sequence of character codes in the software. It is contained within the MODIFYINGTEXT$_m$. The MODIFYINGTEXT$_m$ is a text object that is more than a sequence of character codes. It also has properties, like font information and color information, etc. According to this step, if a user types no text or symbols, etc., then the modifier arrow is invalid.

Step 312. Interpret CHARACTERSTRING$_m$. These character(s) are interpreted by the software as having meaning. The software supports various words, phrases, etc., as designating various actions, functions or other appropriate known results, plus words that act as properties. Such properties in and of themselves may not be considered an action, but rather a condition or context that permits a certain action or behavior to be valid. These known words, phrases and the like could also include all known properties of an object. These could include things like size, color, condition, etc. These properties could also include things like the need for a security clearance or the presence of a zip code. A zip code could be a known word to be used to categorize or call up a list of names, addresses, etc. A property of someone's name could be his/her zip code. Properties can be anything that further defines an object.

As previously mentioned, a modifier arrow can be used to change or add to the properties of an object such that a given arrow logic can become valid when using that object as either its source or target.

One example of a property change would be as follows. Let's say a red control arrow is drawn to intersect a fader and a text object (text typed onscreen). Let's further say that this text is "red wagon." This text may have various properties, like it might be typed with the font New Times Roman, and it might be the color red and it might be in a certain location onscreen. But none of these properties will enable the intersection of a fader and this text object to yield a valid arrow logic for this drawn control arrow.

If, however, the same fader is intersected by a red control arrow that also intersects the text "big bass drum.wav," then the arrow logic becomes valid. This is because a property of "big bass drum.wav" is that it is a sound file. As a sound file, it has one or more properties that can be controlled by a fader. For instance, a fader could be used to control its volume or equalization or sample rate and so on.

Furthermore, if this same red arrow intersects a fader and a blue circle, this is not generally going to yield a valid arrow logic. For instance, a red arrow with a control logic links behaviors of one object to another. The blue circle has no behavior that can be controlled by a fader as defined by a basic control logic.

If a user wants to change the properties of the blue circle, the user can use another object, like an inkwell. In this case, the blue circle still does not have a behavior, although its color can be changed. If a user wishes to have the same control from a fader (a user defined action, rather than a software embedded action) the user can draw a red arrow that has control logic that links behaviors.

Then by means of a modifier arrow, a user can enable the fader to control a specific property of the blue circle. So, for example, a modifier arrow can be drawn to intersect the shaft of the red control arrow (which is intersecting the fader and the blue circle) and add the behavior ("vary color"). This modifier behavior then enables the fader to produce a valid control arrow logic.

Now when the fader's cap is moved, this adjusts the color of the blue circle, e.g., changing it red, gray or purple. What are linked are the behavior of the fader and the property of the blue circle.

As an alternate, a user could just type the word "color" for the modifier arrow. The function "vary" is implicit, because of the direction of the drawn arrow, namely, from the fader to the blue circle. In no instance can the word "color," in this context, describe a behavior. This is purely a property. Therefore, the interpretation is that the property of the target object is being defined by the user.

Step 313. Does CHARACTERSTRING$_m$ contain any word, symbol or character recognized as designating an arrow logic/action modifier and/or a property or behavior of an object? The software looks for key words that describe actions, behaviors or properties. An example of a modifier for a yellow assign arrow could be "assign only people whose names start with B." The software looks for text strings or their equivalents, which describe actions, behaviors or properties or the like.

Step 314. Add to MODIFIER$_m$ (1) a definition of the arrowlogic modification indicated by interpretation of CHARACTERSTRING$_m$ and (2) descriptors of the object properties and/or behaviors indicated by interpretation of CHARACTERSTRING$_m$. The characters that are typed for a modifier arrow define the action and/or behavior of that modifier arrow. The typed character(s) for the modifier arrow can define a modification to the arrow logic of the first drawn arrow (the arrow whose shaft the modifier arrow is intersecting). Furthermore, various descriptors of object properties and/or behaviors are added here.

EXAMPLE 1

Figure 57A:
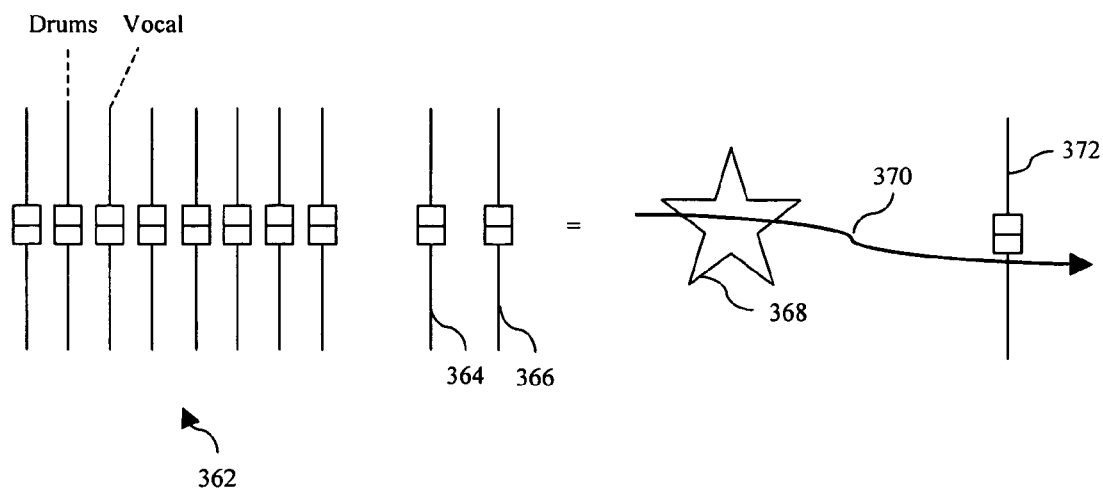
FIGS. 57a and 57b illustrate an example in which characters typed for a modifier arrow are used to define a modification to the arrow logic of a first drawn arrow in accordance with an embodiment of the invention.

Let's take a complex source object, for example an 8-channel mixer 362 shown in FIG. 57a. Let's say the output of this mixer 362 is a 2-channel 24-bit digital signal, represented in FIG. 57a by two faders 364 and 366, which is a mix of all 8 channels. Let's say that this 8-channel mixer 362 and its 2-channel output signal is represented as a blue star 368. Now a gray, "send," arrow 370 has been drawn to intersect the blue star 368 and then a fader 372, which represents a stereo audio input channel. Let's say this is the input channel to a bassist's headphone in a live recording session.

This is a valid arrow logic as a mix can be sent to an input channel. The result of the implementation of this arrow logic is that the output of the mix will be sent to the bassist's headphone input channel at 24-bit digital audio. This arrow logic will be implemented when a user activates the arrow logic, e.g., clicks on the white arrowhead of the first drawn gray arrow 370.

Figure 57B:
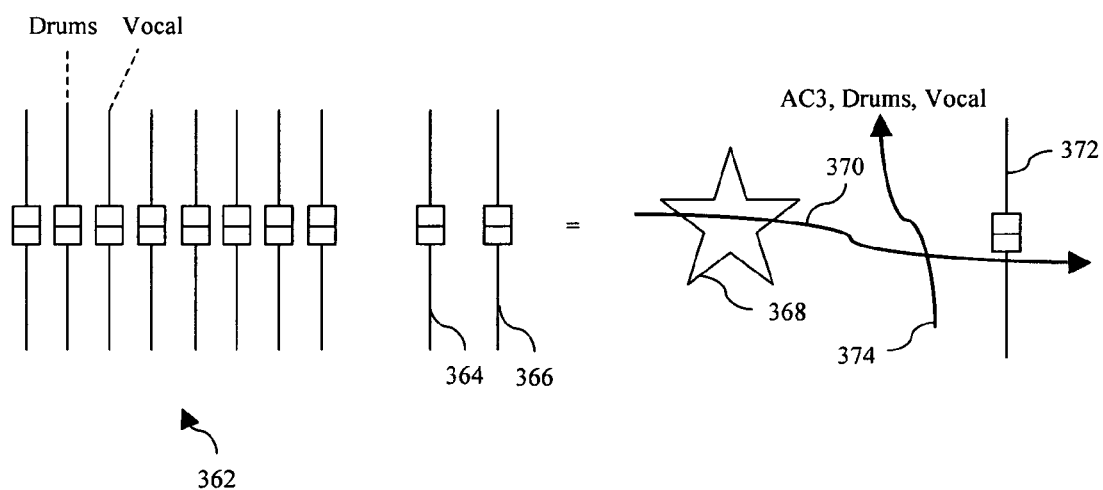

Let's then say that prior to activating the arrow logic, a modifier arrow 374 is drawn to intersect the shaft of the first drawn gray "send" arrow 370 and the words: "AC3, Drums, Vocal" are typed, as illustrated in FIG. 57b.

Note: it would be possible to use the "show arrow" function to bring back a representation of the first drawn gray send arrow 370 onscreen after its logic has been implemented so it can be intersected by the modifier arrow 374. And the modifier arrow 374 could then be used to modify the first drawn arrow's logic.

The result of this modifier arrow 374 is that only the drum and vocal part of the 2-channel mix output are sent to the input channel of the bassist's headphones and furthermore, the 24-bit digital audio output of the mixer is converted to AC3 audio. This conversion applies only to the audio stream being sent to the specified input channel as represented onscreen as the fader 372 being intersected by the first drawn gray send arrow 370.

The modifier is interpreted from the text "AC3". This changes the basic arrow logic, (which is to send the current source for the first drawn send arrow to an input without processing), to a logic that sends the source with processing, namely AC3.

The definition of the modification is to change the send operation from using no processing to using AC3 processing. The drum and vocal, in this instance, are descriptors and will be recognized by the system by virtue of them being properties of the source. In this particular example, the system will assume that only the drum and vocal parts are to be used as the source.

Alternate to the above example, if only "AC3" were typed as the modifier, then there is no specification of any behavior or property. There is only a description of a modifier, namely a key word "AC3". This remains true as long as the string "AC3" is not recognized as a designating a behavior or property of the source or target. "AC3" in this example only modifies the action of the send arrow logic, not a behavior or property of the source or target objects for this arrow logic.

EXAMPLE 2

Figure 58:
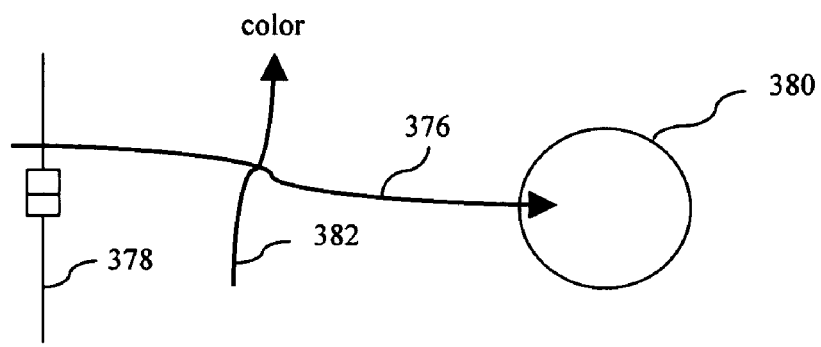
FIG. 58 illustrate another example in which characters typed for a modifier arrow are used to define a modification to the arrow logic of a first drawn arrow in accordance with an embodiment of the invention.

Here's an example where the definition is implicit and hasn't been interpreted from the input text. Let's take the example of drawing a red arrow 376 to intersect a fader 378 and a blue circle 380, as illustrated in FIG. 58. Then the shaft of that red arrow 376 is intersected by a modifier arrow 382 and the word "color" is typed using the text cursor that appears for that modifier arrow.

The definition of this modifier arrow 382, in this case, is that the arrow logic of the first drawn arrow 376 goes from being a link between two behaviors or two objects to being a link between one behavior of one object and one property of one object. The descriptor is this case is "color."

Note: An important factor in determining the validity of an arrow logic can be where the tip of the arrow's arrowhead is pointing (what it is overlapping). In the case of a basic control logic, the tip of the arrow's arrowhead generally must be overlapping some portion of a valid target object in order for this arrow logic to be valid. In the case of a control logic, if the tip of the arrow is not overlapping any portion of any object, it may result in an invalid arrow logic.

EXAMPLE 3

Figure 59A:
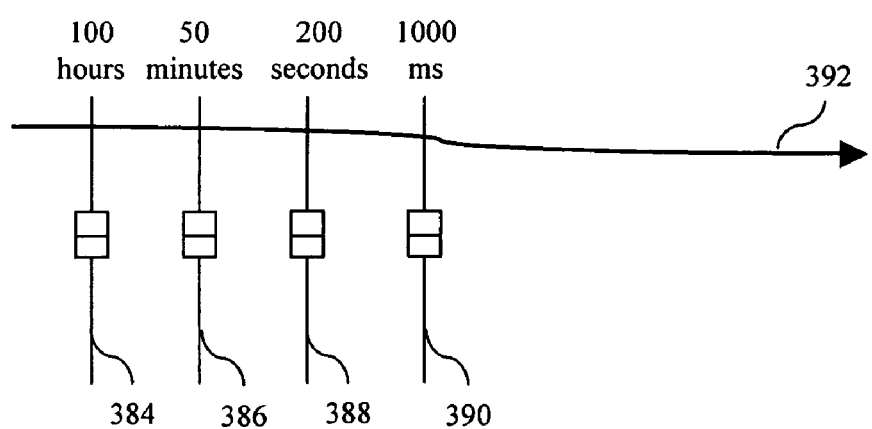
FIGS. 59a, 59b and 59c illustrate an example in which characters "pie chart" typed for a modifier arrow are used to define a modification to the arrow logic of a first drawn arrow such that the modified arrow logic is a pie chart creating action in accordance with an embodiment of the invention.

Let's take four faders 384, 386, 388 and 390 drawn and recognized onscreen, as illustrated in FIG. 59a. Let's label each fader with a number and a word, i.e., 100 hours, 50 minutes, 200 seconds, 1000 ms. Let's intersect these four faders 384, 386, 388 and 390 with a red control arrow 392 and point the arrow to a blank section of the screen. This is an invalid arrow logic according to the basic control arrow logic which requires a target.

Figure 59B:
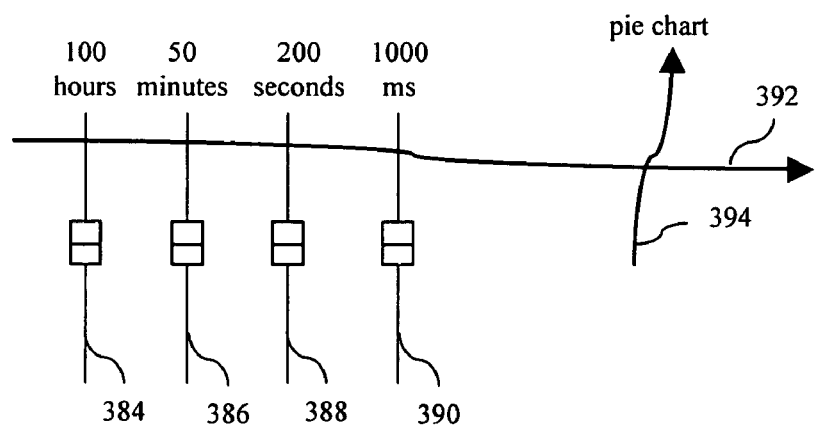

Now let's draw a modifier arrow 394 through the shaft of this first drawn control arrow 392 and type the phrase: "pie chart", as illustrated in FIG. 59b. This modifier changes the control arrow logic in at least three ways: (1) The basic control logic now supports multiple sources, (2) the basic control logic now does not require a target for the first drawn arrow, and (3) the behavior has been modified such that intersecting the source objects produces a target that was not specified in the original arrow logic definition, namely a pie chart.

The control arrow logic has now been changed from linking behaviors of at least one source and one target object to separately linking each of four source object's behaviors to four separate properties of a single newly created target object, namely a pie chart.

Figure 59C:
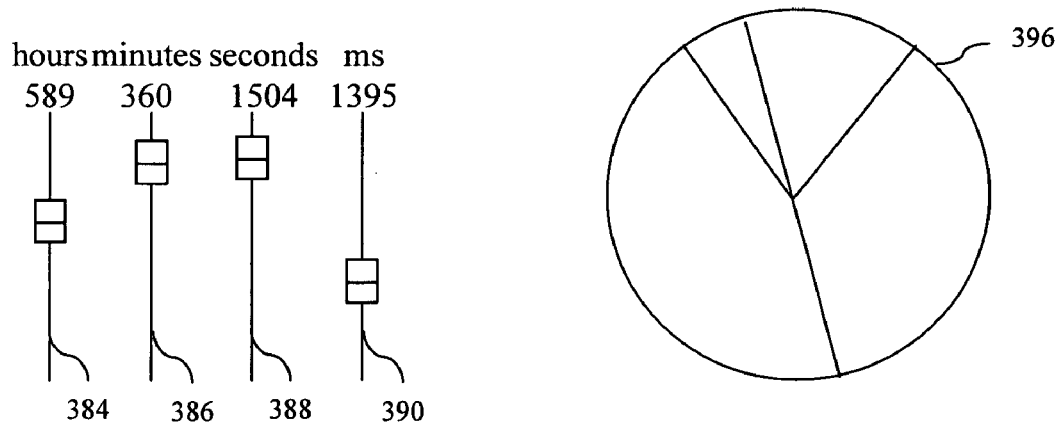

In this case the definition equals items (1), (2) and (3) above. The descriptors are implicit. They change the shape and angular size of the segments of the pie chart. The overall action of this resulting arrow logic is to create a pie chart 396, as illustrated in FIG. 59c, where each source object (each fader 384, 386, 388 or 390) controls one segment of the pie chart where the relative size of the pie chart equals the value of the fader that controls it and the name of each pie chart segment equals the text value assigned to each fader that controls it.

Step 315. Notify the arrow(s), which have MODIFIER$_m$ in their modifier lists, that it has changed and force a recalculation of their arrow logics with the sequence of modifiers in their modifier list applied. MODIFIER$_m$ is the definition and descriptors provided for under Step 314 above. Another part of the MODIFIER$_m$ could be the location of the intersect point of the modifier arrow with the first drawn arrow's shaft.

This step is the second stage of applying the MODIFIER$_m$ to the first draw arrow's logic. The MODIFIER$_m$ in Step 304 of this flowchart was created as a blank modifier. Step 315 is the validation of the modifier with the interpreted data.

This is a particular implementation for purposes of this example. Step 315 could simply insert MODIFIER$_m$ into the modifier lists of the intersected arrow(s) saying that MODIFIER$_m$ has been identified and validated.

Step 316. Force a redraw for arrows whose arrowlogic have changed. A screen redraw or partial redraw is enacted only if the MODIFIER$_m$ has changed the arrow logic of the first draw arrow(s) from invalid to valid or vice versa.

The filling of a first drawn arrow's arrowhead and its modifier arrow's arrowhead with a different color, e.g., white, is used to provide a user a way to implement the first drawn arrow's logic and its modification by the modifier arrow manually, thus giving the user the decision to accept or reject the resulting arrow logic.

If the logic is valid, the arrowheads of the arrows involved will change their appearance to permit user implementation of the logic. If the logic is invalid, the arrowhead(s) of the first drawn arrow will remain the color of that arrow's shaft.

There are at least four cases here:

A. If the first drawn arrow's logic was valid before the drawing of a modifier arrow, and after the drawing of a modifier arrow (and its associated modifier text) the first drawn arrow's logic still remains valid, then its arrowhead remains changed, e.g., white.
B. If the first drawn arrow's logic was originally valid, but has been made invalid by the drawing of a modifier arrow (and its associated modifier text), then the arrowhead of the first drawn arrow will return to the color of its shaft.
C. If the first drawn arrow's logic was originally invalid, but it has been made valid by the drawing of a modifier arrow (and its associated modifier text), then both the arrowhead of the first drawn arrow and the modifier arrow will have their appearances changed, e.g., their arrowheads turn white.
D. If the original arrow logic was invalid and it remains invalid after drawing a modifier arrow (and its associated modifier text) to intersect its shaft, then the arrowhead of the first draw arrow will remain the color of its shaft.

Step 317. Are any of the arrow(s), which have a modifier in their modifier list, actionable? What this step asks is, is the arrow logic that has been modified by a modifier arrow still a valid arrow logic that can be implemented or is it an invalid logic? This has been discussed under Step 316 above in items A through D. In two of these cases, A and C, the arrow logic remains valid. If the logic is valid, then the software looks at the context of the arrow logic, which is performed at Step 318.

If the answer to Step 317 is yes, the process proceeds to Step 318. If the answer is no, the process comes to an end.

Step 318. For each modified actionable arrow, (1) create a Modifier For Context which consists of the nature of the modifier, the types and relevant status of the source and target objects of the modifier arrow and the COLOR and STYLE of the modified arrow, and (2) add the Modifier For Context to the user's persistent local and/or remote profile, making it available for immediate and subsequent discretionary user. The nature of the modifier is the definition and descriptors as described in Step 314 above. The context is the type and relevant status of the source and target objects of the modified first drawn arrow (the arrow intersected by the modifier arrow).

A modifier arrow has modified the arrow logic of a first drawn arrow. The software records the definition and descriptor(s) of the modifier arrow (as previously described) and the types and status of the source and target objects. This recording can be used as a context that can be referred to by the software to further modify, constrain, control or otherwise affect the implementation of a given arrow logic. This recording (context) can be saved anywhere that data can be saved and retrieved for a computer.

Let's say a red control arrow is drawn to intersect a fader and a blue circle. A modifier arrow is drawn to intersect the shaft of the first drawn red control arrow and the word "color" is typed for that modifier arrow. This is a valid arrow logic. The software then saves this condition (red arrow intersecting a fader and a blue circle with a modifier arrow with the word "color") as a context. These stored contexts are automatically incorporated into the actions described above with reference to the flowchart of FIGS. 52a, 52b and 52c. These contexts are available for immediate use.

Figure 60A:
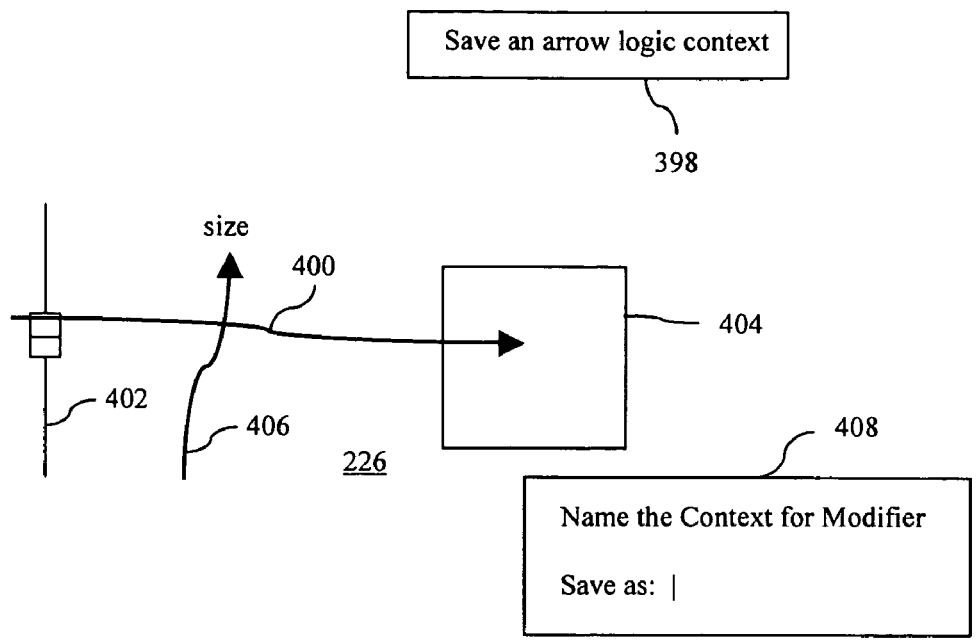
FIG. 60a illustrates an example in which the context of a modified arrow logic is manually saved in accordance with an embodiment of the invention.
Figure 60B:
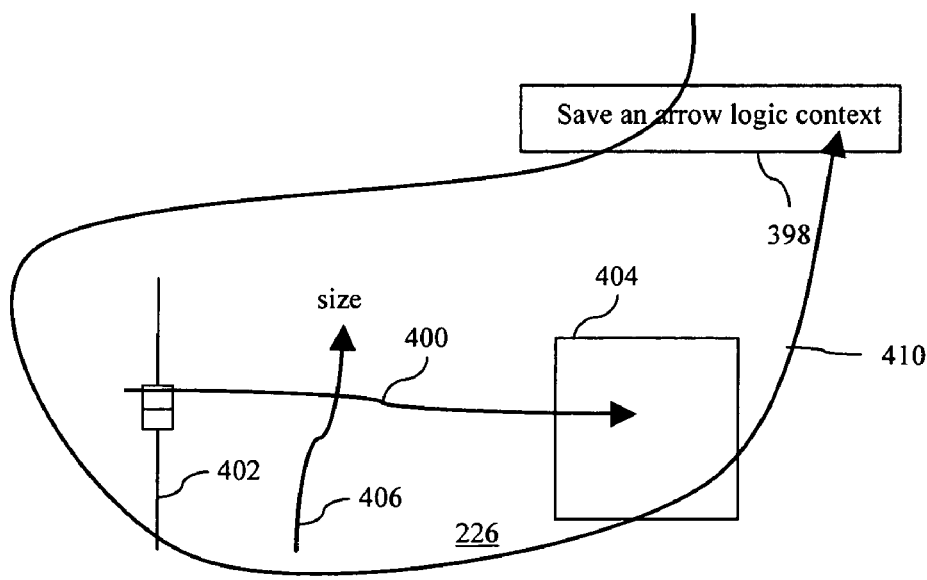
FIG. 60b illustrates another example in which the context of a modified arrow logic is manually saved in accordance with an embodiment of the invention.

The discretionary use of these contexts can be approached many ways. One way would be to add a user-definable and actuatable switch 398, as illustrated in FIG. 60a. This switch 398 can be created by a user and labeled, for example, "save an arrow logic context." A user would draw an arrow 400 that intersects one or more source and/or target objects, e.g., a fader 402 and a green rectangle 404. Then a modifier arrow 406 would be drawn and text would by typed or symbols or objects drawn to define the modifier, e.g., "size". Then the user would push this switch 398 to save this context. In one approach, a pop up menu 408 can appear or its equivalent and the user can then type in a name for this context. This context is saved with this name and can be later recalled and used manually. One way to use it would be to present it onscreen as a text object or assign the text to another graphic object. Then intersect this object with the other source and/or target objects of a first drawn arrow with its arrow logic. This arrow logic will be modified by the intersected context. In another approach, a third arrow 410 is drawn to intersect the "Save an arrow logic context" switch 398 and at least one of the first drawn arrow 400, the modifier arrow 406 and the source and target objects 402 and 404 in order save this context, as illustrated in FIG. 60b.

Figure 61:
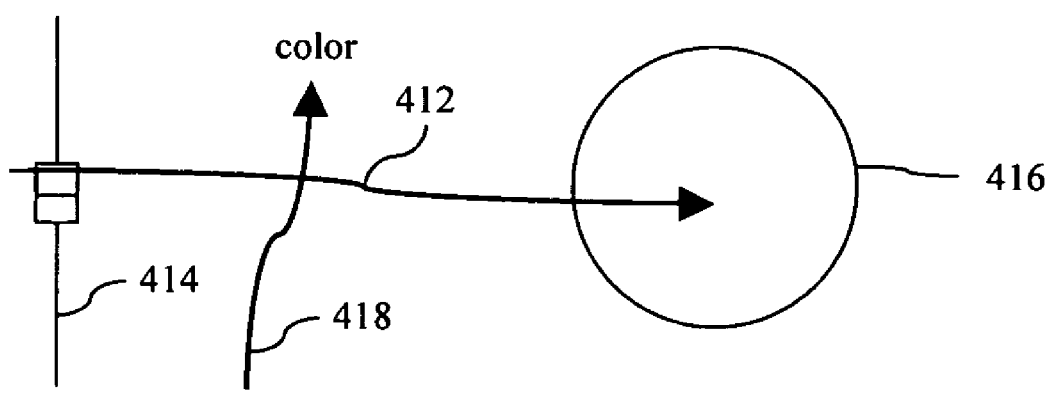
FIG. 61 illustrates an example in which the context of a modified arrow logic is automatically saved in accordance with an embodiment of the invention

Alternatively, the system can automatically record every instance of a successful implementation of a modifier arrow logic as a context. As an example, if a red control arrow 412 that intersects a fader 414 and a blue circle 416 is intersected a modifier arrow 418 that says "color" is a context, as illustrated in FIG. 61, and if this context is automatically saved by the software. Then whenever a user draws a red control arrow from a fader to a blue circle that fader will control the color of the circle.

What happens if a user draws a red arrow from a fader to a green star? Technically, by strict interpretation, the saved context would not apply. Because a green star is not a blue circle.

The type could be hierarchical. Its various matching conditions could include many parts: this is a recognized drawn object, this is non-polygonal object, this is an ellipse, this is a circle, etc.

The status could include: is it a certain color, is it part of a glued object collective, is it on or off, does it have an assignment to it?, is it part of an assignment to another object?, etc.

All of this information is recorded by the software, and includes the full hierarchy of the type and all conditions of the status of each object in the context. The user can then control the matching of various aspects of the "type" and "status" of the originally recorded context. This includes the "type" and "status" for each object that has been recorded in this context.

One method of accomplishing this would be to have a pop up menu or its equivalent appear before a modifier context is actually recorded. In this menu would be a list of the objects in the context and a hierarchical list of type elements for each object along with a list of the status conditions for each object. The user can then determine the precision of the context match by selecting which type elements and status conditions are to be matched for each object in the stored context.

This would mean that the recorded and saved context could contain every possible type element and status condition for each object in the context, plus a user list of selected elements and conditions to be matched for that context. This way the precision of the match remains user-definable over time. Namely, it can be changed at any point in type by having a user edit the list of type elements and status conditions for any one or more objects in a recorded and saved context.

In FIG. 62a, an example of "Type" and "Status" hierarchy for user-defined selections of a fader object's elements is shown. To make one or more selections, a user could simply click on the element(s) that the user wishes to be considered for a match for the Context for Modifier. Each selected element could be made bold, change color, or the like to indicate that it has been selected. Note: The object is bolded in its "type" hierarchy. Selecting an element higher in the "type" hierarchy will create a broader match condition for the Context for Modifier and vice versa. An exemplary menu 420 for a fader object is shown. As another example, "Type" and "Status" elements for a blue circle object are shown in FIG. 62b.

The Modifier for Context consists of at least one thing:
A. The nature of the modifier. This is the combination of the definition and descriptor.

If this were the only thing, then the Modifier for Context would apply to all arrows and all contexts. To further specify this Modifier for Context, the following things should be considered:
B. The types and relevant status of the source and target objects of the modified arrow.
C. The color and style of the modified arrow.

Step 318 in this flowchart saves everything about the type and status of each object in a recorded and saved context with a particular arrow logic used to create that context, and applies that Modifier for Context automatically to a use of that arrow logic as defined by a color and/or style of line used to draw that arrow. This is true when an arrow of this color and/or line style is drawn and the types and relevant status of the source and/or target objects of this arrow match the criterion of the recorded Modifier for Context, as described under B and C directly above.

Let's take the example of the red control arrow intersecting a fader and a blue circle with a modifier arrow drawn with a text of "color" typed for it. If this were saved as a Modifier for Context, every time a user drew a red arrow to intersect a fader and a blue circle it would control its color.

Step 319. Redraw the head of this arrow (the modifier arrow) filled in the color it was drawn. If the modifier arrow is invalid then the original arrow logic of the first drawn arrow(s) remain unchanged.

Figure 63:
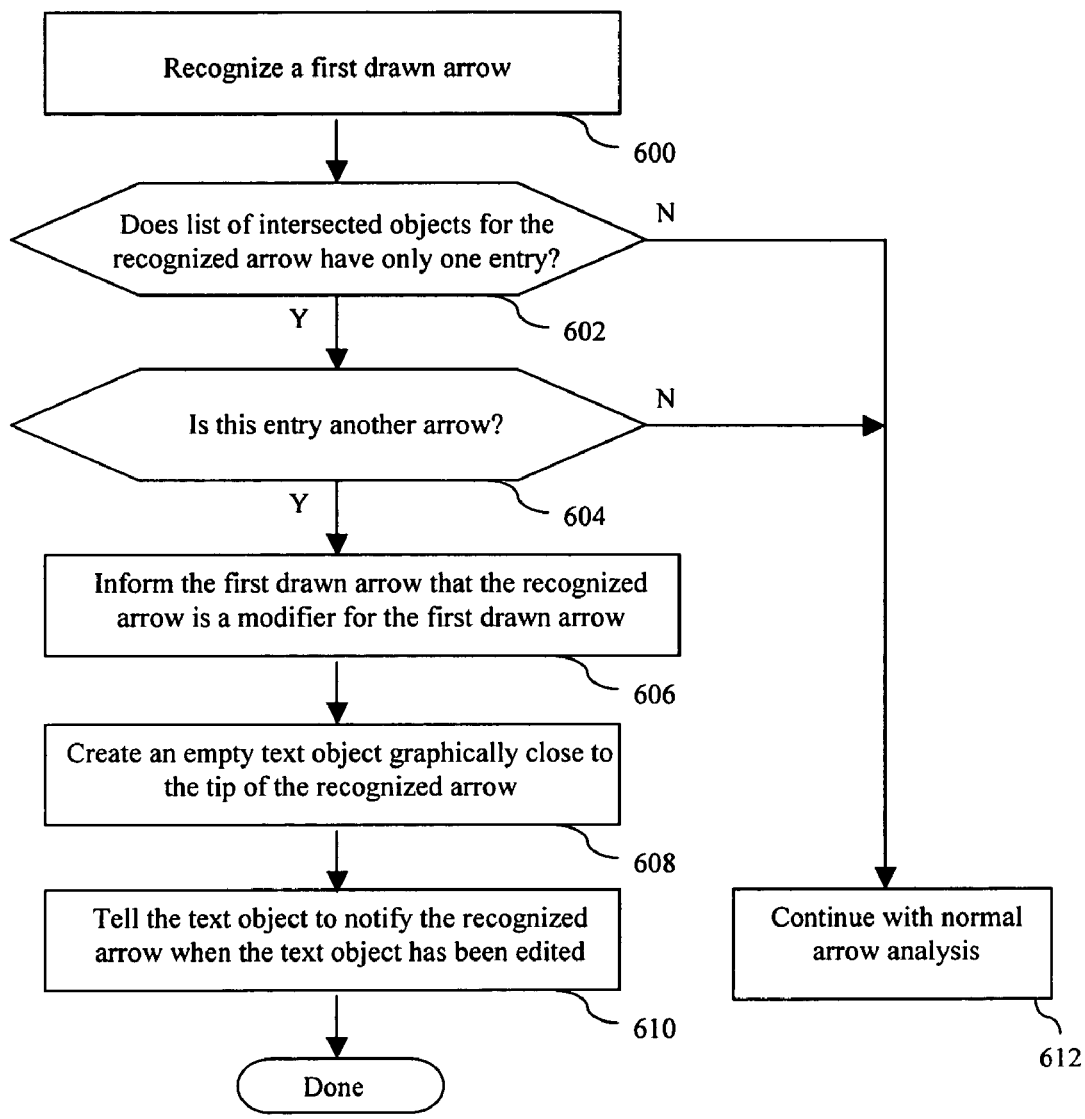
FIG. 63 shows a flowchart of a process for recognizing a modifier arrow in accordance with an embodiment of the invention.
Figure 64:
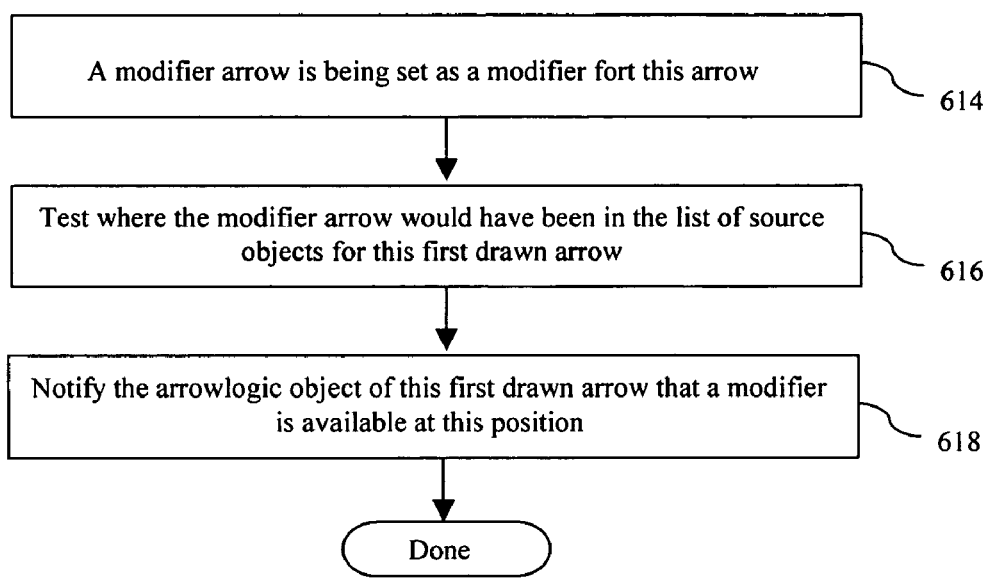
FIG. 64 shows a flowchart of a process for accepting a modifier arrow in accordance with an embodiment of the invention.
Figure 65:
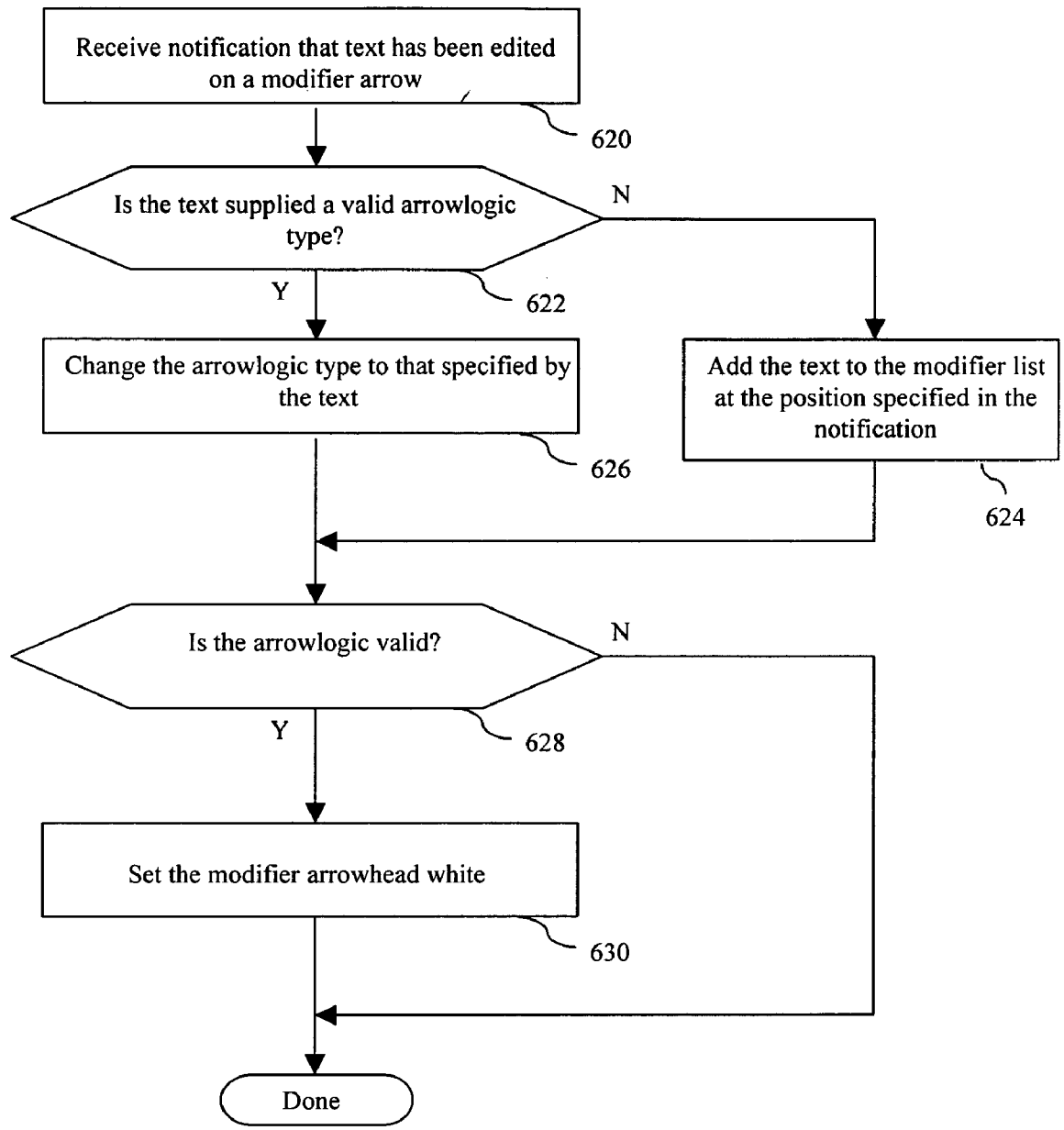
FIG. 65 shows a flowchart of a process for accepting modifier text by an arrowlogic object in accordance with an embodiment of the invention.

Turning now to FIGS. 63, 64 and 65, processes related to a modifier arrow are now described. The process for recognizing a modifier arrow in accordance with an embodiment of the invention is described with reference to a flowchart of FIG. 16. At block 600, a first drawn arrow is recognized as an arrow. Next, at block 602, a determination is made whether the list of "intersected" objects (source objects) for the recognized arrow has only one entry. If no, then the process proceeds to block 612, where normal arrow analysis is performed. If yes, then the process proceeds to block 604, where a determination is made whether this entry is another arrow. If no, then the process proceeds to block 612. If yes, then the process proceeds to block 606, where the first drawn arrow is informed that this recognized arrow is a modifier for the first drawn arrow.

Next, at block 608, an empty text object is created graphically close to the tip of the recognized arrow. This can be a text cursor that enables a user to type characters that will be used to define the behavior and/or properties of the modifier arrow. Next, at block 610, the text object is told to notify the recognized arrow when the text object has been edited. In other words, when the user utilizes this text cursor to enter characters to define the modifier arrow's action, behavior, etc. The process then comes to an end.

The process for accepting a modifier arrow by an arrow in accordance with an embodiment of the invention is now described with reference to a flowchart of FIG. 64. At block 614, a modifier arrow has been created for a first drawn arrow(s). Next, at block 616, a test is performed whether the modifier arrow would have been in the list of source objects for this first drawn arrow. Next, at block 618, the arrowlogic object of this first drawn arrow is notified that a modifier is available at a position where the modifier arrow has intersected this first drawn arrow.

The process for accepting modifier text by an arrowlogic object in accordance with an embodiment of the invention is now described with reference to a flowchart of FIG. 65. At block 620, a notification that text has been edited on a modifier arrow is received. Next, at block 622, a determination is made whether the text supplied is a valid arrowlogic type. That is, text has been recognized from a list of predefined arrowlogic names. If no, then the process proceeds to block 624, where the text is added to the modifier list at the position specified in the notification. The process then proceeds to block 628. If the text supplied is a valid arrowlogic type, then the arrowlogic type is changed to that specified by the text, at block 626. The process then proceeds block 628.

At block 628, a determination is made whether the arrowlogic is valid. The arrowlogic being referred to here is the arrow logic of the first drawn arrow, as it has been modified by the modifier arrow and its modifier text—the characters typed for that modifier arrow. In other words, is the original arrowlogic still valid after being modified by the modifier arrow. If no, then the process comes to an end. If yes, then the modifier arrowhead is set to white, at block 630. The process then comes to an end.

Figure 66:
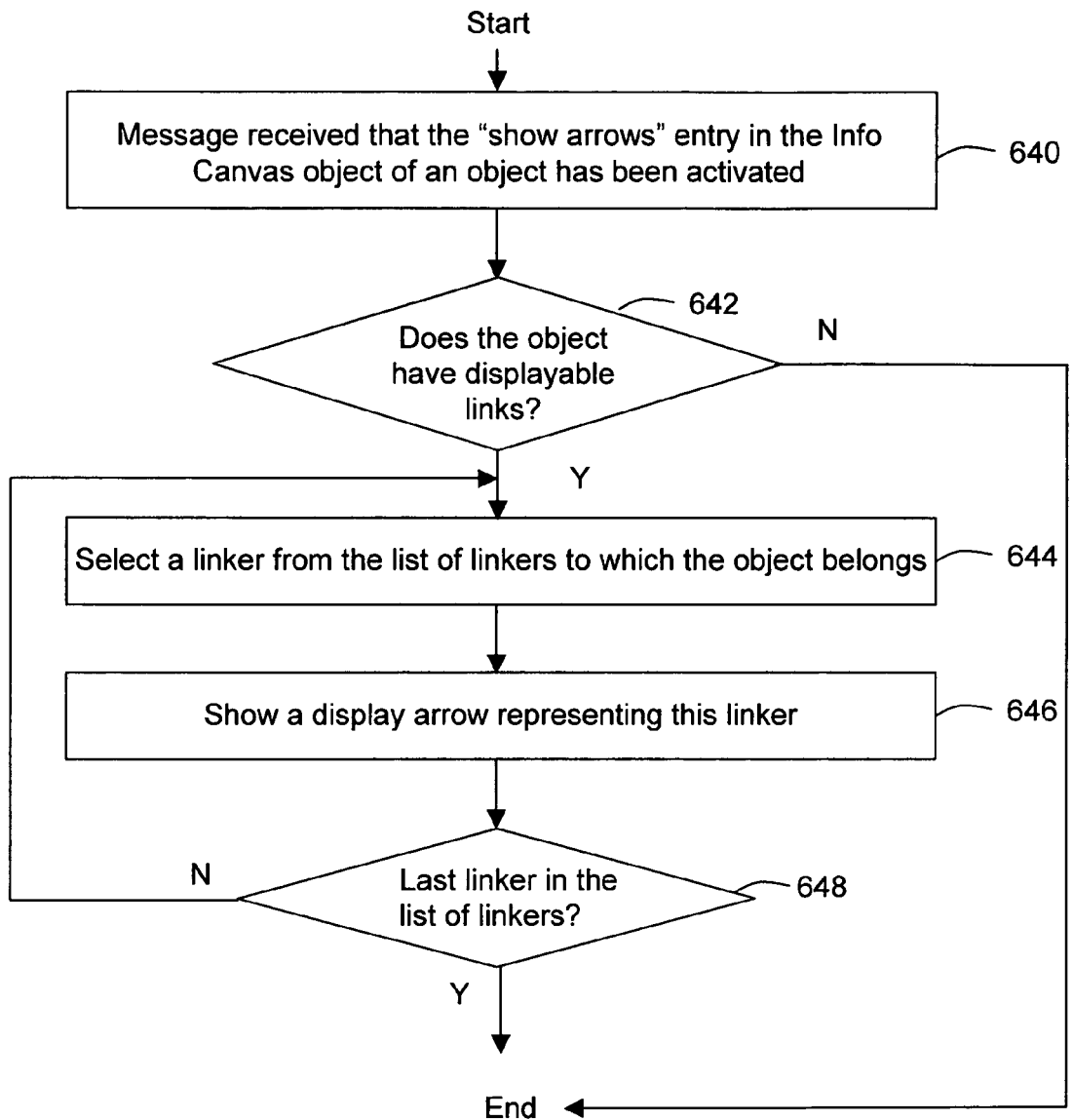
FIG. 66 shows a flowchart of a process for showing one or more display arrows to illustrate arrow logics for a given graphic object in accordance with an embodiment of the invention.

Turning now to FIG. 66, a flowchart of a process for showing one or more display arrows to illustrate arrow logics for a given graphic object is shown. At step 640, message is received that the "show arrow" entry in the Info Canvas object of the object has been activated. In the Blackspace environment, right mouse button clicking on any graphic object causes an Info Canvas object for that object to be displayed. When an entry in an Info Canvas object is clicked on, an appropriate functional method in the graphic object is executed. Conceptually, this can be viewed as though a message from the Info Canvas object is received by the graphic object.

Next, at step 642, a determination is made whether the object has displayable links. This step is a routine that checks the list of linkers maintained in a graphic object and decides if any of them are appropriate for being illustrated to the user by the use of a display arrow. There are two lists in each graphic object. One contains all the linkers for which the object is a source. This includes all linkers that are not directional, as well as arrow logic linkers for which the object is not a target. The other list of linkers contains all the linkers for which the object is a target (only arrow logic linkers have targets). The routine looks through each of these lists in turn trying to find linkers that are functional. In this context, a functional linker is a linker that maintains controlling or other non-graphical connections and the user has no other way to view the members of the linker. This is determined by checking to see if the linker is a particular type, for example, a "send to" linker. An example of a linker that is not regarded as functional in this context would be a "graphic linker", which is the type used to maintain the objects belonging to another object. If either list contains such a functional linker, then the routine returns a value indicating that this object does contain at least one displayable linker.

Figure 67A:
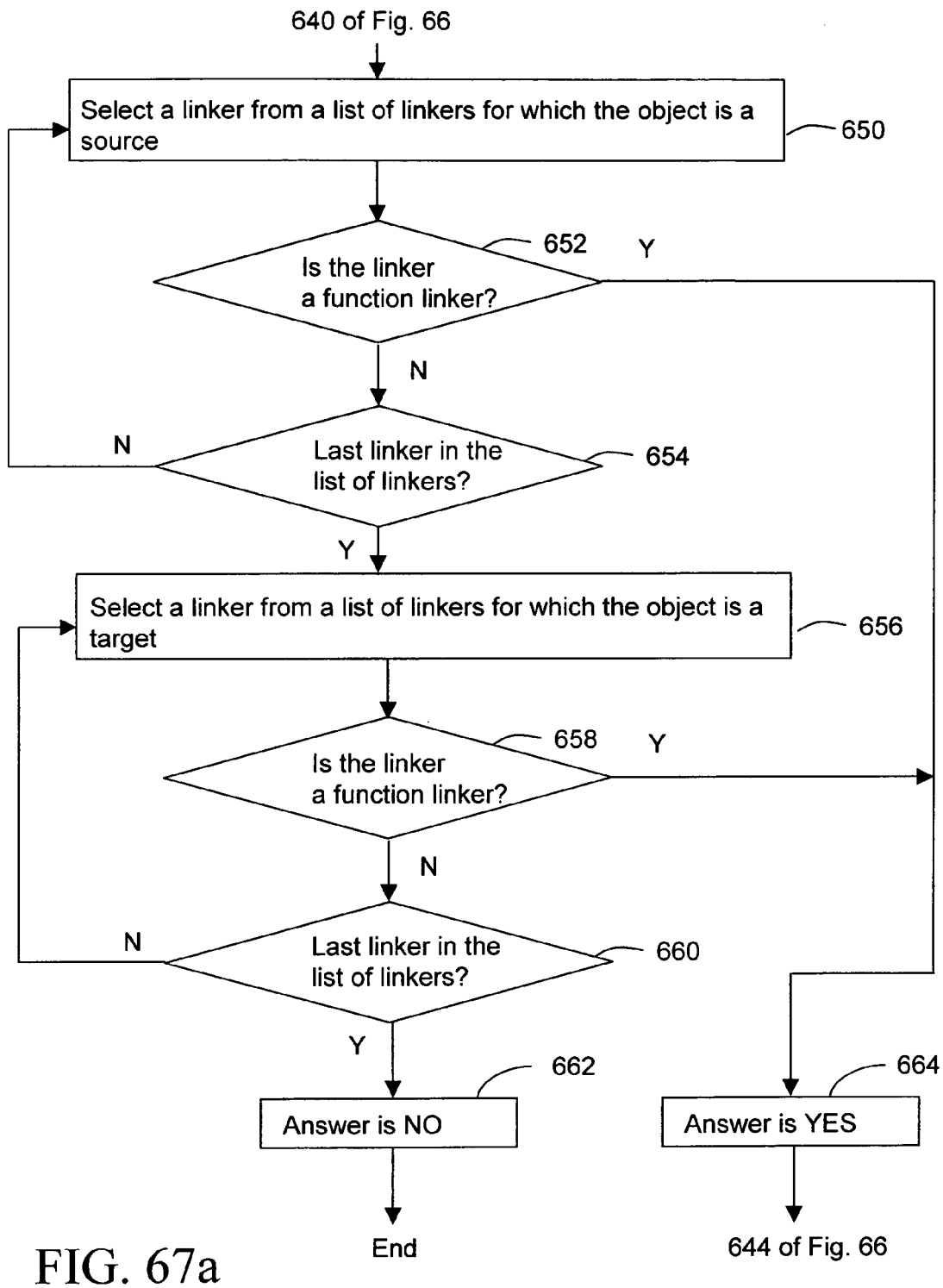
FIG. 67a shows a flowchart of a routine to determine whether the object has displayable links in the process for showing one or more display arrows in accordance with an embodiment of the invention.

This determination step 642 is now described in detail with reference to the flowchart of FIG. 67*a*. At step 650, a linker is selected from a list of linkers for which the object is a source. Next, at step 652, a determination is made whether the selected linker is a functional linker. If yes, then it is determined that the object does have displayable links, at step 664, and the process proceeds to step 644 in the flowchart of FIG. 66.

If the selected linker is determined not to be a functional linker at step 652, then the routine proceeds to step 654, where another determination is made whether the selected linker is the last linker in the list of linkers for which the selected object is a source. If the selected linker is not the last linker, then the routine proceeds back to step 650, where then next linker in the list of linkers is selected and steps 652 and 654 are repeated. However, if the selected linker is the last linker, then the routine proceeds to step 656, where a linker is selected from a list of linkers for which the object is a target.

Next, at step 658, a determination is made whether the selected linker is a functional linker. If yes, then the routine proceeds to step 664. If no, then the routine proceeds to step 660, where another determination is made whether the selected linker is the last linker in the list of linkers for which the object is a target. If the selected linker is not the last linker, then the routine proceeds back to step 656, where the next linker in the list of linkers is selected and steps 658 and 660 are repeated. However, if the selected linker is the last linker, then it is determined that the object does not have displayable links, at step 662, and the entire process comes to an end.

Referring back to FIG. 66, at step 644, a linker is selected from the list of linkers to which the object belongs. In the first instance, the selected linker is the first linker in this list of linkers. Next, at step 646, a display arrow representing this linker is shown. Each linker can display a simplified graphical arrow representing the connections managed by the linker, which is now described with reference to the flowchart of FIG. 67*b*.

Figure 67B:
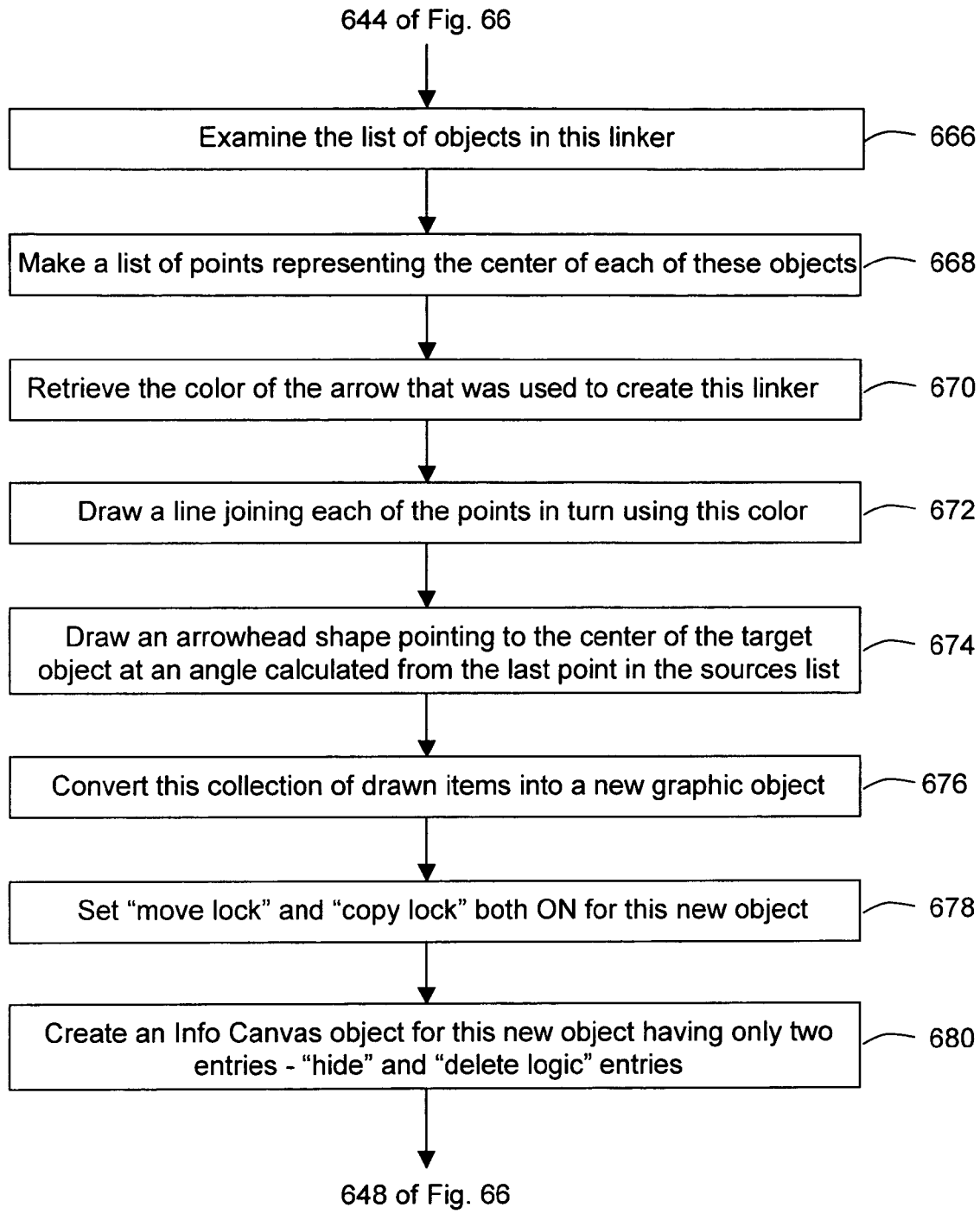
FIG. 67b shows a flowchart of a routine to show a display arrow in the process for showing one or more display arrows in accordance with an embodiment of the invention.

FIG. 67*b* describes a routine in the arrow logic linker, which displays a graphical representation of itself. At step 666, the list of objects in this linker is examined. Next, at step 668, a list of points representing the center of each of these objects as viewed on the global drawing surface is made.

Next, at step 670, the color of the arrow that was used to create this linker is retrieved. This step is to determine the color that the user employed to draw the arrow that created this linker. This information was saved in the data structure of the linker. Next, at step 672, a line is drawn joining each of the points in turn using the determined color, creating linear segments defined by the points. Next, at step 674, an arrowhead shape is drawn pointing to the center of the target object at an angle calculated from the last point in the sources list. In other words, an arrowhead is drawn at the same angle as the last segment so that the tip of the arrowhead is on the center of the target object in the linker.

Next, at step 676, the collection of drawn items (i.e., the line and the arrowhead) is converted into a new graphic object, referred to herein as an "arrow logic display object". Next, at step 678, the "move lock" and "copy lock" for the arrow logic display object are both set to ON so that the user cannot move or copy this object. Next, at step 680, an Info Canvas object for the arrow logic display object having only "hide" and "delete logic" entries is created.

Note: if the user moves any graphic object in the linker, then this same routine, as described in FIG. 67*b*, is called again to redraw the arrow logic display object. After step 680, the process then proceeds to step 648 in the flowchart of FIG. 66.

Referring back to FIG. 66, at step 648, a determination is made whether the current linker is the last linker in the list of linkers. If no, then the process proceeds back to step 644, where the next linker in the list of linkers is selected and steps 644 and 646 are repeated. If the current linker is the last linker, then the process comes to an end.

Figure 68:
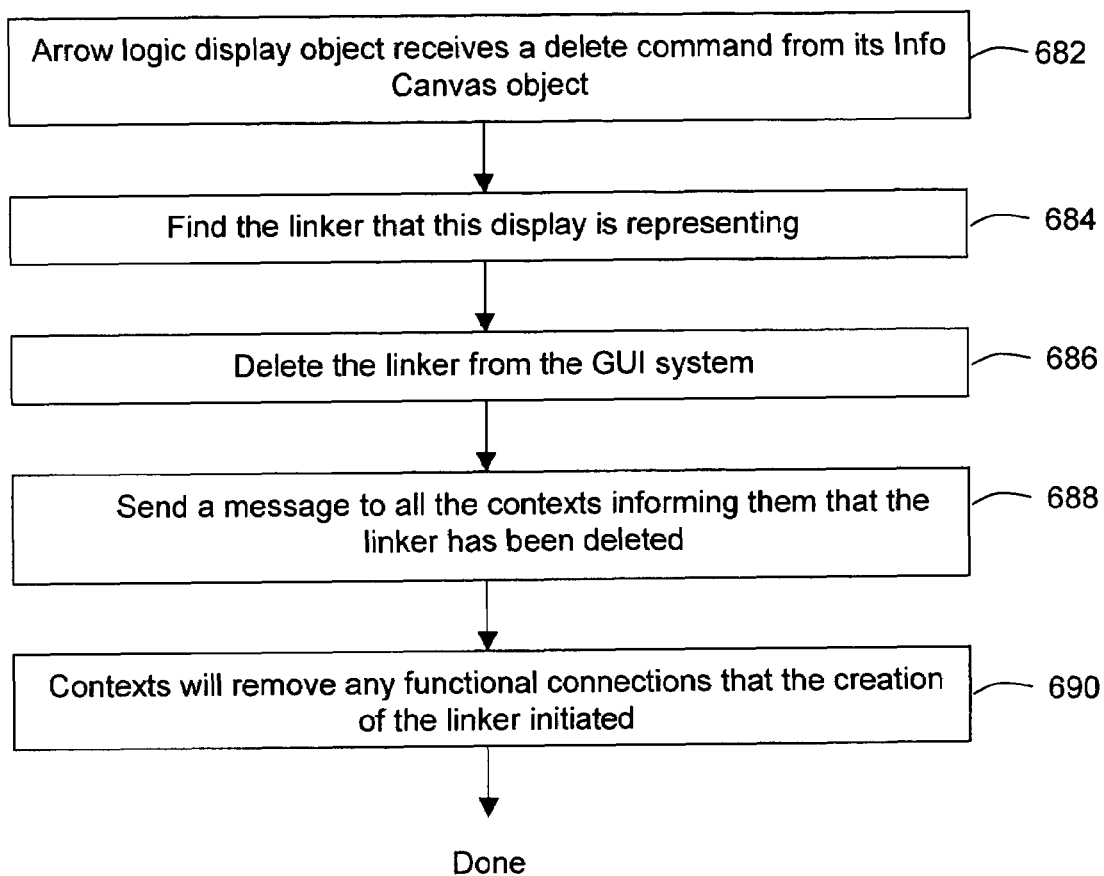
FIG. 68 shows a flowchart of a process called in the arrow logic display object when the delete command is activated for the display object in accordance with an embodiment of the invention.

Turning now to FIG. 68, a flowchart of a process called in the arrow logic display object when the delete command is activated for the display object. At step 682, the arrow logic display object receives a delete command from its Info Canvas object. Next, at step 684, the arrow logic display object finds the linker that this display object is representing. The arrow logic display object made a note of this at the time the display object was created. Next, at step 686, the linker is deleted from the GUI system. The deletion of the linker from the GUI system causes the graphic objects to lose any functional connections with each other that are provided by the arrow logic linker. This does not cause the graphic objects to be deleted, but the affected graphic objects lose this linker from their own lists and thus cannot use the linker to perform any control or other operation that requires the capabilities of the linker.

Next, at step 688, a message is sent to all the contexts informing them that the linker has been deleted and no longer exists in the GUI. Next, at step 690, contexts will remove any functional connections that the creation of the linker initiated. In the case of a linker, there may be contexts that have set up some other (non-GUI) connection(s) at the time the linker was created. These associations are disconnected at step 690.

Figure 69:
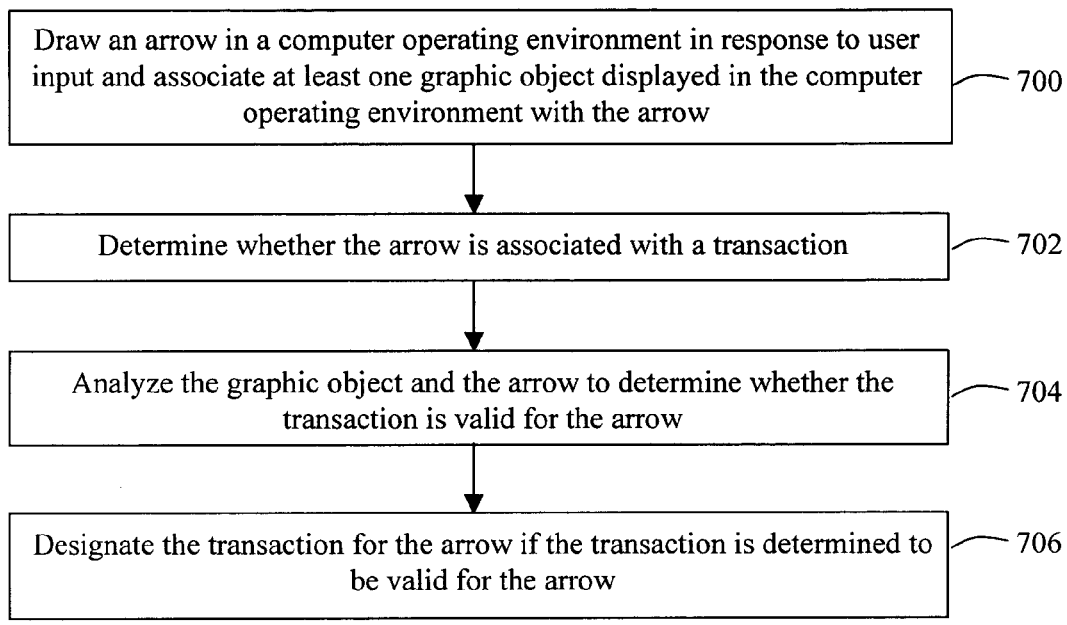
FIG. 69 is a process flow diagram of a method for creating user-defined computer operations in accordance with an embodiment of the invention.

A method for creating user-defined computer operations in accordance with an embodiment is now described with reference to the process flow diagram of FIG. 69. At step 700, an arrow is drawn in a computer operating environment in response to user input. During step 700, at least one graphic object displayed in the computer operating environment is associated with the arrow. Next, at block 702, a determination is made whether the arrow is associated with a transaction, which is a computer operation that can be performed in the computer operating environment. Next, at block 704, the graphic object and the arrow are analyzed to determine whether the transaction is valid for the arrow. Next, at block 706, the transaction is designated for the arrow if the transaction is determined to be valid for the arrow.

In an embodiment of the invention, the method for creating user-defined computer operations is performed by a computer program running in a computer. In this respect, another embodiment of the invention is a storage medium, readable by a computer, tangibly embodying a program of instructions executable by the computer to perform the method steps for creating user-defined computer operations in accordance with an embodiment of the invention.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for creating user-defined computer operations, said method comprising:
   drawing an arrow in a computer operating environment in response to user input, including associating at least a source graphic object and a target graphic object displayed in said computer operating environment with said arrow;
   determining whether said arrow is associated with a transaction, said transaction being a computer operation that can be performed in said computer operating environment;
   analyzing said source and target graphic objects and said arrow to determine whether said transaction is valid for said arrow; and
   enabling said transaction for said arrow if said transaction is determined to be valid for said arrow,
   wherein said associating of said at least said source graphic object and said target graphic object includes intersecting, nearly intersecting or substantially encircling said source graphic object with a shaft of said arrow, while pointing a head of said arrow to said target graphic object.

2. The method of claim 1 wherein said determining includes considering at least one of color and style of said arrow to determine whether said arrow is associated with said transaction.

3. The method of claim 1 wherein said analyzing of said source and target graphic objects and said arrow includes analyzing a property of one of said source and target graphic objects to determine whether said transaction is valid for said arrow.

4. The method of claim 1 wherein said analyzing of said source and target graphic objects and said arrow includes analyzing a behavior of one of said source and target graphic objects to determine whether said transaction is valid for said arrow.

5. The method of claim 1 wherein said analyzing of said source and target graphic objects and said arrow includes analyzing an action of said arrow to determine whether said transaction is valid for said arrow.

6. The method of claim 1 wherein said associating of said at least said source graphic object and said target graphic object includes associating a plurality of graphic objects in a particular order, said particular order being used for said transaction when said arrow is implemented.

7. A tangible storage medium readable by a computer, tangibly embodying a program of instructions executable by said computer to perform method steps for creating user-defined computer operations, said method comprising:
   drawing an arrow in a computer operating environment in response to user input, including associating at least a source graphic object and a target graphic object displayed in said computer operating environment with said arrow;
   determining whether said arrow is associated with a transaction, said transaction being a computer operation that can be performed in said computer operating environment;
   analyzing said source and target graphic objects and said arrow to determine whether said transaction is valid for said arrow; and
   enabling said transaction for said arrow if said transaction is determined to be valid for said arrow,
   wherein said associating of said at least said source graphic object and said target graphic object includes intersecting, nearly intersecting or substantially encircling said source graphic object with a shaft of said arrow, while pointing a head of said arrow to said target graphic object.

8. The storage medium of claim 7 wherein said determining includes considering at least one of color and style of said arrow to determine whether said arrow is associated with said transaction.

9. The storage medium of claim 7 wherein said analyzing of said source and target graphic objects and said arrow includes analyzing a property of one of said source and target graphic objects to determine whether said transaction is valid for said arrow.

10. The storage medium of claim 7 wherein said analyzing of said source and target graphic objects and said arrow includes analyzing a behavior of one of said source and target graphic objects to determine whether said transaction is valid for said arrow.

11. The storage medium of claim 7 wherein said analyzing of said source and target graphic objects and said arrow includes analyzing an action of said arrow to determine whether said transaction is valid for said arrow.

12. The storage medium of claim 7 wherein said associating of said at least said source graphic object and said target graphic object includes associating a plurality of graphic objects in a particular order, said particular order being used for said transaction when said arrow is implemented.

13. A method for creating user-defined computer operations, said method comprising:
   drawing an arrow in a computer operating environment in response to user input, including associating at least one graphic object displayed in said computer operating environment with said arrow;
   determining whether said arrow is associated with a transaction, said transaction being a computer operation that can be performed in said computer operating environment;
   analyzing said graphic object and said arrow to determine whether said transaction is valid for said arrow;
   enabling said transaction for said arrow if said transaction is determined to be valid for said arrow; and
   drawing a second arrow in said computer operating environment in response to another user input such that said second arrow contacts said arrow, including introducing a new parameter to said arrow such that said transaction that had been previously determined to be invalid is now validated for said arrow.

14. The method of claim 13 wherein said introducing of said parameter includes associating at least one alphanumeric character or symbol with said second arrow.

15. The method of claim 13 wherein said introducing of said parameter includes adding one or more graphic objects to said arrow.

16. A method for creating user-defined computer operations, said method comprising:
   drawing an arrow in a computer operating environment in response to user input, including associating at least one graphic object displayed in said computer operating environment with said arrow;
   determining whether said arrow is associated with a transaction, said transaction being a computer operation that can be performed in said computer operating environment;
   analyzing said graphic object and said arrow to determine whether said transaction is valid for said arrow;
   enabling said transaction for said arrow if said transaction is determined to be valid for said arrow;
   drawing a second arrow in said computer operating environment in response to another user input such that said second arrow contacts said arrow; and
   enabling a modified transaction based on said second arrow for said arrow regardless of whether said transaction was determined to be valid for said arrow.

17. The method of claim 16 further comprising associating at least one alphanumeric character or symbol with said second arrow, said alphanumeric character or symbol corresponding to said modified transaction.

18. The method of claim 16 further comprising drawing a third arrow in said computer operating environment in response to another user input such that said third arrow contacts said arrow at an intersection of said arrow and said third arrow, and defining said modified transaction for at least one associated graphic object of said arrow, said associated graphic object being adjacent to said intersection of said arrow and said third arrow.

19. The method of claim 16 further comprising recording information comprising at least one piece of information for at least one graphic object, said arrow and said second arrow, said recorded information being sufficient to reference a subsequent drawing of a new arrow to said recorded information.

20. The method of claim 19 further comprising determining if a match is found between said subsequent drawing of said arrow and said recorded information.

21. The method of claim 19 further comprising modifying a transaction of said new arrow if said match is found.

22. The method of claim 19 wherein said recorded information is predefined or user-defined.

23. The method of claim 19 wherein said recording of said information is performed in response to a manual initiation.

24. The method of claim 19 wherein said recording of said information is automatically performed after said modified transaction is enabled.

25. A method for creating user-defined computer operations, said method comprising:
   drawing an arrow in a computer operating environment in response to user input, including associating at least one graphic object displayed in said computer operating environment with said arrow;
   determining whether said arrow is associated with a transaction, said transaction being a computer operation that can be performed in said computer operating environment;
   analyzing said graphic object and said arrow to determine whether said transaction is valid for said arrow;
   enabling said transaction for said arrow if said transaction is determined to be valid for said arrow;
   implementing said transaction for said arrow;
   removing said arrow such that said arrow is not displayed in said computer operating environment;
   displaying a representation of said arrow;
   drawing a second arrow in said computer operating environment in response to another user input such that said second arrow contacts said representation; and
   enabling a modified transaction based on said second arrow for said representation.

26. A tangible storage medium readable by a computer, tangibly embodying a program of instructions executable by said computer to perform method steps for creating user-defined computer operations, said method comprising:
   drawing an arrow in a computer operating environment in response to user input, including associating at least one graphic object displayed in said computer operating environment with said arrow;
   determining whether said arrow is associated with a transaction, said transaction being a computer operation that can be performed in said computer operating environment;
   analyzing said graphic object and said arrow to determine whether said transaction is valid for said arrow;
   enabling said transaction for said arrow if said transaction is determined to be valid for said arrow; and
   drawing a second arrow in said computer operating environment in response to another user input such that said second arrow contacts said arrow, including introducing a new parameter to said arrow such that said transaction that had been previously determined to be invalid is now validated for said arrow.

27. The storage medium of claim 26 wherein said introducing of said parameter includes associating at least one alphanumeric character or symbol with said second arrow.

28. The storage medium of claim 26 wherein said introducing of said parameter includes adding one or more graphic objects to said arrow.

29. A tangible storage medium readable by a computer, tangibly embodying a program of instructions executable by said computer to perform method steps for creating user-defined computer operations, said method comprising:
   drawing an arrow in a computer operating environment in response to user input, including associating at least one graphic object displayed in said computer operating environment with said arrow;
   determining whether said arrow is associated with a transaction, said transaction being a computer operation that can be performed in said computer operating environment;
   analyzing said graphic object and said arrow to determine whether said transaction is valid for said arrow;
   enabling said transaction for said arrow if said transaction is determined to be valid for said arrow;
   drawing a second arrow in said computer operating environment in response to another user input such that said second arrow contacts said arrow; and
   enabling a modified transaction based on said second arrow for said arrow regardless of whether said transaction was determined to be valid for said arrow.

30. The storage medium of claim 29 wherein said method steps further comprise associating at least one alphanumeric character or symbol with said second arrow, said alphanumeric character or symbol corresponding to said modified transaction.

31. The storage medium of claim 29 wherein said method steps further comprise drawing a third arrow in said computer operating environment in response to another user input such that said third arrow contacts said arrow at an intersection of said arrow and said third arrow, and defining said modified transaction for at least one associated graphic object of said arrow, said associated graphic object being adjacent to said intersection of said arrow and said third arrow.

32. The storage medium of claim 29 wherein said method steps further comprise recording information comprising at least one piece of information for at least one graphic object, said arrow and said second arrow, said information being sufficient to reference a subsequent drawing of a new arrow to said recorded information.

33. The storage medium of claim 32 wherein said method steps further comprise determining if a match is found between said subsequent drawing of said arrow and said recorded information.

34. The storage medium of claim 32 wherein said method steps further comprise modifying a transaction of said new arrow if said match is found.

35. The storage medium of claim 32 wherein said recorded information is predefined or user-defined.

36. The storage medium of claim 32 wherein said recording of said predefined information is performed in response to a manual initiation.

37. The storage medium of claim 32 wherein said recording of said predefined information is automatically performed after said modified transaction is enabled.

38. A tangible storage medium readable by a computer, tangibly embodying a program of instructions executable by said computer to perform method steps for creating user-defined computer operations, said method comprising:
   drawing an arrow in a computer operating environment in response to user input, including associating at least one graphic object displayed in said computer operating environment with said arrow;
   determining whether said arrow is associated with a transaction, said transaction being a computer operation that can be performed in said computer operating environment;
   analyzing said graphic object and said arrow to determine whether said transaction is valid for said arrow;

enabling said transaction for said arrow if said transaction is determined to be valid for said arrow;
implementing said transaction for said arrow;
removing said arrow such that said arrow is not displayed in said computer operating environment;
displaying a representation of said arrow;
drawing a second arrow in said computer operating environment in response to another user input such that said second arrow contacts said representation; and
enabling a modified transaction based on said second arrow for said representation.

* * * * *